(12) United States Patent
Koike et al.

(10) Patent No.: US 11,076,125 B2
(45) Date of Patent: Jul. 27, 2021

(54) INFORMATION PROCESSING APPARATUS AND INFORMATION PROCESSING METHOD

(71) Applicant: SONY CORPORATION, Tokyo (JP)

(72) Inventors: Ryusei Koike, Kanagawa (JP); Yusuke Sakai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/982,376

(22) PCT Filed: Feb. 15, 2019

(86) PCT No.: PCT/JP2019/005462
§ 371 (c)(1),
(2) Date: Sep. 18, 2020

(87) PCT Pub. No.: WO2019/187747
PCT Pub. Date: Oct. 3, 2019

(65) Prior Publication Data
US 2021/0006749 A1    Jan. 7, 2021

(30) Foreign Application Priority Data

Mar. 28, 2018 (JP) .............................. JP2018-061173

(51) Int. Cl.
*H04N 7/15* (2006.01)
*H04N 7/14* (2006.01)
*G06F 3/14* (2006.01)

(52) U.S. Cl.
CPC ........... *H04N 7/142* (2013.01); *G06F 3/1454* (2013.01); *H04N 7/147* (2013.01)

(58) Field of Classification Search
CPC ............... H04N 7/14; H04N 7/15; G06F 3/14
USPC ............................................ 348/14.01–14.16
See application file for complete search history.

(56) References Cited

U.S. PATENT DOCUMENTS

| | | | | |
|---|---|---|---|---|
| 5,694,544 | A | * 12/1997 | Tanigawa | G06F 3/0481 370/260 |
| 2005/0183023 | A1* | 8/2005 | Maruyama | G06F 3/1423 715/759 |
| 2011/0078573 | A1* | 3/2011 | Ooba | G06F 9/451 715/733 |

(Continued)

FOREIGN PATENT DOCUMENTS

| | | |
|---|---|---|
| JP | 2005-227487 A | 8/2005 |
| JP | 2008-125896 A | 6/2008 |

(Continued)

OTHER PUBLICATIONS

International Search Report and Written Opinion of PCT Application No. PCT/JP2019/005462, dated Mar. 19, 2019, 10 pages of ISRWO.

*Primary Examiner* — Melur Ramakrishnaiah
(74) *Attorney, Agent, or Firm* — Chip Law Group

(57) ABSTRACT

Provided is an information processing apparatus that includes a first display unit, a second display unit that displays an image acquired from a space on a communication partner side, and a control unit that performs a display control of the first display unit and the second display unit, and control to display, on at least one of the first display unit or the second display unit, a shared object whose display at least extends to a work area on the communication partner side.

15 Claims, 43 Drawing Sheets

(56) References Cited

U.S. PATENT DOCUMENTS

| | | | | |
|---|---|---|---|---|
| 2012/0154255 A1* | 6/2012 | Hinckley | ............... | G06F 3/0488 345/1.3 |
| 2014/0232816 A1* | 8/2014 | Wilson | ................ | G06F 3/0304 348/14.08 |
| 2019/0081993 A1* | 3/2019 | Shim | ................... | G06F 3/04845 |

FOREIGN PATENT DOCUMENTS

| | | | |
|---|---|---|---|
| JP | 2008125896 A | * | 6/2008 |
| JP | 2011-070511 A | | 4/2011 |
| JP | 2014-044735 A | | 3/2014 |
| JP | 2016-515325 A | | 5/2016 |

* cited by examiner

FIG.5
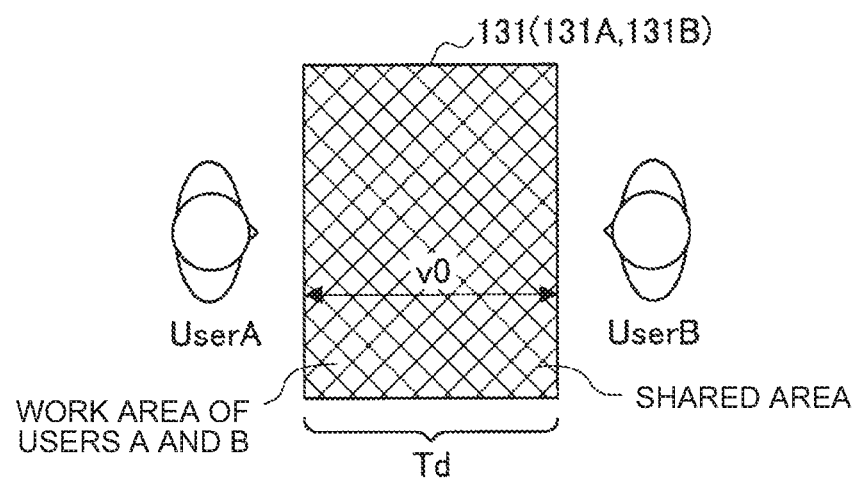
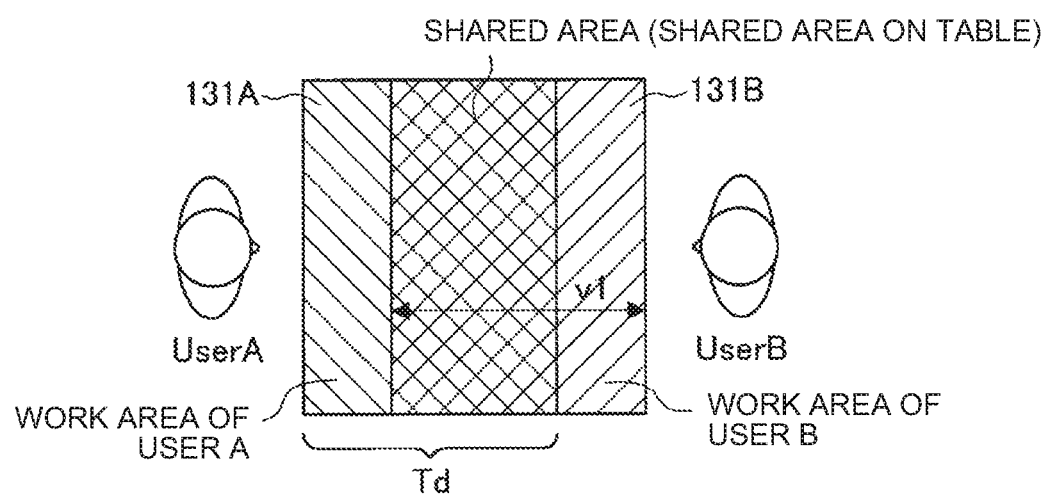
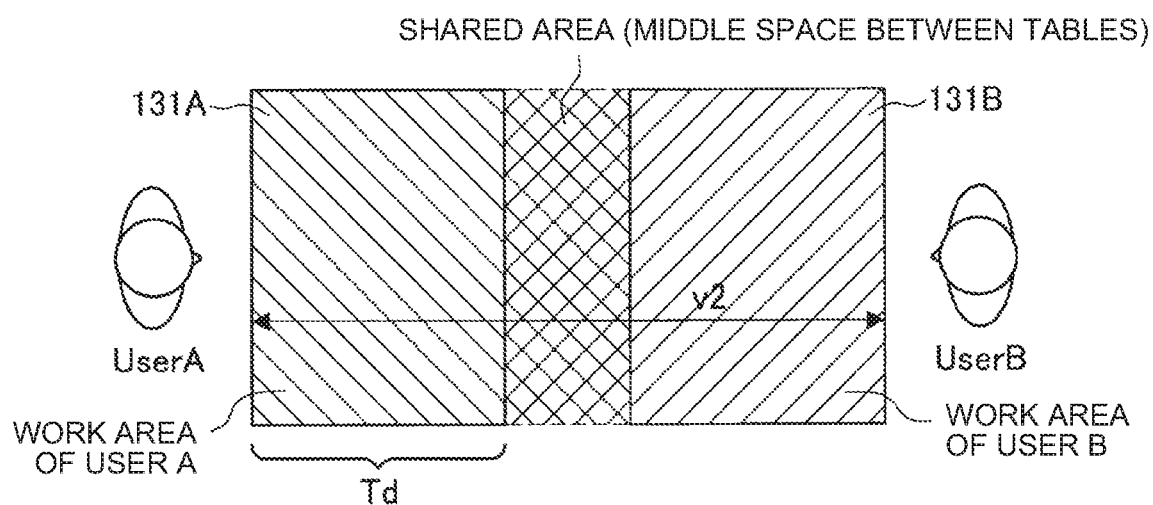

FIG.7
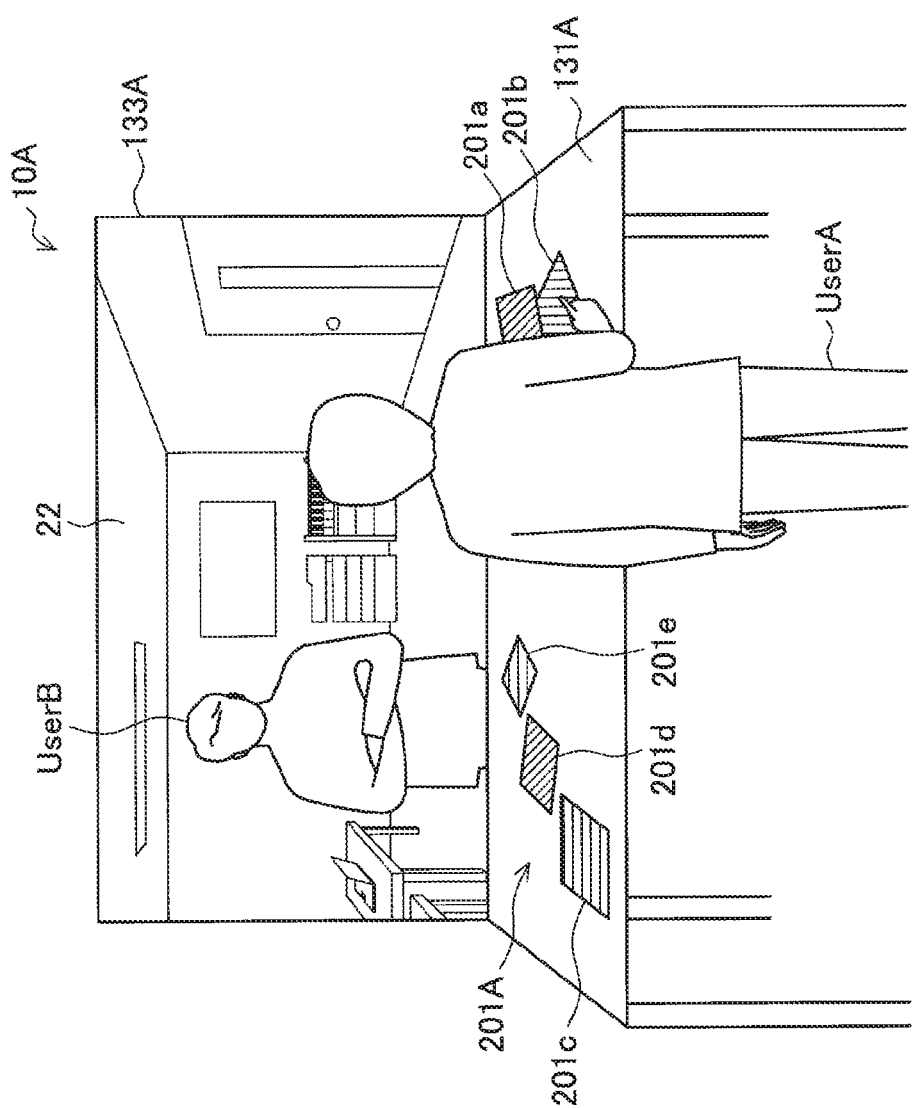
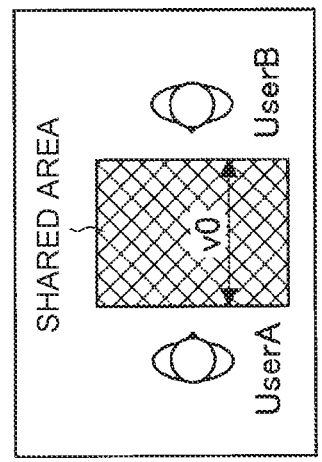

FIG.11
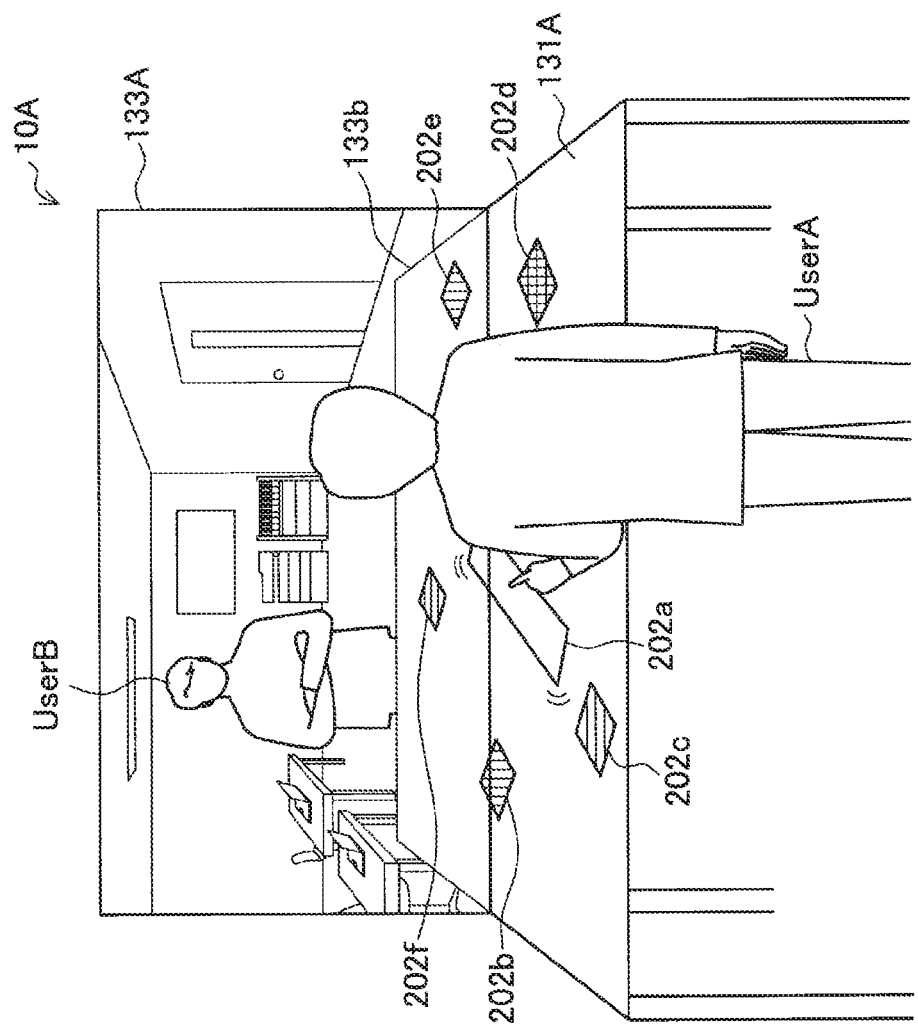
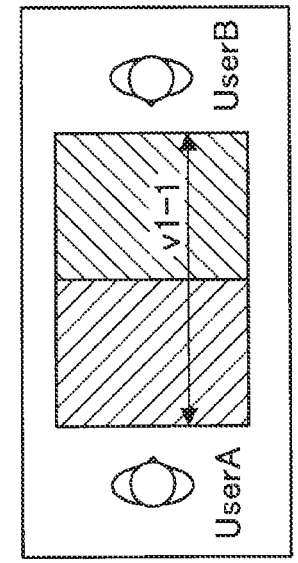

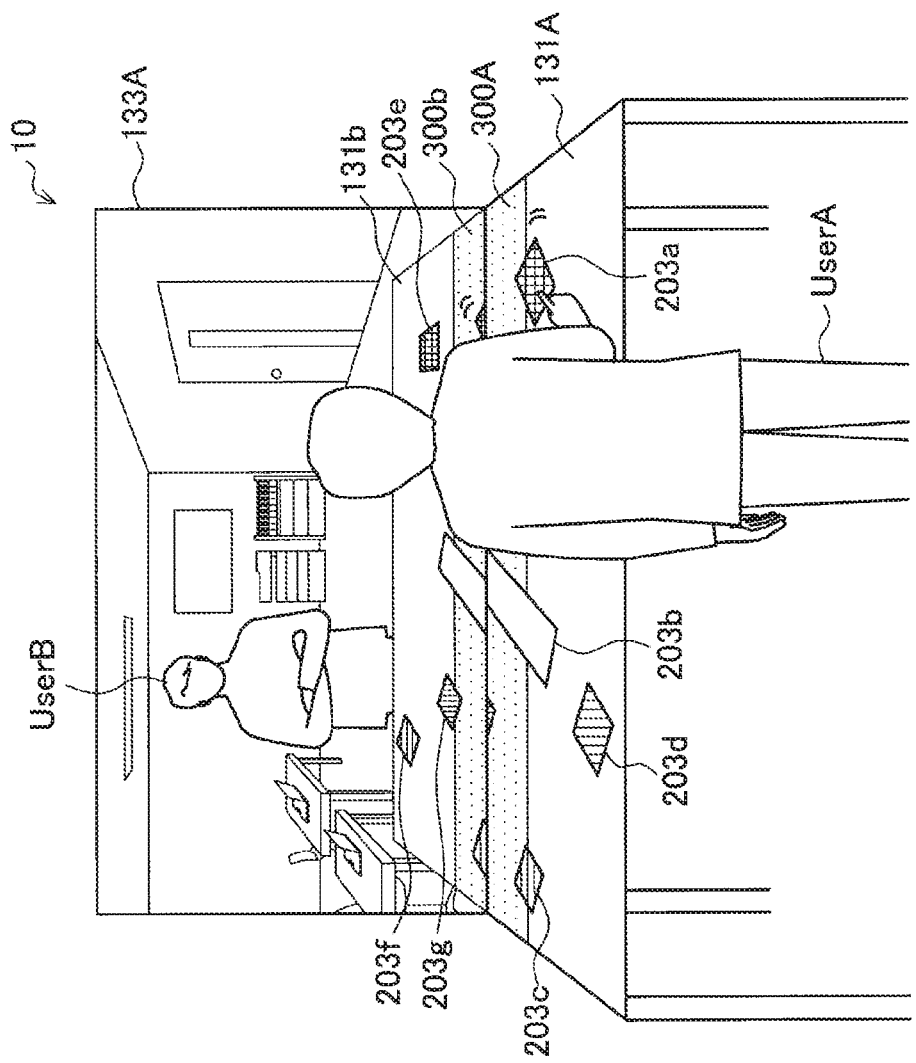
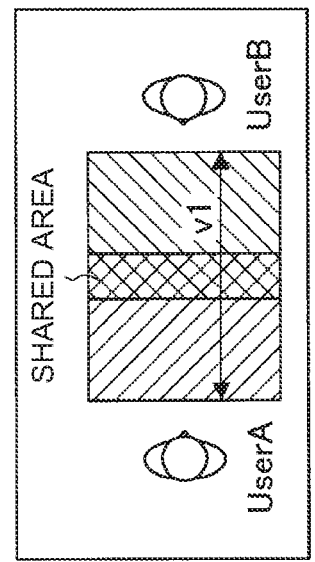
FIG.13

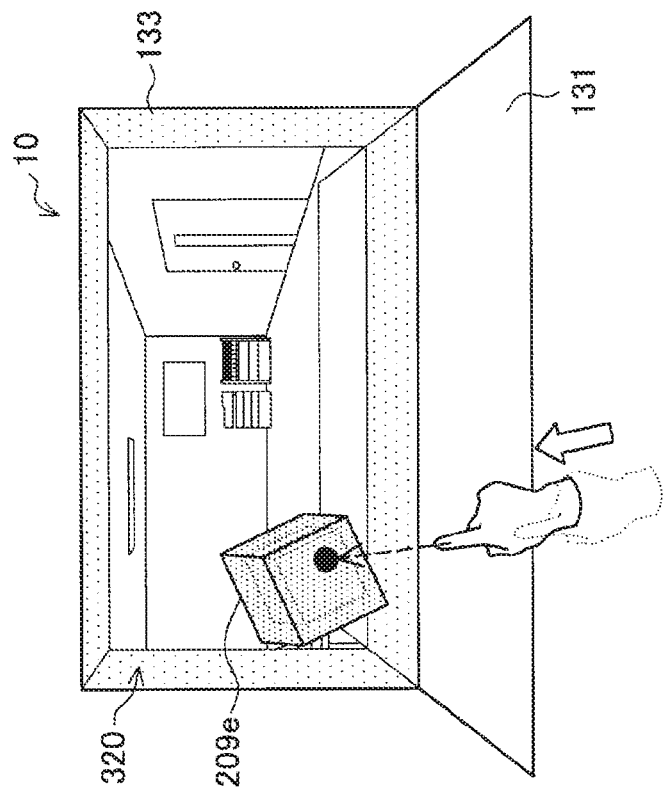
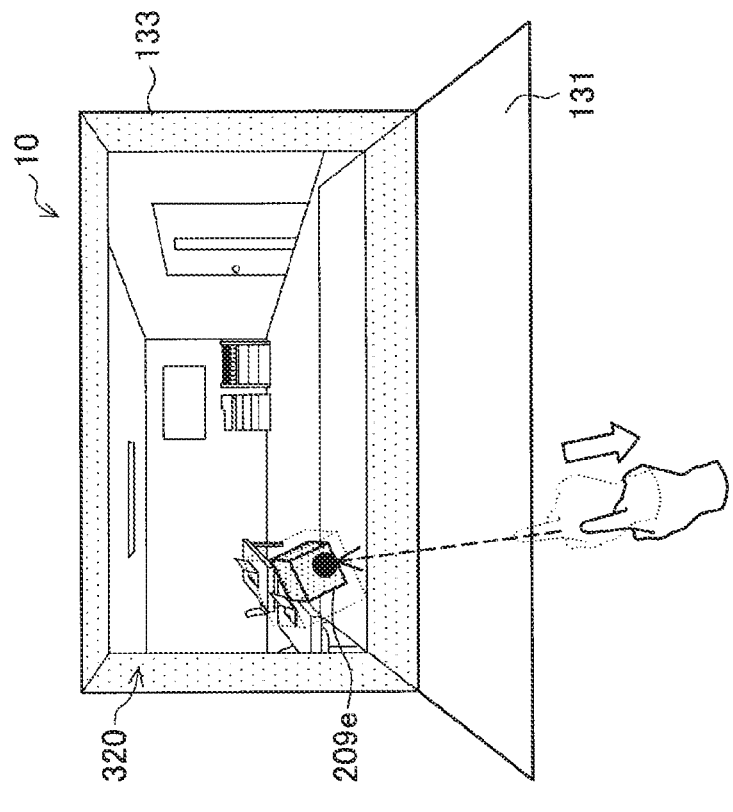
FIG.25

FIG.28
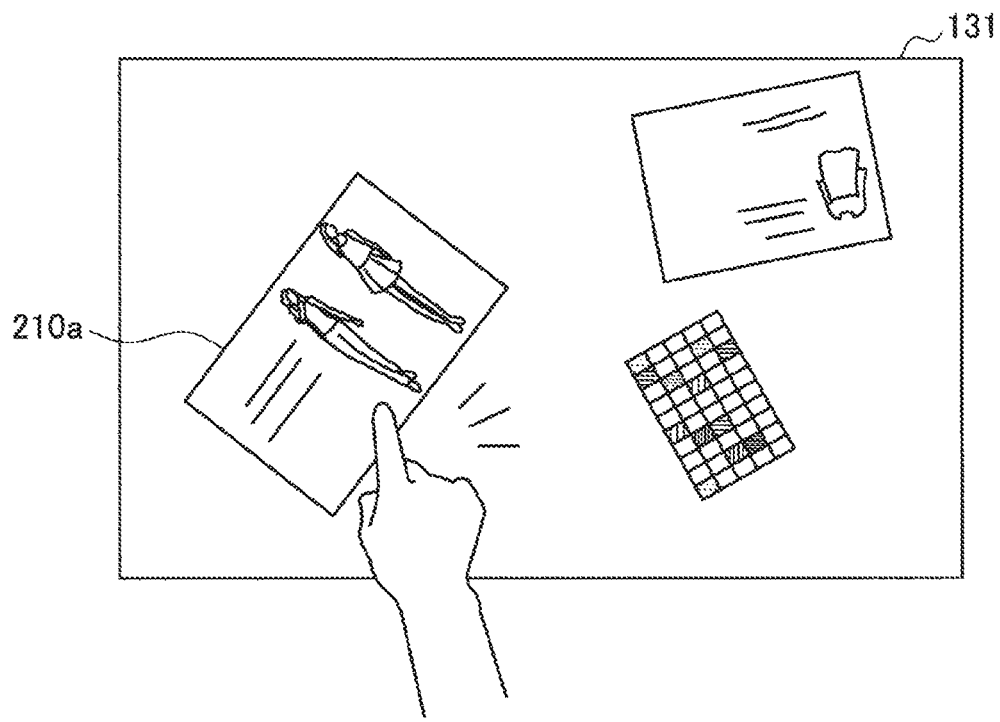
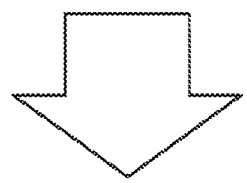
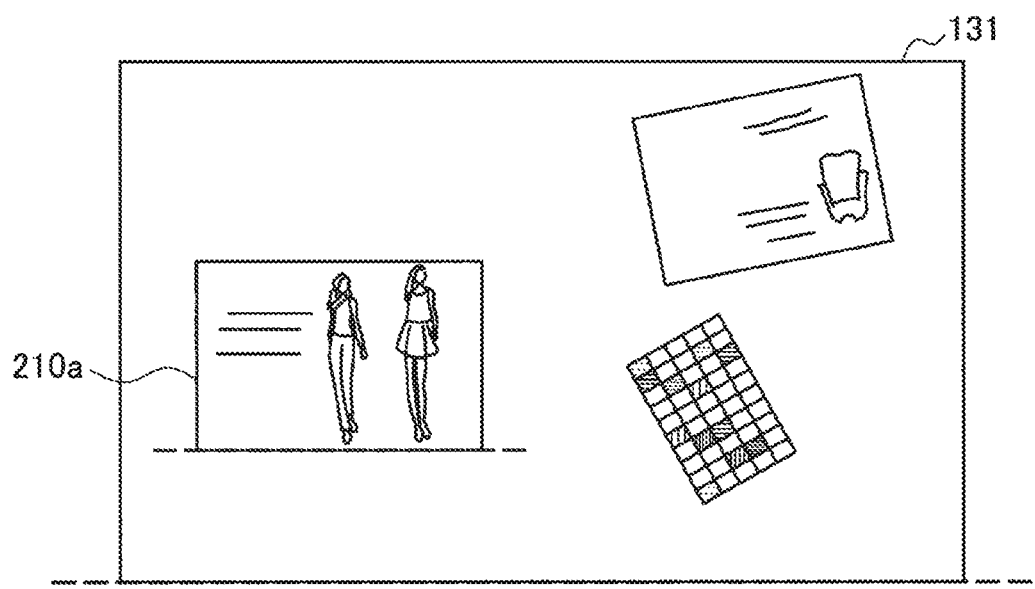

FIG.30
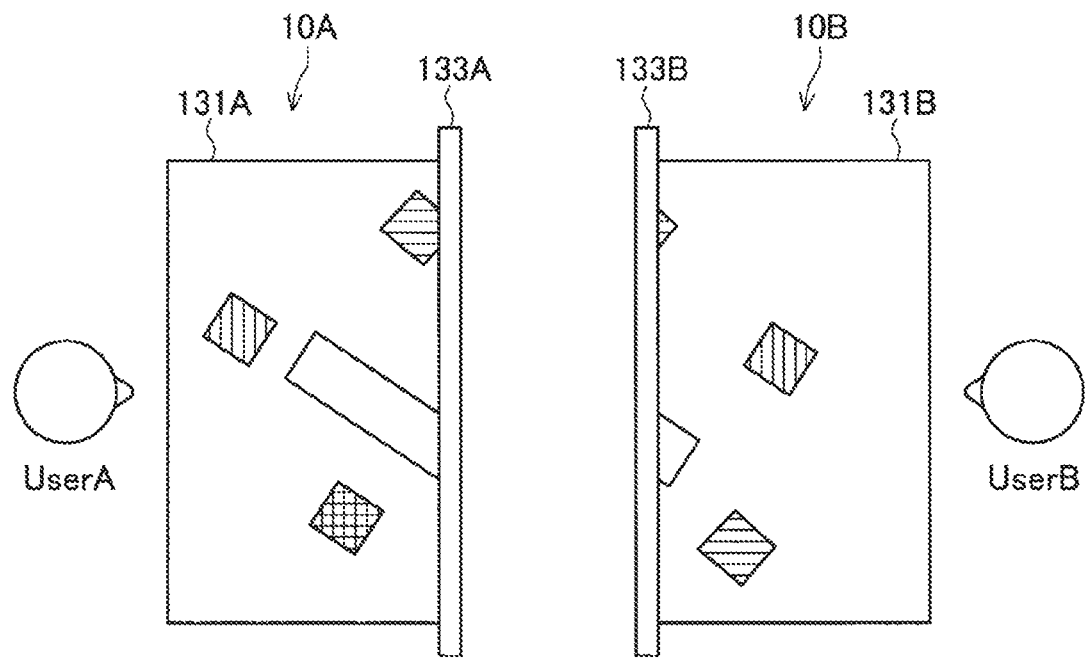
BEFORE GATHERING
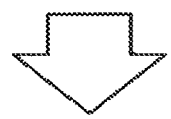
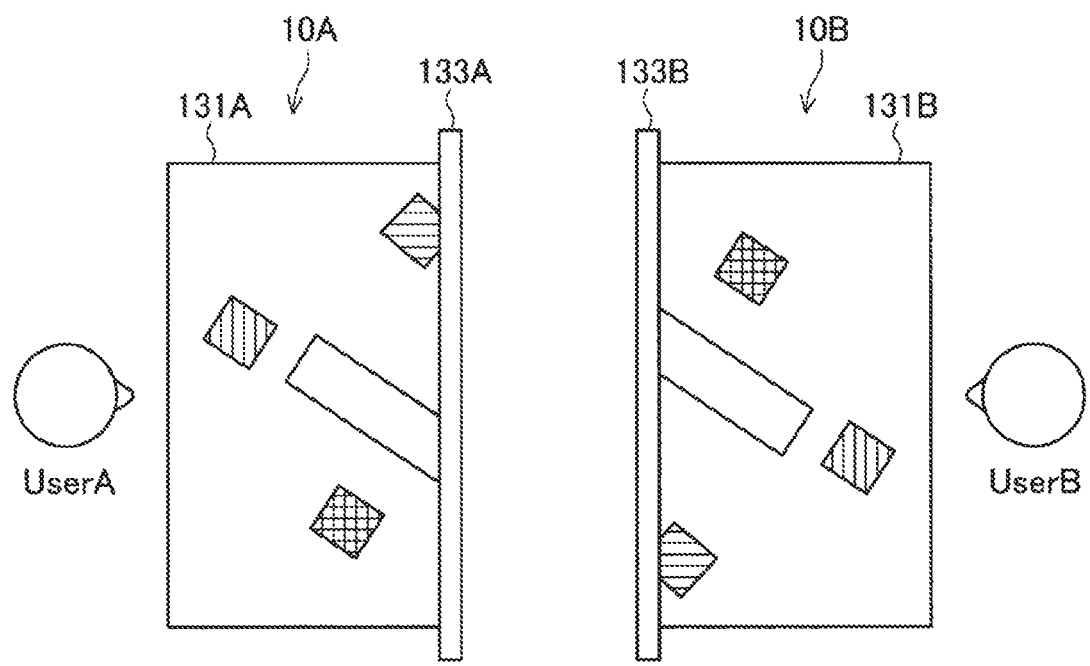
GATHERED ON USER A SIDE

FIG.42
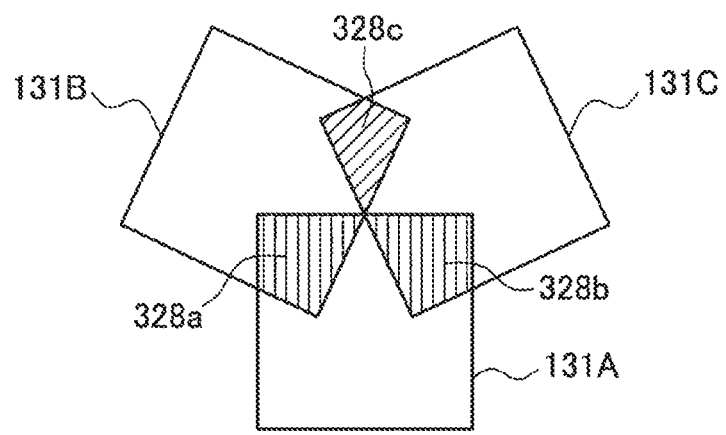
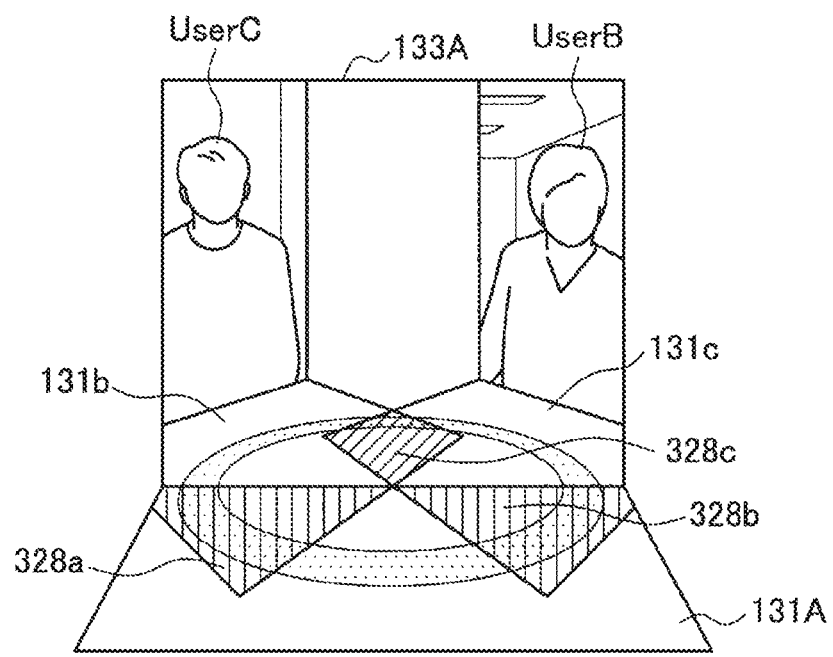
IN CASE OF THREE POINTS

FIG.43
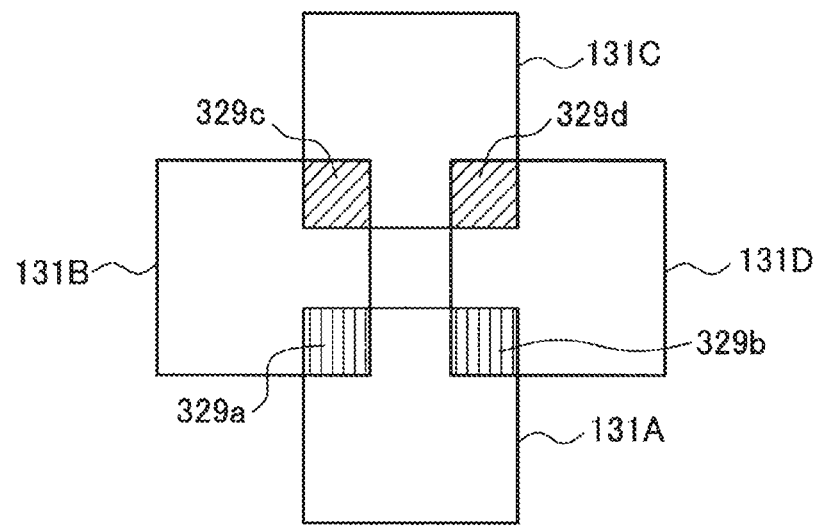
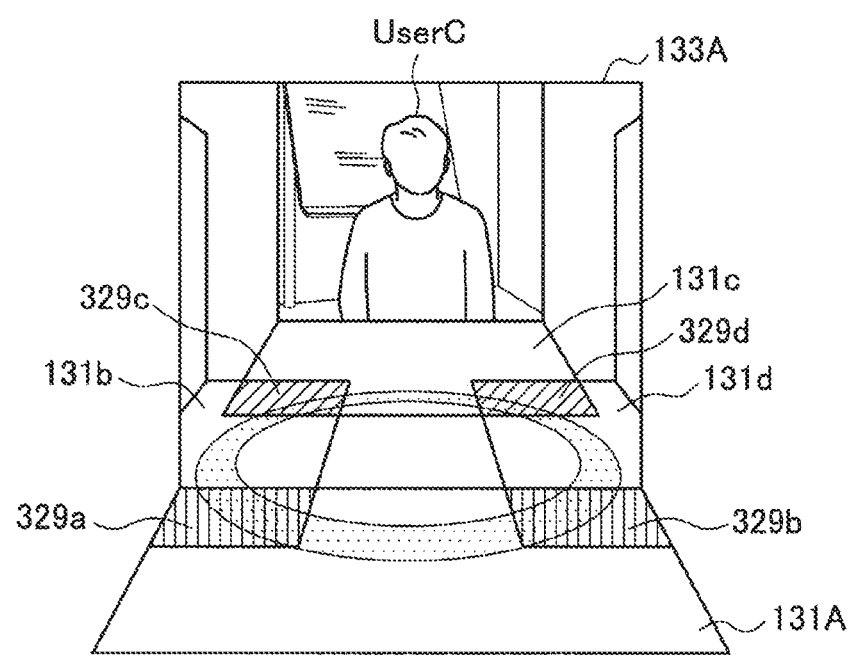
IN CASE OF FOUR POINTS

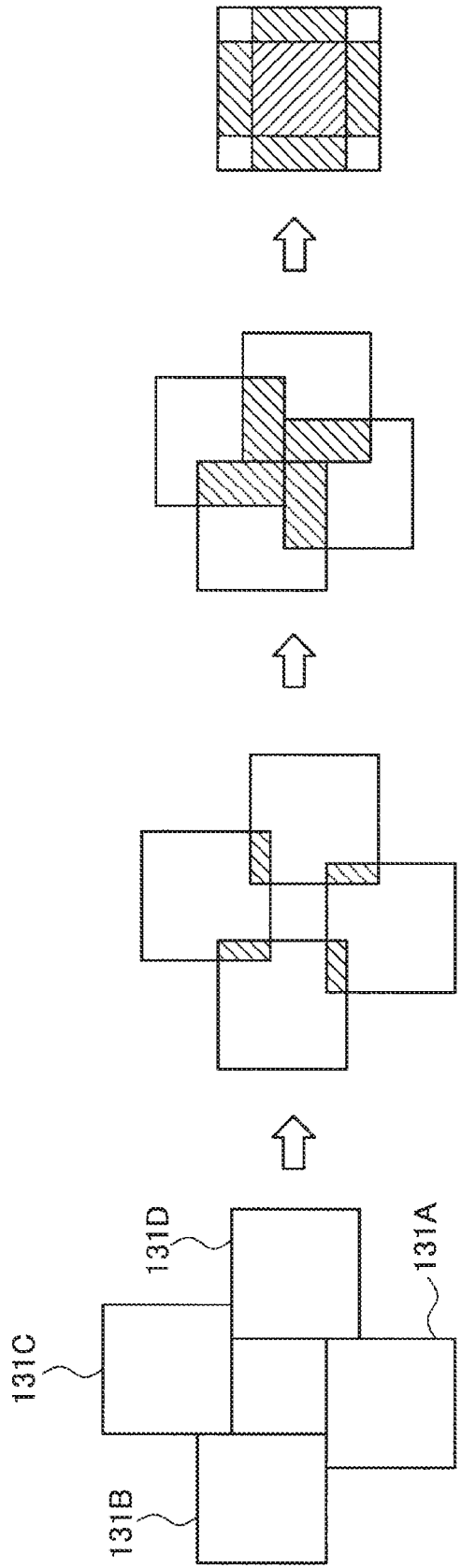

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/005462 filed on Feb. 15, 2019, which claims priority benefit of Japanese Patent Application No. JP 2018-061173 filed in the Japan Patent Office on Mar. 28, 2018. Each of the above-referenced applications is hereby incorporated herein by reference in its entirety.

FIELD

The present disclosure relates to an information processing apparatus, an information processing method, and a program.

BACKGROUND

Conventionally, a communication system that supports communication with the other party at a remote location, such as a conference system using a videophone, has been proposed.

CITATION LIST

Patent Literature

Patent Literature 1: JP 2014-44735 A

SUMMARY

Technical Problem

In a communication system with the other party at a remote location, it is required to communicate with each other more smoothly using a voice and a video image. Furthermore, it is important to refer to shared content such as commonly used conference materials.

However, the conventional communication system does not consider optimization of a space in which work is performed in cooperation with the remote location.

For example, the above-mentioned Patent Literature 1 discloses an apparatus in which people work together using a large screen while having a common area or their own occupied areas and objects are displayed so as to face themselves in their own areas, but relates to work by people in a local area, and does not consider work while communicating with the remote location.

Therefore, the present disclosure proposes an information processing apparatus, an information processing method, and a program capable of providing a joint work space in which people feel as if people perform work in the same space as a communication partner in two-way communication.

Solution to Problem

According to the present disclosure, an information processing apparatus is provided that includes: a first display unit; a second display unit that displays an image acquired from a space on a communication partner side; and a control unit that performs a display control of the first display unit and the second display unit, wherein the control unit performs control to display, on at least one of the first display unit or the second display unit, a shared object whose display at least extends to a work area on the communication partner side.

According to the present disclosure, an information processing method is provided that includes: causing a processor to perform display control of a first display unit and a second display unit that displays an image acquired from a space on a communication partner side, and display, in at least one of the first display unit or the second display unit, a shared object whose display at least extends to a work area on the communication partner side.

According to the present disclosure, a program is provided that causes a computer to function as a control unit that performs display control of a first display unit and a second display unit that displays an image acquired from a space on a communication partner side, wherein the control unit performs control to display, on at least one of the first display unit or the second display unit, a shared object whose display at least extends to a work area on the communication partner side.

Advantageous Effects of Invention

As described above, according to the present disclosure, it is possible to propose the joint work space in which people feel as if people perform work in the same space as the communication partner in the two-way communication.

Note that the above effects are not necessarily limited, and in addition to or in place of the above effects, any of the effects disclosed in this specification, or other effects that can be grasped from this specification may be achieved.

BRIEF DESCRIPTION OF DRAWINGS

FIG. 5 is a diagram for describing a virtual distance interval according to the present embodiment.

FIG. 7 is a diagram illustrating a display screen example on a user A side in a first display example of the present embodiment.

FIG. 11 is a diagram illustrating a display screen example on a user A side in a second display example of the present embodiment.

FIG. 13 is a diagram illustrating a display screen example on a user A side in a case where a shared area is set on a table in a third display example of the present embodiment.

FIG. 25 is a diagram for describing the operation method using a middle space in the fourth display example of the present embodiment.

FIG. 28 is a diagram for describing an alignment display control of objects displayed on the table according to the present embodiment.

FIG. 30 is a diagram illustrating display screen examples of each information processing apparatus in the fifth display example of the present embodiment.

FIG. 42 is a diagram illustrating a display screen example (tables are a square) on the user A side when presenting a joint work space connecting three points in the present embodiment.

FIG. 43 is a diagram illustrating a display screen example (tables are a square) on the user A side when presenting a joint work space connecting four points in the present embodiment.

FIG. 44 is a diagram illustrating another example of how tables are overlapped in the presentation of a joint work space connecting four points in the present embodiment.

DESCRIPTION OF EMBODIMENTS

Figure 1:
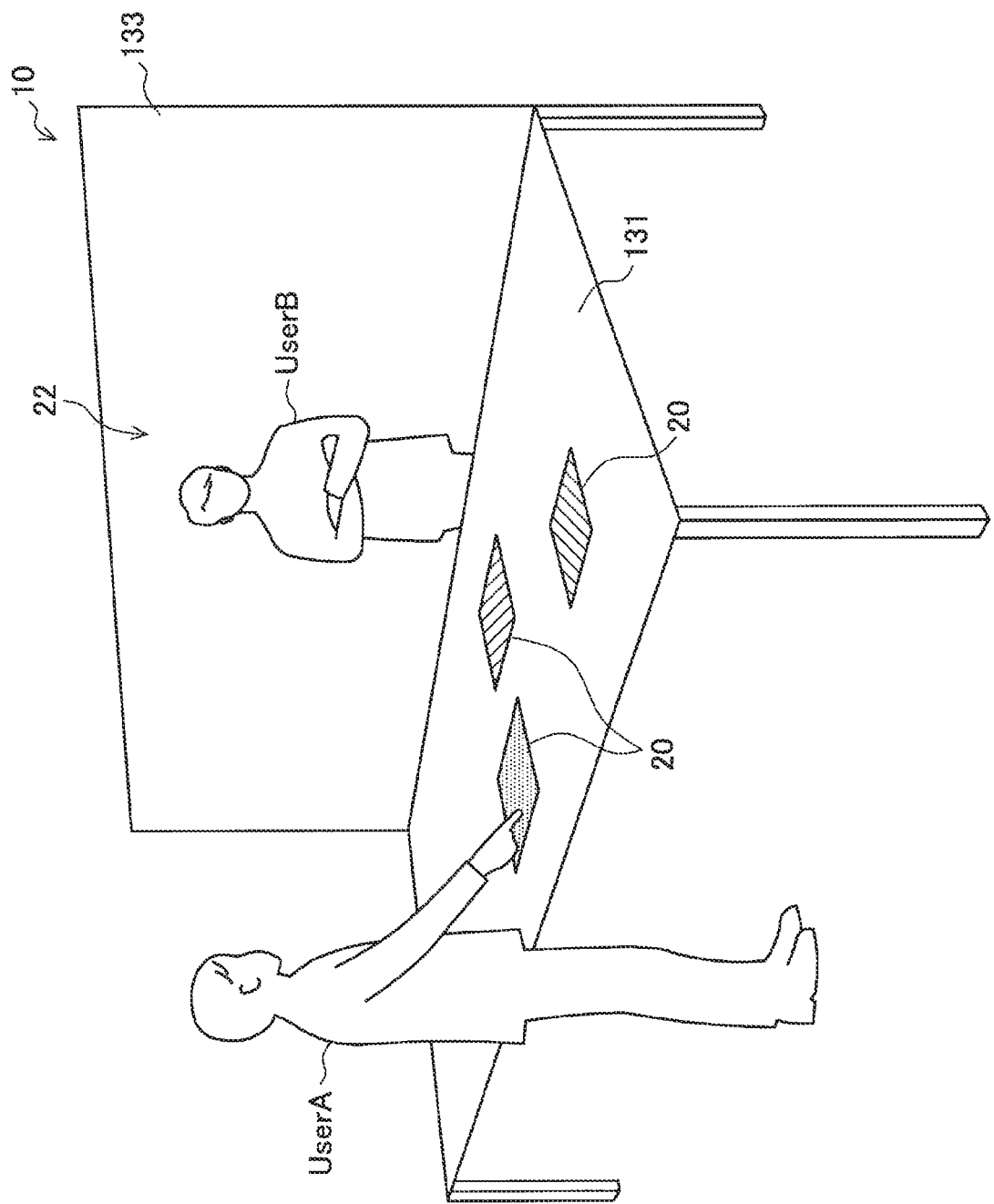
FIG. 1 is a diagram for describing an overview of an information processing system according to an embodiment of the present disclosure.

Hereinafter, preferred embodiments of the present disclosure will be described in detail with reference to the accompanying drawings. Note that in the specification and the drawings, components having substantially the same functional configuration are denoted by the same reference numerals, and a redundant description thereof is omitted.

In addition, the description will be given in the following order.

1. Overview of Information Processing System according to Embodiment of Present Disclosure
2. Configuration Example
3. Operation Processing
4. Display Example
4-1. First Display Example (One Table Is Shared)
4-2. Second Display Example (Table Expansion)
4-3. Third Display Example (Set Shared Area in Part on Table)
4-4. Fourth Display Example (Middle Space)
4-5. Fifth Display Example (Gathering)
4-6. Reproduction of Display of Past Object
5. Other Configuration Example
5-1. Other Configuration Example 1
5-2. Other Configuration Example 2
6. Presentation of Joint Work Space Connecting Three Points or More
7. Summary 1. Overview of Information Processing System According to Embodiment of Present Disclosure FIG. 1 is a diagram for describing an overview of an information processing system according to an embodiment of the present disclosure. As illustrated in FIG. 1, the information processing system according to the present embodiment uses an information processing apparatus 10 that is configured to include a display unit (table display 131) that is provided on a top plate portion of a table, and a display unit (window display 133) that is provided substantially vertically at one end on the table display 131.

A display image 20 is displayed on the table display 131. The display image 20 is a display object indicating an interaction from an application, and is, for example, various UIs and the like such as a still image, a moving image (video image), a menu screen, or a control screen. In addition, the display image 20 (object) may be a two-dimensional image or a three-dimensional image. Since the operation input by the user on the display image 20 is detected by various types of sensors, a user performs various operation inputs on the display image 20 by moving an operating body on the display image 20, for example, performing touch or proximity of a hand.

The operation input to the display image 20 of the table display 131 can be detected by, for example, a touch sensor provided in the table display 131 or a depth camera, a thermo camera, an RGB camera, an ultrasonic sensor, or the like provided around the table display 131. For example, the information processing apparatus 10 analyzes a captured image or depth information to acquire a position of a user's hand or finger positioned on a display screen of the table display 131 or the depth information (in other words, three-dimensional information), and detect the touch or proximity of the user's hand to the table display 131 in a height direction and a detachment of the hand from the table display 131. In the present specification, the touch or proximity of the operating body such as the user's hand to the display screen is collectively referred to as "touch".

In addition, a video image 22 of the communication partner is displayed on the window display 133.

The information processing apparatus 10 according to the present embodiment can provide a state in which a communication partner can work around one table (window display 133) by an arrangement configuration of a plurality of display units as illustrated in FIG. 1.

Figure 2:
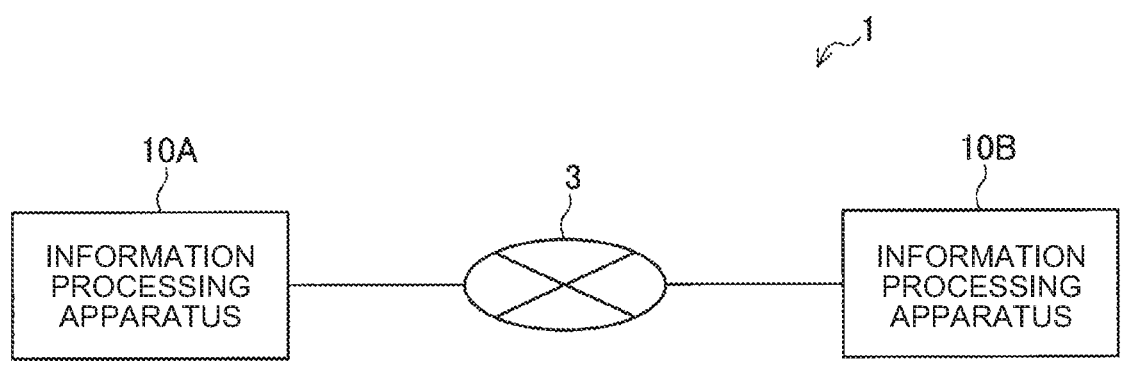
FIG. 2 is a diagram illustrating an example of a system configuration of an information processing system according to the present embodiment.

The information processing apparatus 10 having such an arrangement configuration is arranged in each space. For example, in the case of a two-way communication system connecting a user A in space A and a user B in space B, the information processing system 1 has a system configuration including an information processing apparatus 10A and an information processing apparatus 10B as illustrated in FIG. 2. The information processing apparatus 10A and the information processing apparatus 10B are communicatively connected via a network 3.

Figure 3:
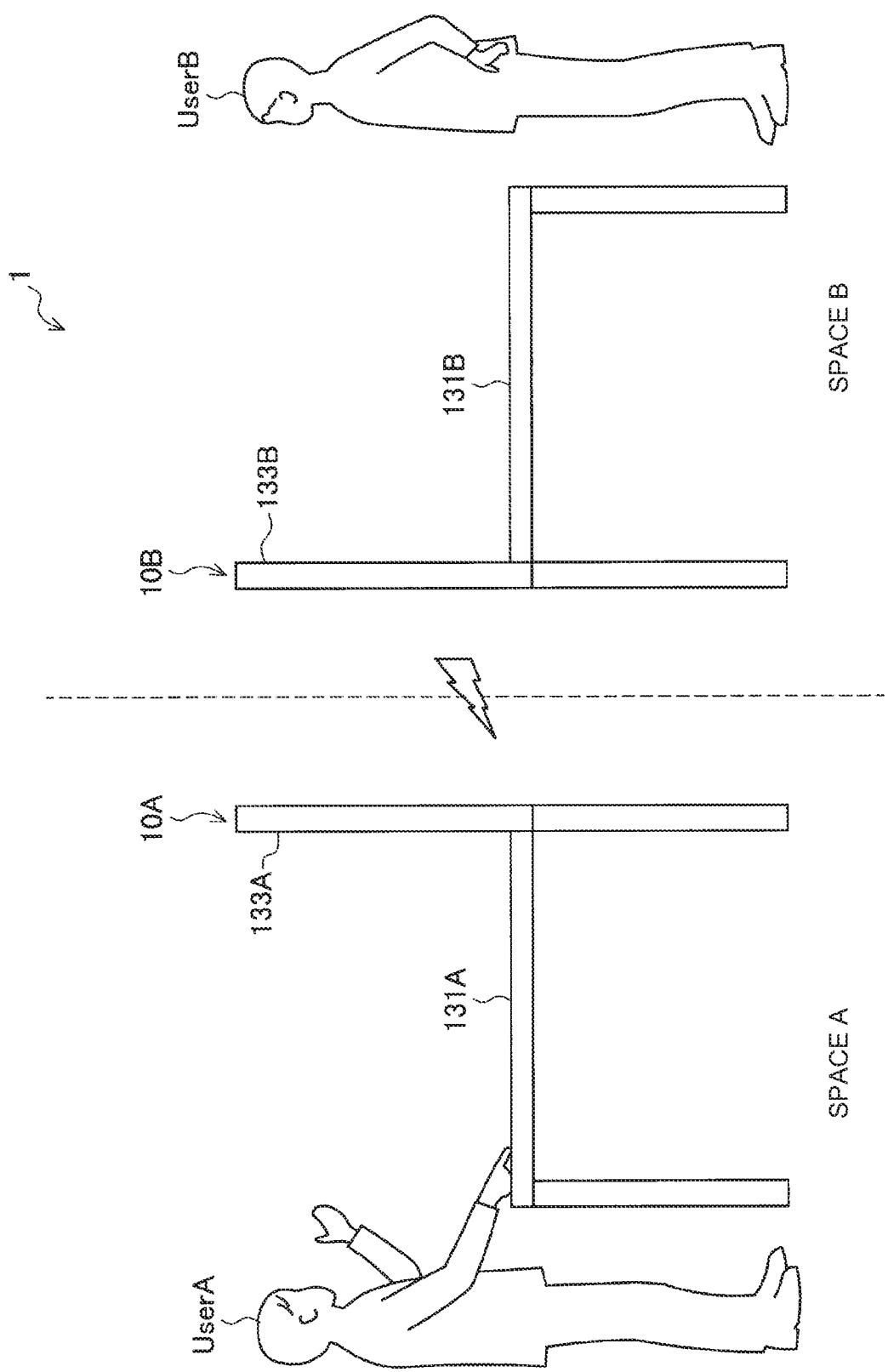
FIG. 3 is a diagram illustrating an example of an information processing apparatus arranged in space A and an information processing apparatus arranged in space B according to the present embodiment.

FIG. 3 is a diagram illustrating an example of the information processing apparatus 10A arranged in the space A and the information processing apparatus 10B arranged in the space B. The information processing apparatus 10A and the information processing apparatus 10B are configured to have the same configuration. That is, the information processing apparatus 10A and the information processing apparatus 10B include table displays 131A and 131B on which the display image 20 is displayed and a user performs an operation input, and window displays 133A and 133B on which video images of communication partners are displayed, respectively.

Here, since the video image 22 of the communication partner is displayed on each of the window displays 133A and 133B, each user can obtain a visual effect as if the communication partner is working around any one table (table displays 131A and 131B) as illustrated in FIG. 1. The video image 22 of the communication partner can be acquired in real time by cameras 123 (not illustrated in FIG. 1) provided in each information processing apparatus 10. An installation position of the camera 123 is not particularly limited, but may be provided around the window display 133, for example.

In addition, an object (display image 20) that can be operated by both parties is displayed on each table top (table displays 131A and 131B) on the user A side and the user B side. In this specification, the object that can be operated by both parties is referred to as a "shared object". In the present embodiment, the operation input from one user for the displayed shared object is also reflected (in real time) on the corresponding shared object displayed on the other table top, thereby increasing convenience of joint work. More specifically, for example, in the case where the same shared object is displayed on the table display 131A and the table display 131B in the same arrangement, when the user A moves a display position of the certain shared object on the table display 131A, the corresponding shared object on the table display 131B is also moved in the same manner.

Note that in each table top (table displays 131A and 131B), there may be an object that can be operated only by each user. In this specification, an object that can be operated only by a specific user is referred to as a "private object" for the shared object. The private object may not be displayed on the table top on the other party side, or may be displayed but may not be operated. In addition, which object is the private object or the shared object may be set for each object, or an object (at least a part of the shared area includes an object displayed in a shared area) positioned in the predetermined area (shared area) set on the table may be regarded as a shared object at any time.

In addition, in the present specification, areas on each table top (table display 131A and 131B) are referred to as a "work area". Each user can operate (work) each object displayed on the table displays 131A and 131B. In this case, the above-described "shared area" can be called a joint work area in which work areas of each user overlap.

Here, the work areas of each user are not limited only to the table top as illustrated in FIG. 1, and can be virtually expanded by using the window display 133. Although details will be described later, for example, it is also possible to draw a virtual table in which a top surface of the table display 131A is visible to extend to the window display 133 and use the virtual table as the joint work area. In addition, it is also possible to draw a three-dimensional joint work area (so-called virtual space. Called a "middle space" in this specification) in the window display 133. At this time, the video image of the other party is displayed on a back side across the middle space. By providing such a middle space, the large 3D object that cannot be drawn on the table can be displayed to perform the joint work.

In addition, in FIGS. 1 to 3, although communication between two points is described as an example, the present embodiment is not limited thereto, and it is also possible to connect three points or more.

Further, in the present embodiment, not only the operation input to the table display 131 but also the operation input to the window display 133 can also be detected in the same manner. Further, the shapes of the table display 131A and table display 131B are not limited to a rectangle illustrated in FIG. 1, and the table display 131A and table display 131B may have any shape such as a polygon, a circle, and an ellipse.

Further, the arrangement configuration (combination of a display unit in a substantially horizontal direction and a display unit in a substantially vertical direction) of the table display 131 and the window display 133 is not limited to the table top as illustrated in FIG. 1, and may be realized in any place such as a floor, a wall, and furniture in a space (indoor/outdoor) or on a laptop PC, and the like.

Further, a display for realizing a visual effect according to the present embodiment is not limited to the display and may be performed by a projector. For example, the projector can appropriately project the display image 20, the video image 22 of the communication partner, or the like onto the top surface, the wall, or the like of the table, thereby realizing the visual effect according to the present embodiment.

The information processing system 1 according to the embodiment of the present disclosure has been described above. Next, a specific configuration of the information processing apparatus 10 included in the information processing system 1 according to the present embodiment will be described with reference to the drawings.

2. Configuration Example

Figure 4:
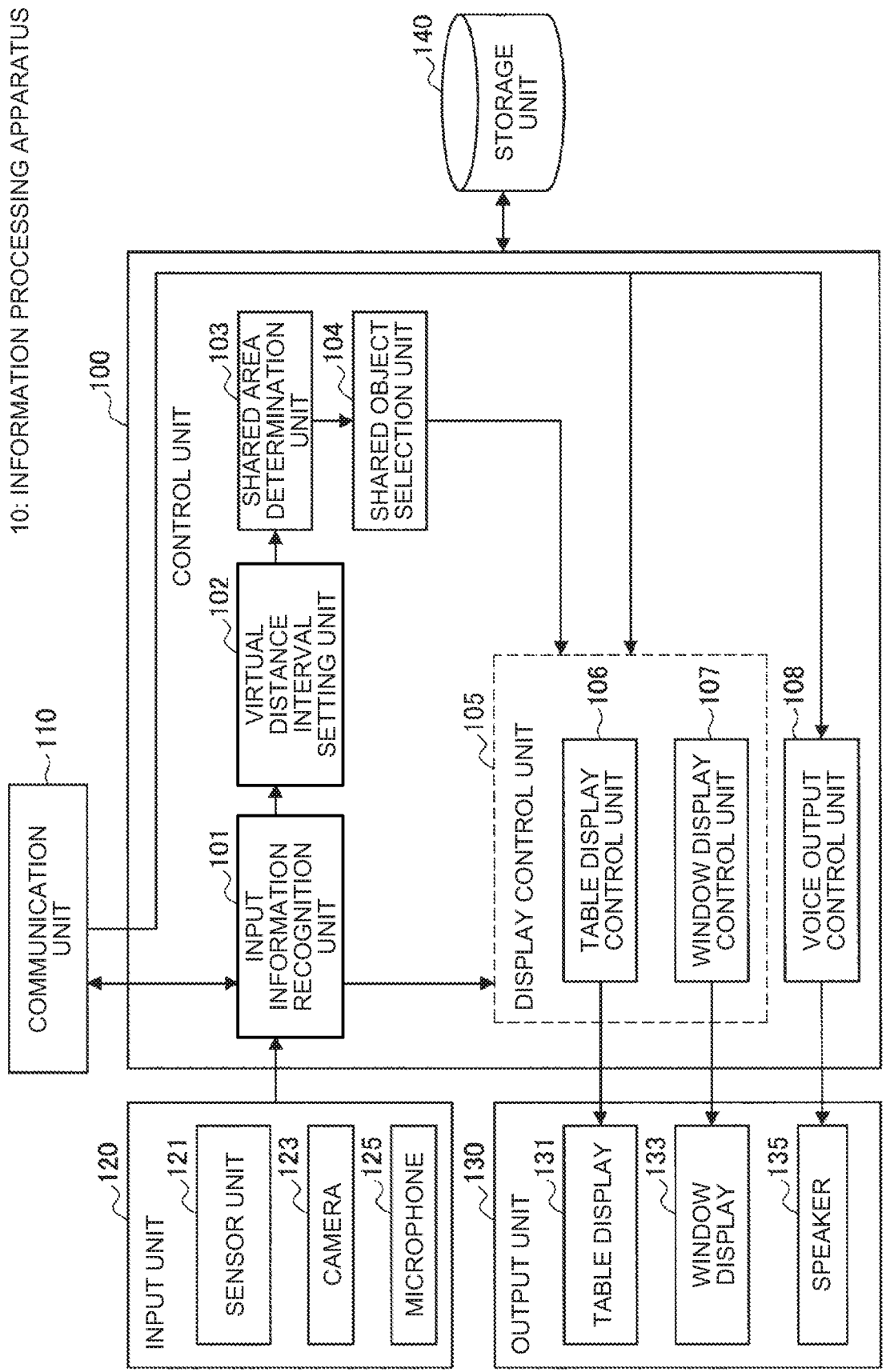
FIG. 4 is a block diagram illustrating an example of a configuration of the information processing apparatus according to the present embodiment.

FIG. 4 is a block diagram illustrating an example of the configuration of the information processing apparatus 10 according to the present embodiment. As illustrated in FIG. 4, the information processing apparatus 10 includes a control unit 100, a communication unit 110, an input unit 120, an output unit 130, and a storage unit 140.

2-1. Control Unit 100

The control unit 100 functions as an arithmetic processing device and a control device, and controls overall operations in the information processing apparatus 10 according to various programs. The control unit 100 is realized by an electronic circuit such as a central processing unit (CPU) and a microphone processor. In addition, the control unit 100 may also include a read only memory (ROM) that stores programs to be used, operation parameters, and the like, and a random access memory (RAM) that temporarily stores parameters that changes as appropriate.

Further, the control unit 100 according to the present embodiment also functions as an input information recognition unit 101, a virtual distance interval setting unit 102, a shared area determination unit 103, a shared object selection unit 104, a display control unit 105, a table display control unit 106, a window display control unit 107, and a voice output control unit 108.

The input information recognition unit 101 analyzes input information acquired from the input unit 120 and performs various recognition processing. For example, the input information recognition unit 101 recognizes a user input based on the information acquired from the sensor unit 121, the camera 123, or the microphone 125. The user input may be performed using an external device such as a gesture, audio, a remote controller (for example, a remote controller using IR), or a game pad.

For example, the gesture information can be recognized by analyzing information sensed by a depth camera, a thermo camera, an RGB camera, a touch sensor, a pressure sensor, a proximity sensor, an ultrasonic sensor, or the like. The gesture information includes, for example, information such as user's hand movement, arm movement, posture (for example, bone information), a line of sight, and a touch operation (specifically, touch, tap, double tap, swipe, or drag). For example, the input information recognition unit 101 recognizes, as the gesture information, the touch operation on the table display 131 and a pointing operation on the window display 133.

The input information recognition unit 101 transmits the recognition result (user input) from the communication unit 110 to a communication destination apparatus (for example, the information processing apparatus 10A to the information processing apparatus 10B). As a result, the information processing system 1 realizes the joint work by reflecting the user input on the display of the other party side.

Further, the input information recognition unit 101 continuously transmits the video image of the user acquired by the camera 123 or the audio of the user acquired by the microphone 125 from the communication unit 110 to the communication destination apparatus (for example, the information processing apparatus 10B). As a result, the information processing system 1 realizes two-way communication using a voice and a video image.

The input information recognition unit 101 also acquires the input information from an external device via the communication unit 110. For example, the input information recognition unit 101 acquires the video image or voice of a communication destination space and the user input by the communication partner from the communication destination apparatus via the communication unit 110.

The virtual distance interval setting unit 102 sets a virtual distance interval (in this specification, referred to as a virtual distance interval) in a joint work space between communication parties. The virtual distance interval indicates a so-called interval between the user and the communication partner, and can be arbitrarily designated by the user. By freely adjusting the interval with the communication partner who is a co-worker, it becomes possible to perform the joint work while maintaining a psychological distance from the co-worker. Note that the virtual distance interval may be designated by the communication partner. Here, the virtual distance interval according to the present embodiment will be described in detail with reference to FIG. 5.

FIG. 5 is a diagram for describing the virtual distance interval according to the present embodiment. The virtual distance interval indicates a (psychological) interval (sense of distance) with the communication partner (co-worker), but more specifically, it may be the distance with the communication partner via the window display 133, for example. More specifically, as illustrated in FIG. 5, a size (table distance Td) of the table (table display 131) corresponding to the work area of the user may be set as a reference. In this case, as illustrated in the upper part of FIG. 5, the size of the table display 131 is a shortest virtual distance interval v0. In the virtual distance interval v0, the work area (corresponding to the size of the table display 131A) of the user A and the work area (corresponding to the size of table display 131B) of the user B completely overlap, and the entire surface of the table display 131 becomes the shared area. In this specification, the shared area is an area where the display image at least partially included in the area is regarded as a shared object. In addition, the shared area can be referred to as an area (area where both users can be used as the work area) where the work areas of each user overlap. The shared object is an object in which the user input from both the user and the communication partner is valid (in other words, can be operated). In the present embodiment, the display image at least partially included in the shared area (it can be said that the display is made in the shared area, that is, the display extends to in at least a work area of the other party) is regarded as a shared object. On the other hand, an object that only one user can input can be referred to as a private object of the user.

When the virtual distance interval v0 is set, the window display 133 displays the video image 22 of the communication partner (preferably a video image of an upper body that fits a height of the table) as illustrated in FIG. 1, and the display of window display 133 is in a state in which the communication partner looks like surrounding one communication table (table display 131).

Note that the overlapping entire range is described as the shared area here as an example, but the present embodiment is not limited thereto, and any part of the window display 133 may be the shared area.

Further, the virtual distance interval can be a distance (virtual distance interval v1) in which the table displays 131A and 131B are arranged as illustrated in the middle part of FIG. 5. In this case, the size of the shared area can be set to any size including an end portions (the side where the window display 133 is installed) where the table displays 131A and 131B are adjacent to each other. The shared area on the communication partner side (for example, the shared area on the table display 131B viewed from the user A side) is virtually represented on the display screen of the window display 133. A display example when the virtual distance interval v1 is set will be described later with reference to FIGS. 11 to 14.

Further, the virtual distance interval can be a distance (virtual distance interval v2) in which the table displays 131A and 131B are arranged as illustrated in a lower part of FIG. 5. In this case, for example, the space between the table displays 131A and 131B is used as the shared area. In this specification, the shared area provided between the table displays 131A and 131B is referred to as a middle space. The size of the middle space can be set arbitrarily. In addition, in addition to the middle space, a part of the area including the end portion (on the side where the window display 133 is installed) on the table may also be set as the shared area as illustrated in the middle part of FIG. 5. The middle space is virtually represented on the display screen of the window display 133. The display example when the virtual distance interval v2 is set will be described later with reference to FIGS. 15 and 16.

An example of the virtual distance interval has been specifically described above. Note that the shape of the shared area is not limited to the rectangle illustrated in FIG. 5, and the shared area may have any shape. Further, any boundary shape such as a curved line may be used regardless of the shapes of the table display 131A and the table display 131B.

The shared area determination unit 103 refers to the set virtual distance interval to determine the shared area. For example, in the case of the virtual distance interval v0 illustrated in the upper part of FIG. 5, the shared area determination unit 103 may determine the entire area of the window display 133 as the shared area, or may set a part of the area as the shared area by user designation. In addition, for example, in the case of the virtual distance interval v1 illustrated in the middle part of FIG. 5, the shared area determination unit 103 determines, as the shared area, an arbitrary size (for example, by default setting or user designation) including the end portion (the side where the window display 133 is installed) where the table displays 131A and 131B are adjacent to each other. In addition, for example, in the case of the virtual distance interval v1 illustrated in the middle part of FIG. 5, the shared area determination unit 103 determines that the space between the table displays 131A and 131B is the shared area (middle space).

The shared object selection unit 104 selects a shared object among objects displayed on the window display 133 according to the shared area. The shared object is an object in which the user input from both the user and the communication partner is valid (in other words, can be operated) as described above. Specifically, the shared object selection unit 104 regards, as the shared object, the display image at least partially included in the shared area among the objects displayed on the window display 133. Since a display position of each object is arbitrarily changed by the user's touch operation, the shared object selection unit 104 regards the object as a shared object while the object is displayed at the position where the object is in the shared area, and when the object is out of the shared area, the object is excluded from the shared objects (that is, the object is regarded as the private object that can be operated only by a user who has the work authority of the area currently displayed).

The display control unit 105 performs display control to output interaction from the application with respect to the user input. Specifically, the display control of the table display 131 or the window display 133 is performed according to the user input information recognized by the input information recognition unit 101, the information on the virtual distance interval set by the virtual distance interval setting unit 102, the information on the shared object selected by the shared object selection unit 104, various information (user input information, video image of the communication destination, and the like) received from the communication destination apparatus by the communication unit 110, and the like.

For example, the display control unit 105 performs the display control of the table display 131 by the table display control unit 106. The table display 131 displays, for example, a user's private object or the shared object with the communication partner.

In addition, the display control unit 105 performs the display control of the window display 133 by the window display control unit 107. For example, the video image of the communication partner, an image of a virtual table (the shared object or the private object of the other party can be displayed on the virtual table), and the middle space (shared object is included) are displayed on the window display 133.

The voice output control unit 108 controls a voice output from a speaker 135. For example, the voice output control unit 108 outputs the voice information of the other party side received from the communication destination apparatus by the communication unit 110.

2-2. Communication Unit 110

The communication unit 110 is a connection device for connecting the information processing apparatus 10 and another device. The communication unit 110 is connected to the network 3 by a wired or wireless manner, for example, and transmits/receives data to/from the communication destination apparatus (information processing apparatus 10). The communication unit 110 is connected to the network 3 by, for example, a wired/wireless local area network (LAN), Wi-Fi (registered trademark), Bluetooth (registered trademark), a mobile communication network (long term evolution (LTE)), a third generation (3G) mobile communication system, and the like.

2-3. Input Unit 120

The input unit 120 acquires the input information to the information processing apparatus 10. For example, the input unit 120 includes the sensor unit 121, the camera 123, and the microphone 125. The sensor unit 121 may include, for example, a touch sensor, a pressure sensor, a proximity sensor, an infrared light receiving unit, an ultrasonic sensor, a depth camera, a thermo camera, an RGB camera, or the like, and may include an operation input unit that is formed by a physical configuration such as a button, a switch, and a lever. The camera 123 captures a video image of a user who is performing an operation input on the table display 131 or the window display 133. The microphone 125 senses voice information such as a voice uttered by the user.

2-4. Output Unit 130

The output unit 130 presents the output information from the information processing apparatus 10 to the user. For example, the output unit 130 includes the table display 131, the window display 133, and the speaker 135. The speaker 135 outputs voice information such as an uttered voice of the other party received from the communication destination.

2-5. Storage Unit 140

The storage unit 140 is implemented by a read only memory (ROM) that stores programs used for the processing of the control unit 100, operation parameters, and the like, and a random access memory (RAM) that temporarily stores parameters that change as appropriate.

In addition, the storage unit 140 stores the virtual distance interval, the information on the shared object, a screen history in the table display 131 or the window display 133, and the like.

The configuration of the information processing apparatus 10 according to the present embodiment has been specifically described above. Note that the configuration of the information processing apparatus 10 is not limited to the example illustrated in FIG. 4. For example, the information processing apparatus 10 may be configured by a plurality of devices. Further, at least a part of each function of the control unit 100 of the information processing apparatus 10 may be implemented by an external device (for example, smartphone, tablet terminal, PC, server, and the like).

3. Operation Processing

Figure 6:
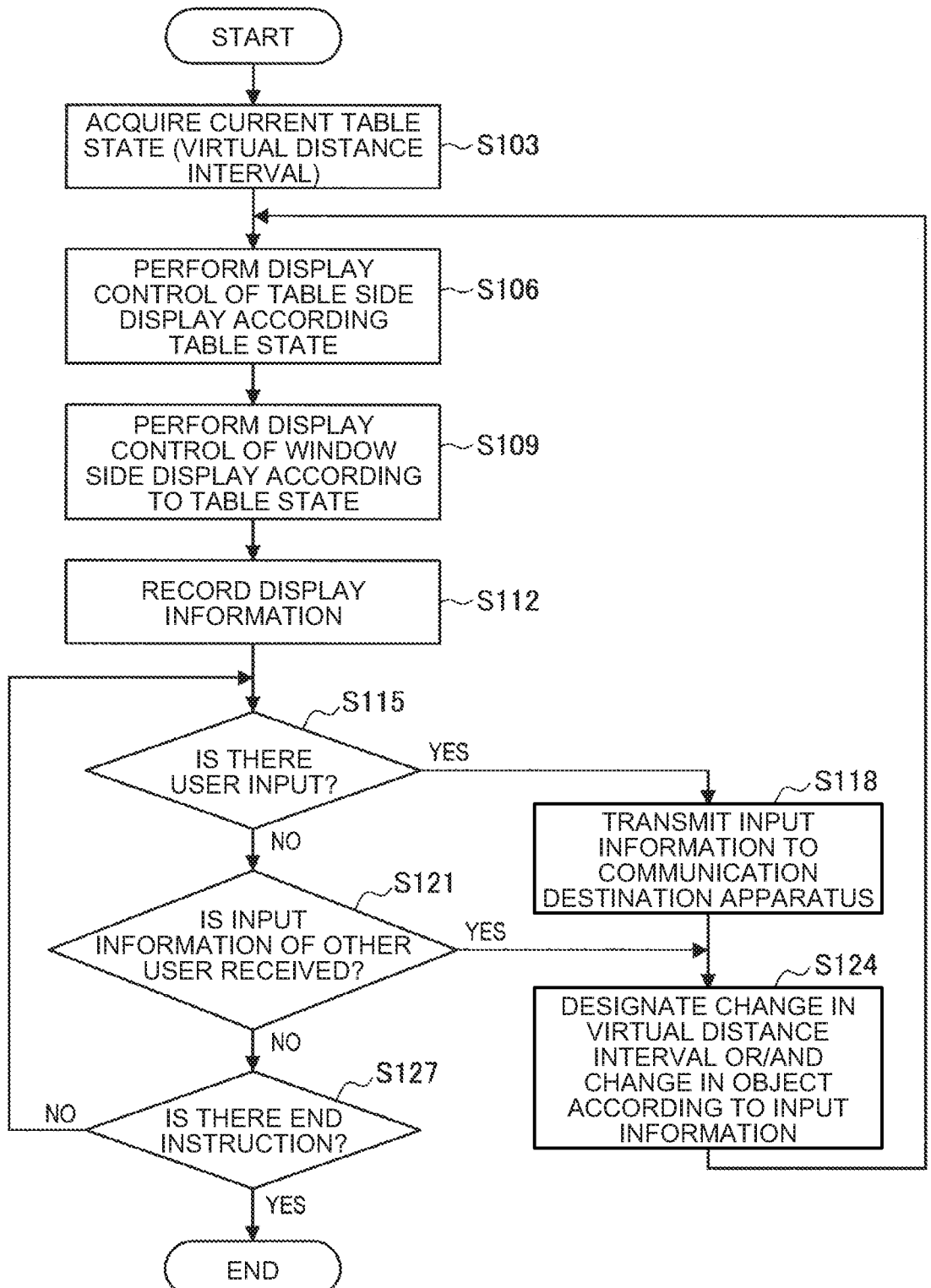
FIG. 6 is a flowchart illustrating an example of a series of flows of display control processing according to the present embodiment.

Next, the operation processing of the information processing system according to the present embodiment will be specifically described with reference to FIG. 6. FIG. 6 is a flowchart illustrating an example of a series of flows of display control processing according to the present embodiment.

As illustrated in FIG. 6, first, the display control unit 105 of the information processing apparatus 10 acquires a current table state (step S103). The current table state is the setting of the virtual distance interval or the setting of the shared area. Specifically, for example, it is acquired whether the current table state is a state in which one table is shared as illustrated in the upper part of FIG. 5, a state in which the work area is expanded by arranging two tables as illustrated in the middle part of FIG. 5, a state in which the middle space is provided between the two tables as illustrated in the lower part of FIG. 5, or the like.

Next, the table display control unit 106 performs the display control of the table display 131 according to the acquired table state (step S106). For example, the table display control unit 106 displays the shared object in the shared area on the table display 131, and performs the display control of the shared object according to the input operation to the shared object by the user or the communication partner.

In addition, the window display control unit 107 performs the display control of the window display 133 according to the acquired table state (step S109). For example, the window display control unit 107 controls to display only the video image of the communication partner on the window display 133 when one table is shared as illustrated in the upper part of FIG. 5. Further, when two tables are arranged side by side to expand the work area as illustrated in the middle part of FIG. 5, the window display control unit 107 (generates and) displays, on the table display 131, the image of the virtual table (called the virtual table) in which the display surface of the window display 133 looks like extending, and furthermore performs the display control to arrange the video image of the communication partner on the virtual table. The shared object or the private object of the other party can be displayed on the virtual table. Further, the display on the virtual table is controlled to be the same as the display on the actual table display 131 at the communication destination. The user can see the table top on the communication partner side via the window display 133. Further, when the middle space as illustrated in the lower part of FIG. 5 is displayed, the window display control unit 107 performs the display of the middle space with the virtual table of the other party side on the table display 131.

Note that the video image of the virtual table is not limited to the generated image, and may be a captured image of the actual table display 131 on the other party side.

Next, the control unit 100 records the display information in the storage unit 140 (step S112). The display information may be recorded continuously or periodically (automatic backup). Further, the recorded data may be tagged at the timing designated by the user.

Then, when there is a user input such as the operation input by the user to the shared object or an instruction to change the virtual distance interval (step S115/Yes), the control unit 100 controls the acquired input information to be transmitted to the information processing apparatus 10 (communication destination apparatus) of the communication partner destination (step S118). Further, the control unit 100 may control to continuously transmit the current display information on the table to the communication destination apparatus.

Then, the control unit 100 designates the change in the virtual distance interval, or/and the change in (the display position of) the object according to the user input information or the input information (step S121) on the other party side received from the communication destination apparatus (step S124). The virtual distance interval can be appropriately changed by the user or the other user, and the control unit 100 appropriately changes the display content of the table display 131 and the window display 133 when the virtual distance interval is changed. Further, in the case of the operation input (the change in the display position, and the like) from the user or the other user to the shared object, the control unit 100 updates the display of the shared object displayed on the table display 131 or the window display 133 (steps S106 to S112).

Then, the control unit 100 repeats the above processing until the end instruction is given (step S127). As a result, it is possible to reflect the operation input by the other party on the display of the table display 131 or the window display 133 and also reflect the operation input by the user on the table display 131 or the window display 133 on the display of the other party side, thereby realizing two-way communication.

Hereinabove, an example of the operation processing according to the present embodiment has been described. Note that the operation processing illustrated in FIG. 6 is an example, and the present disclosure is not limited to the example illustrated in FIG. 6. For example, the present disclosure is not limited to an order of steps illustrated in FIG. 6. At least one of the steps may be processed in parallel or may be processed in reverse order. For example, the processing of steps S106 to S112 may be processed in parallel, or may be processed in the reverse order.

Further, all the processing illustrated in FIG. 6 may not necessarily be executed. For example, the recording processing illustrated in step S112 may be skipped

4. Display Example

Next, display screen examples of the table display 131 and the window display 133 in the presentation of the joint work space according to the present embodiment will be specifically described with reference to the drawings.

4-1. First Display Example (One Table is Shared)

First, a case where one table is shared will be described as a first display example with reference to FIGS. 7 to 10. Here, as an example, a case will be described where the information processing apparatus 10A existing in the space A and the information processing apparatus 10B existing in the space B are communicatively connected and the user A and the user B perform the joint work.

FIG. 7 is a diagram illustrating a display screen example of the user A side in a first display example. The example illustrated in FIG. 7 is the display screen examples of the table display 131 and the window display 133 when one table (table display 131) illustrated in the upper part of FIG. 5 is shared. In this case, as illustrated in FIG. 7, the information processing apparatus 10A displays the video image 22 of the user B on the window display 133A and an object 201A (objects 201*a* to 201*e*) on the table display 131A. As illustrated in a top view in the lower right of FIG. 7, when the entire table is the shared area, all the objects 201*a* to 201*e* displayed on the table display 131A are shared objects. On the other hand, an object is similarly arranged on the table display 131B on the user B side, and when the user A operates the object 201*b* on the table display 131A, the operation is reflected on the corresponding object displayed on the user B side.

Figure 8:
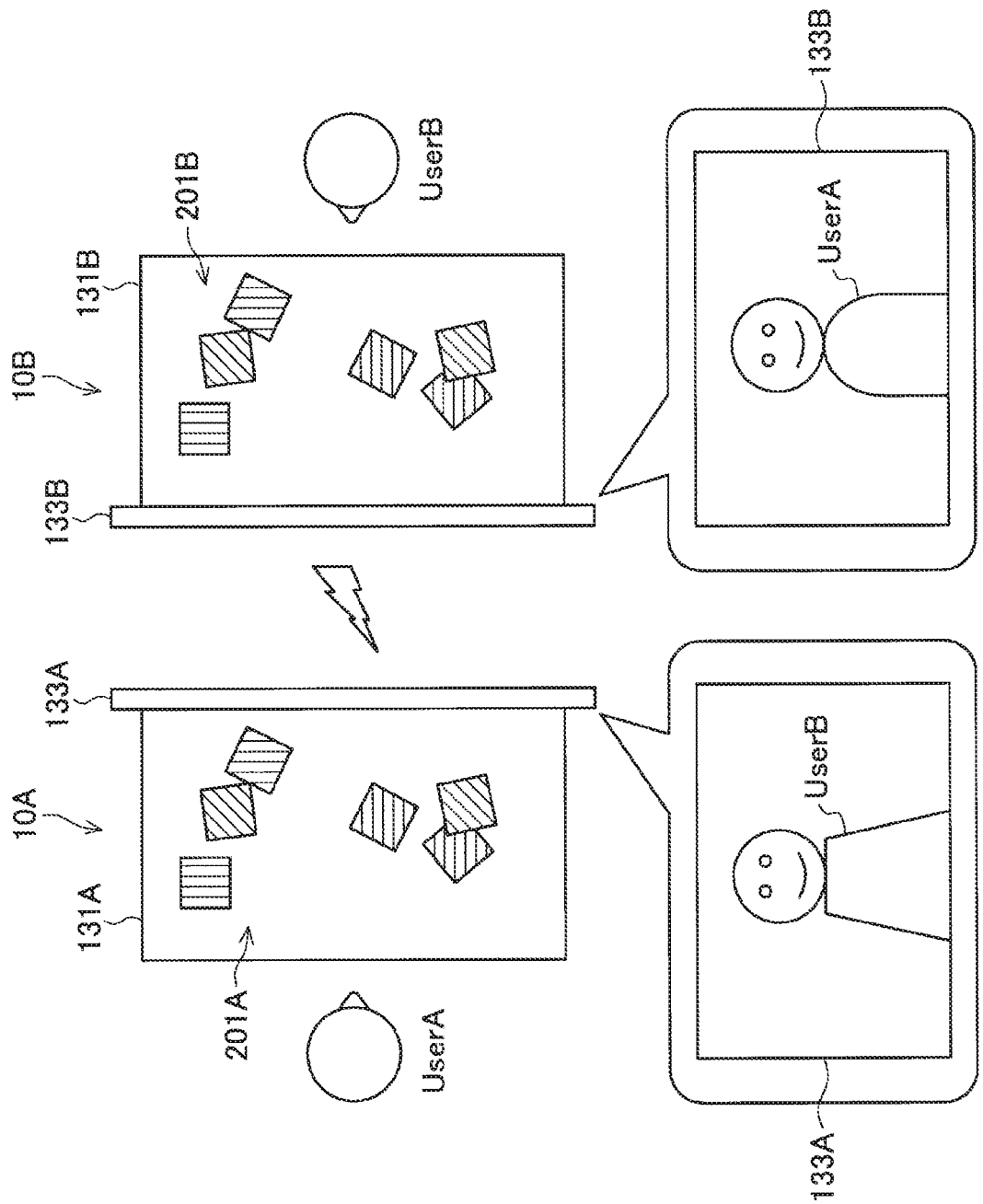
FIG. 8 is a diagram illustrating display screen examples of each information processing apparatus in the first display example of the present embodiment.

Next, the actual display states on the user A side and the user B side will be described with reference to FIG. 8. FIG. 8 is a diagram illustrating a display screen example of the information processing apparatus 10A and the information processing apparatus 10B in the first display example. In this display example, in order to represent the state in which the user A and the user B are looking at one table facing each other, for example, as illustrated in FIG. 8, the arrangement of the object 201A displayed on the table display 131A and the arrangement of the object 201B displayed on the table display 131B are displayed and controlled to correspond to each other. Specifically, for example, in the table display 131 facing the user, when the direction in which the window display 133 is positioned is an upward direction, the arrangement (entire screen) of the objects on the user A side and the user B side is displayed and controlled so that a horizontal direction (x-axis direction) and a vertical direction (y-axis direction) are reversed (coordinate conversion). Further, the video image of the user B is displayed on the window display 133A, and the video image of the user A is displayed on the window display 133B. Then, the user operation for the object that is regarded as the shared object (when the entire area of the table display 131 is set to the shared area, all objects are the shared objects) among the objects 201 displayed on each table is also reflected on the display of the other party sides to each other. As a result, the user A and the user B can feel as if the user A and the user B are performing the joint work by surrounding one table (table display 131) with the other party in the same space.

Note that a private area may be set in a part of the table display 131. The object displayed in the private area is regarded as the private object that can be operated only by the user and is not displayed on the other party side.

Figure 9:
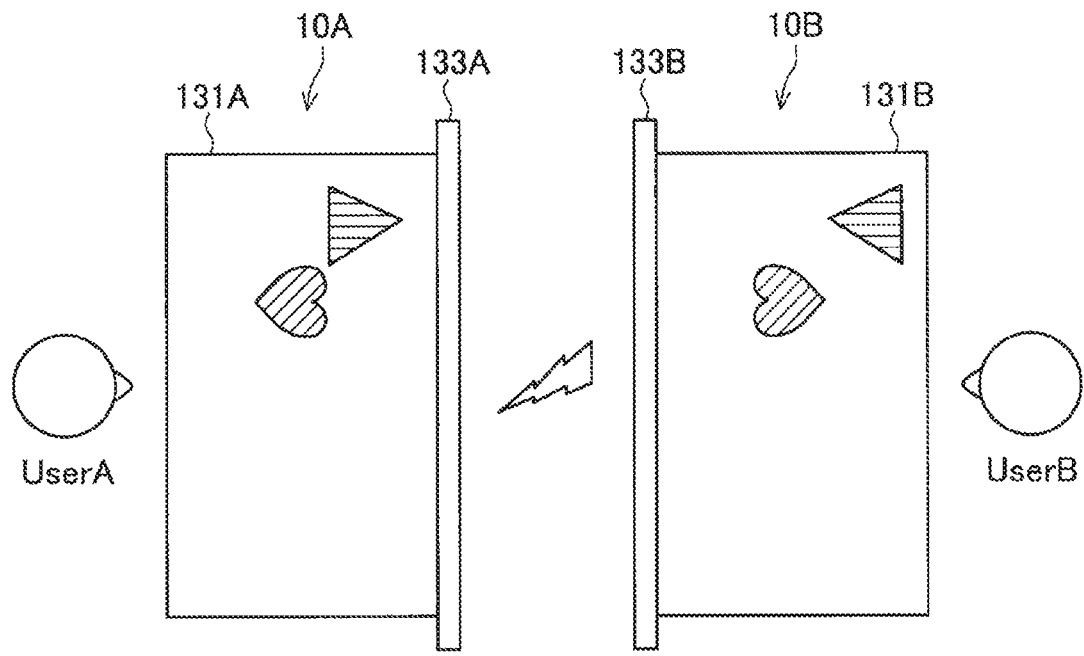
FIG. 9 is a diagram illustrating another example of display patterns of objects on tables in the first display example of the present embodiment.

Further, the display method of the shared object is not limited to the example illustrated in FIG. 8. For example, as illustrated in FIG. 9, after the arrangement (entire screen) of the objects is reversed in the left-right direction, the display may be controlled so that an orientation of each object becomes positive against a user (operator) (in the predetermined positive direction set in each table). Further, for example, as illustrated in FIG. 10, the arrangement (entire screen) of the objects may not be reversed, but the vertical direction may be reversed so that the orientation of each object is positive with respect to the user.

Figure 10:
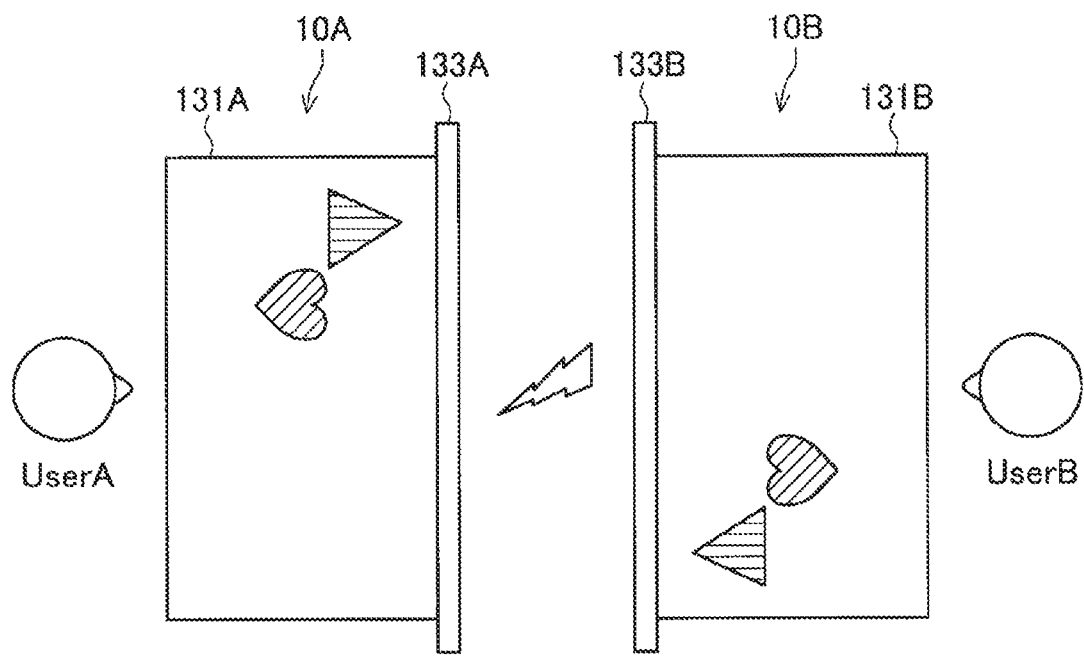
FIG. 10 is a diagram illustrating another example of display patterns of objects on tables in the first display example of the present embodiment.

Display patterns illustrated in FIGS. 8 to 10 described above can be switched appropriately and instantly by the user designation.

4-2. Second Display Example (Table Expansion)

Figure 12:
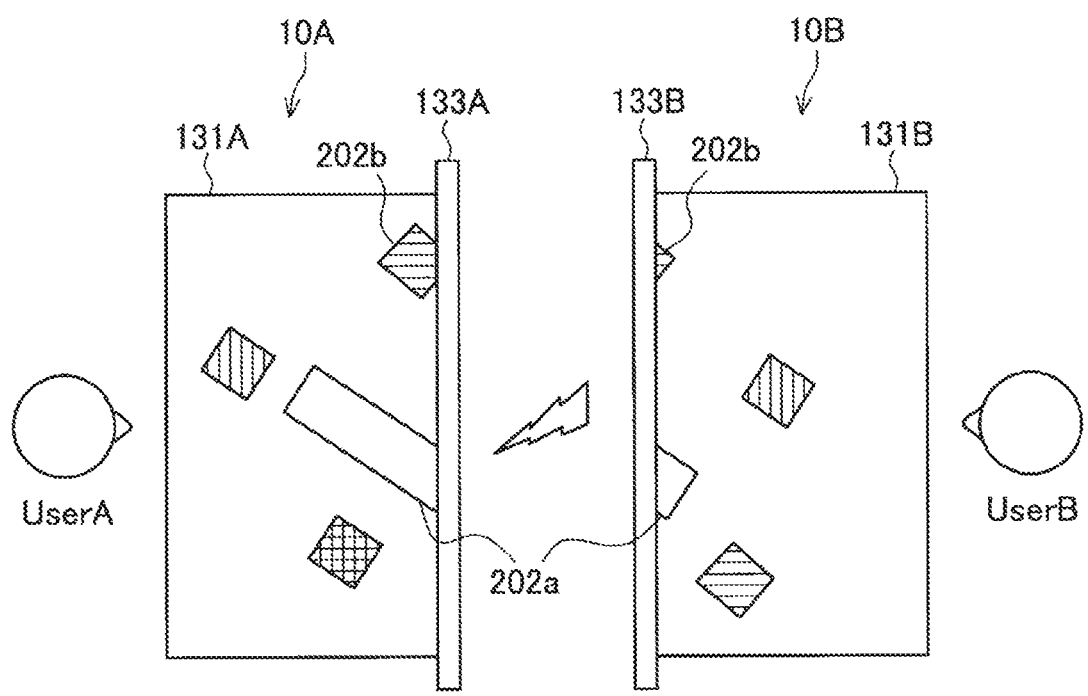
FIG. 12 is a diagram illustrating display screen examples of each information processing apparatus in the second display example of the present embodiment.

Next, as a second display example, the presentation of the joint work space in which the work area (table) of the table display 131 appears to be expanded by displaying a virtual table on the window display 133 will be described with reference to FIGS. 11 and 12.

FIG. 11 is a diagram illustrating a display screen example of the user A side in the second display example. As illustrated in an image top view illustrated in the lower right of FIG. 11, the example illustrated in FIG. 11 is the display screen examples of the table display 131A and the window display 133A when two tables (table display 131A and table display 131B) are arranged and the work area is expanded. Here, an object displayed over both tables is regarded as a shared object.

Specifically, the expansion of the work area can be realized by displaying a virtual table 133*b* corresponding to the window display 133B on the window display 133A, as illustrated in FIG. 11. The user A can visually recognize the object displayed on the virtual table 133*b*. The display on the virtual table 133*b* is the same as the window display 133B on the user B side. Here, note that the table corresponding to the window display 133B is referred to as a "virtual table" on the assumption that the table is drawn by the information processing apparatus 10A, but a captured image of the window display 133B actually imaged in the space B may be displayed without being limited thereto.

Further, the window display 133A is the work area of the user A and the window display 133B (virtual table 133*b*) is the work area of the user B, but among the respective objects displayed on the window display 133A and virtual table 133*b*, the object (that is, an object whose display at least extends to the work area of the other party) whose display is performed over both tables via the window display 133A is regarded as the shared object. Therefore, in the example illustrated in FIG. 11, objects 202a and 202b are shared objects, and both objects can be operated. When an object cannot be operated while displayed on the user B side, the user B may be requested to move the object on the table to the user A by a swipe operation or the like.

Next, the actual display states on the user A side and the user B side will be described with reference to FIG. 12. FIG. 12 is a diagram illustrating the display screen examples of the information processing apparatus 10A and the information processing apparatus 10B in the second display example. As illustrated in FIG. 12, the display of the table display 131A and the display of the table display 131B are displays connected via the window display 133 (window displays 133A and 133B). Further, the objects 202a and 202b displayed over both tables via the window display 133 are regarded as the shared objects as described above, and can be operated by both users.

4-3. Third Display Example (Set Shared Area in Part on Table)

Figure 14:
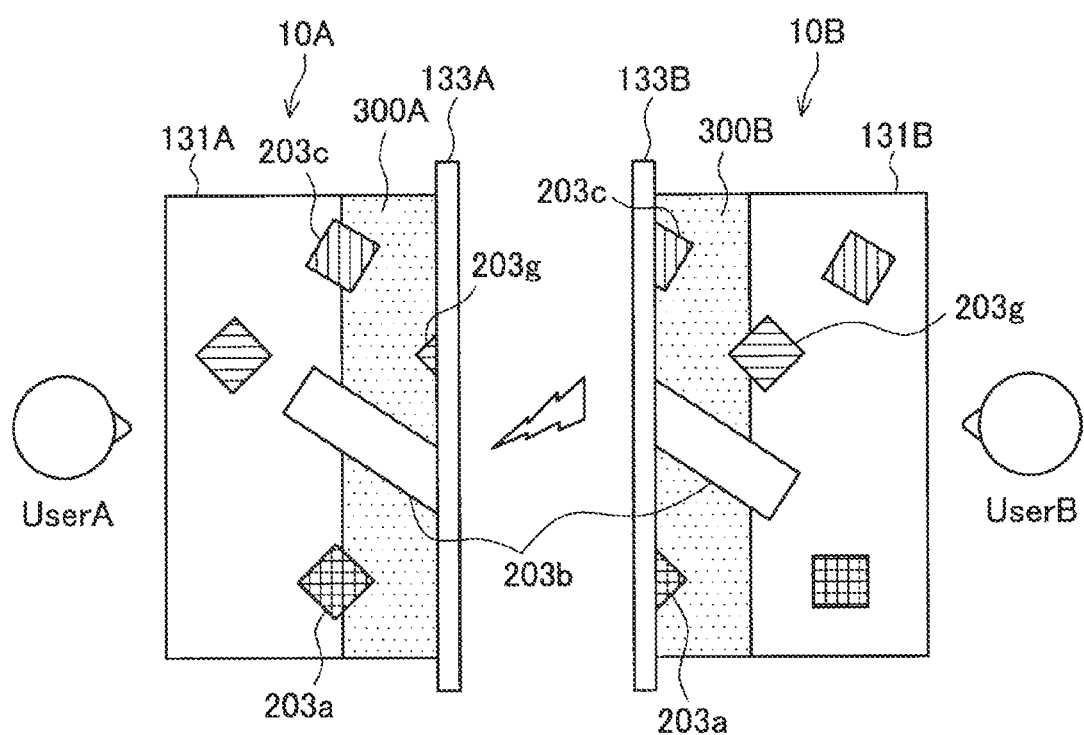
FIG. 14 is a diagram illustrating examples of display screens of each information processing apparatus in the third display example of the present embodiment.

Next, as a third display example, the presentation of the joint work space sharing a part while expanding the table will be described with reference to FIGS. 13 and 14.

FIG. 13 is a diagram illustrating the display screen example on the user A side in a case where the shared area is set on a part of the table in the third display example. The example illustrated in FIG. 13 assumes a table state in which two tables (table display 131A and table display 131B) partially overlap each other, as illustrated in the image top view in the lower right of FIG. 13, and corresponds to the example illustrated in a middle part of FIG. 5. In this case, a portion where the tables overlap, that is, an area where the work areas of both tables overlap is set as the shared area 300, and an object whose display area is at least partially included in the shared area 300 is regarded as a shared object.

As illustrated in FIG. 13, the virtual table 133b corresponding to the work area on the user B side is displayed on the window display 133A. Further, the information processing apparatus 10A displays the virtual table 133b on the side where the display surface of the table display 131A is positioned in the display area of the window display 133A, and gives the visual effect that the virtual table 133b appears to be adjacent to the display surface of the table display 131A (extend the display surface). In addition, the display on the virtual table 133b corresponds to the display of the window display 133B on the user B side. That is, the display screen of the window display 133B is reproduced on the virtual table 133b based on the display information of the window display 133B.

Further, the information processing apparatus 10A sets a shared area 300A on the side adjacent to the window display 133A in the display surface of the table display 131A. The information processing apparatus 10A may clearly indicate the shared area 300A to the user by displaying a background color, a boundary line, or the like. In addition, the shared area 300A is adjacent to the shared area 300b included in the work area (virtual table 133b) on the user B side displayed on the window display 133A. Here, it is assumed that the shared area 300A and the shared area 300b are the portions where the two tables (table displays 131A and 131B) overlap as illustrated in the image top view in the lower right of FIG. 13, so the shared area 300A and the shared area 300b are displayed and controlled to overlap (same display screen).

Next, the actual display states on the user A side and the user B side will be described with reference to FIG. 14. FIG. 14 is a diagram illustrating the display screen examples of the information processing apparatus 10A and the information processing apparatus 10B in the third display example. As illustrated in FIG. 14, the shared areas 300A and 300B are set in the table display 131A and the table display 131B, respectively, and the display content of the shared areas 300A and 300B is the same.

4-4. Fourth Display Example (Middle Space)

Next, as a fourth display example, the presentation of the joint work space for expanding the work area of the user by providing a virtual space (referred to as "middle space" in this specification) between both tables as the shared area will be described with reference to FIGS. 15 and 16.

Figure 15:
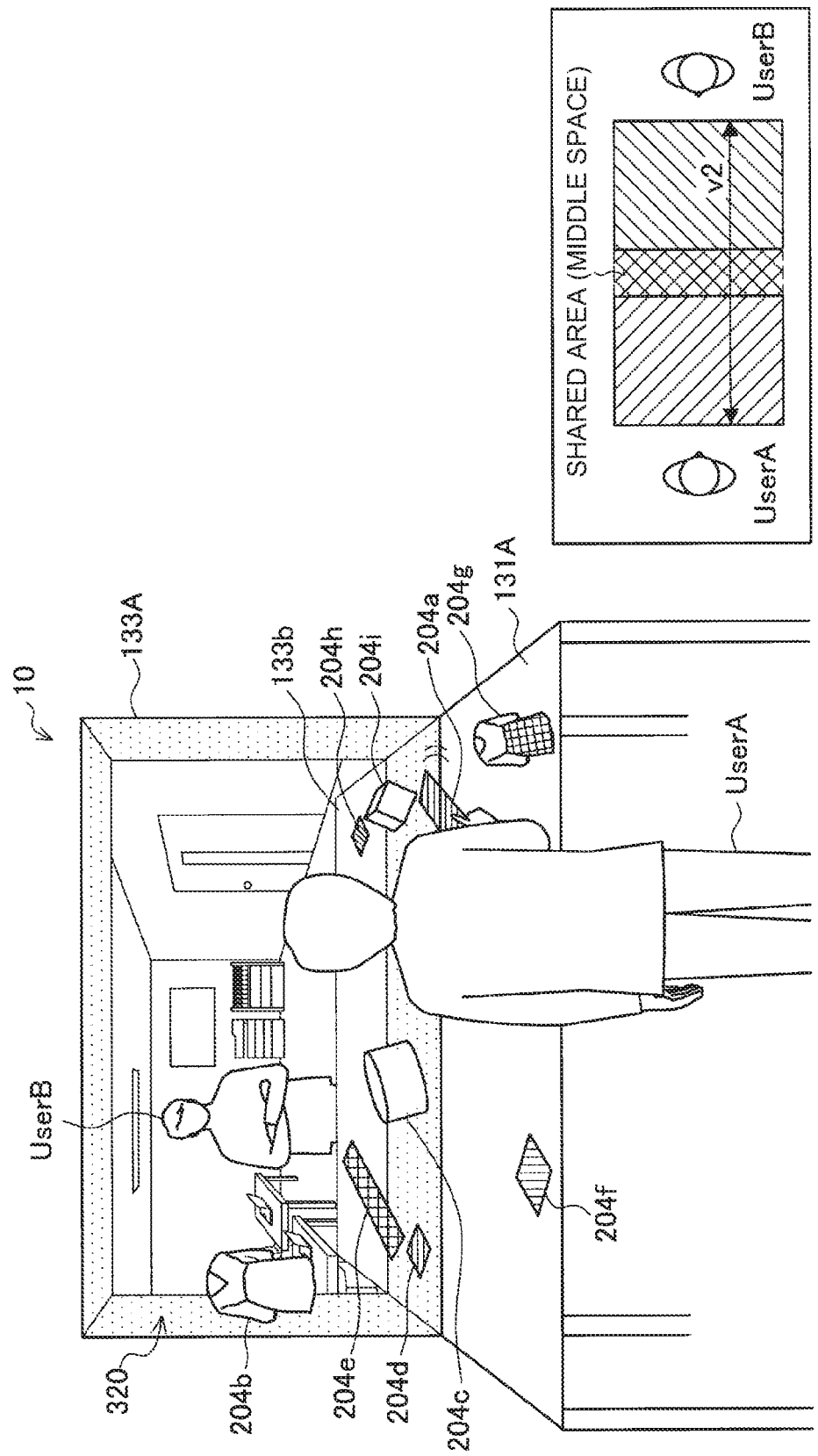
FIG. 15 is a diagram illustrating a display screen example on a user A side in a fourth display example of the present embodiment.
Figure 16:
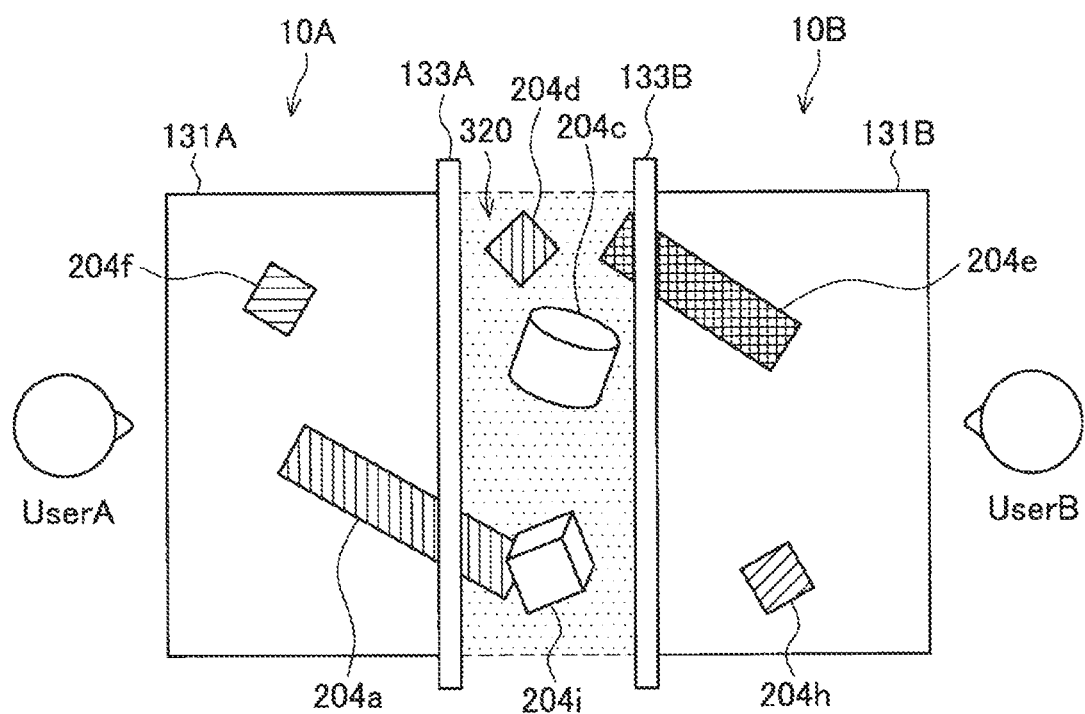
FIG. 16 is a diagram illustrating examples of display screens of each information processing apparatus in the fourth display example of the present embodiment.

FIG. 15 is a diagram illustrating the display screen example of the user A side in the fourth display example. The example illustrated in FIG. 15 is the display screen examples of the table display 131A and the window display 133A when a shared area space (three-dimensional middle space 320) is provided between two tables (table display 131A, table display 131B) as illustrated in the image top view illustrated in the lower right of FIG. 15. Here, the object displayed in the middle space 320 and the object including at least a part of the display area in the middle space 320 are regarded as a shared object.

In addition, in the present display example, the display area of the table display 131A is an area that can be operated only by the user (the work area of the user), and the object that is not displayed in the middle space 320 on the table display 131A is regarded as a private object. In addition, the middle space 320 is displayed on the window display 133A, and the virtual table 133b and the video image of the user B are displayed on a back side of the middle space 320 as the video image of the communication partner destination. As a result, it is possible to present the user A with a visual effect as if the user A is looking at the middle space 320 facing the user B. In the virtual table 133b, the display screen of the window display 133B is reproduced on the user B side.

Here, in the present specification, the object is not limited to a two-dimensional image and may be a three-dimensional image. In the middle space 320, for example, three-dimensional objects 204b, 204c, 204i are displayed floating, and two-dimensional objects 204a, 204d, 204e are displayed on a bottom surface of the middle space 320. All of the above objects are displayed in the middle space 320 which is the shared area, and therefore can be regarded as a shared object and can be operated by both user A and user B. Also, when these objects whose display positions move, for example, to the work area of the user A (on the table display 131A) by the user operation and deviate from the display area of the middle space 320, these objects are regarded as the private objects of the user A, and only the user A may be operated. In addition, the user B can also move the object displayed in the middle space 320 to the work area (on the table display 131B) of the user B. In this case, the object may be regarded as the private object of the user B and only the user B may be operated. The movement to the work area (on the table display 131B) of the user B can be visible from the window display 133A from the user A side (specifically, the object appears to move to the virtual table 133b of the window display 133A). In this way, according to the operation of each user, the object can seamlessly (that is, without interruption) move between the table display 131A, the middle space 320 of the window display 133A, and the virtual table 133b (the work area of the other party side), and the convenience of the joint work is improved.

The size of the middle space 320 can be adjusted by appropriately changing the interval from the other party, that is, the virtual distance interval by the user designation. When an instruction to widen the virtual distance interval is given, it can feel that the depth direction of the middle space 320 extends, the middle space 320 becomes wide, the video image of the user B displayed on the other side of the middle space 320 becomes small, and the interval from the other party becomes wide. On the other hand, it can feel when an instruction to narrow the virtual distance interval is given, it can feel that the depth direction of the middle space 320 becomes short, the middle space 320 becomes narrow, the video image of the user B displayed on the other side of the middle space 320 becomes large, and the interval from the other party becomes close.

Next, the actual display states on the user A side and the user B side will be described with reference to FIG. 16. FIG. 16 is a diagram illustrating the display screen examples of the information processing apparatus 10A and the information processing apparatus 10B in the fourth display example. In the present embodiment, it is assumed that there is the middle space 320 between the table display 131A and the table display 131B, and the display control is performed so that the displays of the table display 131A and the table display 131B are connected via the middle space 320. Here, for example, since at least a part of the display is made on the middle space 320 which is the shared area, the objects 204a and 204e are recognized as shared objects that can be displayed and controlled by the user A and the user B. The display positions or display sizes of each object can be appropriately changed by the user.

(Display Pattern Using Middle Space 320)

Next, the display pattern using the middle space 320 will be described with reference to FIGS. 17 to 20.

Figure 17:
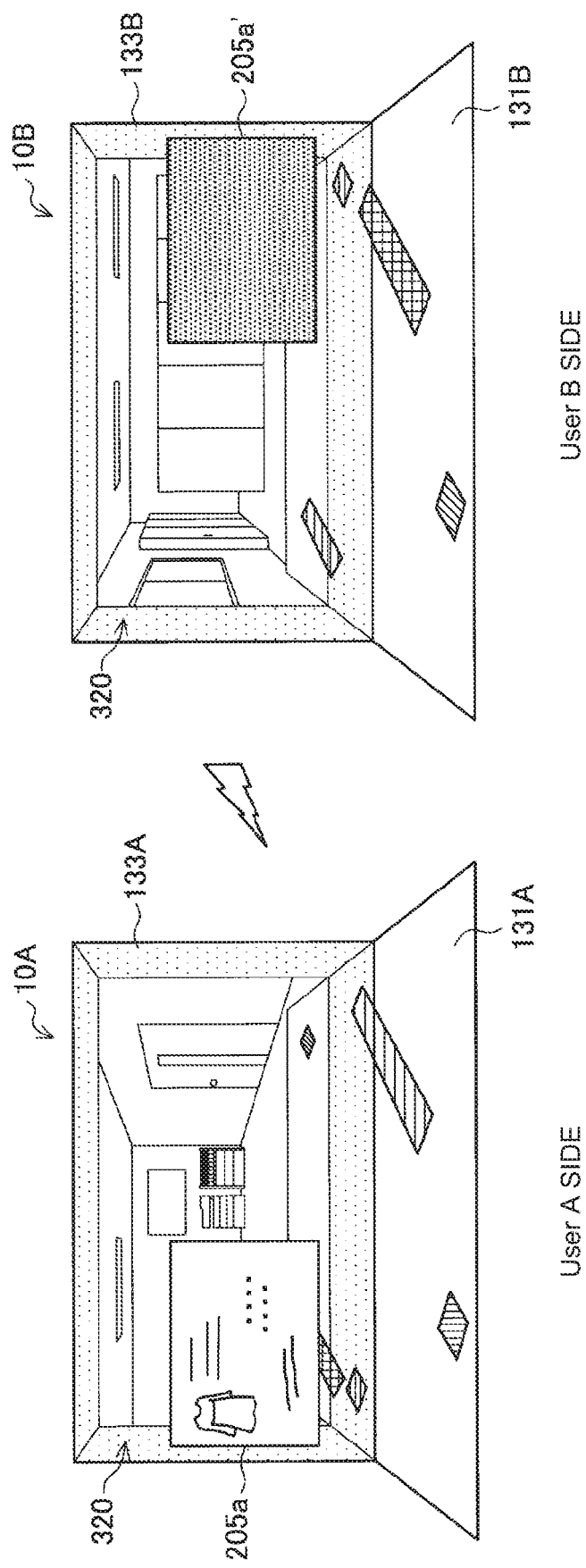
FIG. 17 is a diagram for describing a display pattern using a middle space in the fourth display example of the present embodiment.

As illustrated in FIG. 17, it is possible to make the object visible on only one side by using the middle space 320. Specifically, for example, when the two-dimensional object 205a is displayed to be attached to a front side of the middle space 320 in the window display 133A, the object 205a may be visible only from the user A side. That is, the display corresponding to the object 205a may be hidden in the window display 133B on the user B side, or may be a backside display 205a' as illustrated in FIG. 17.

Figure 18:
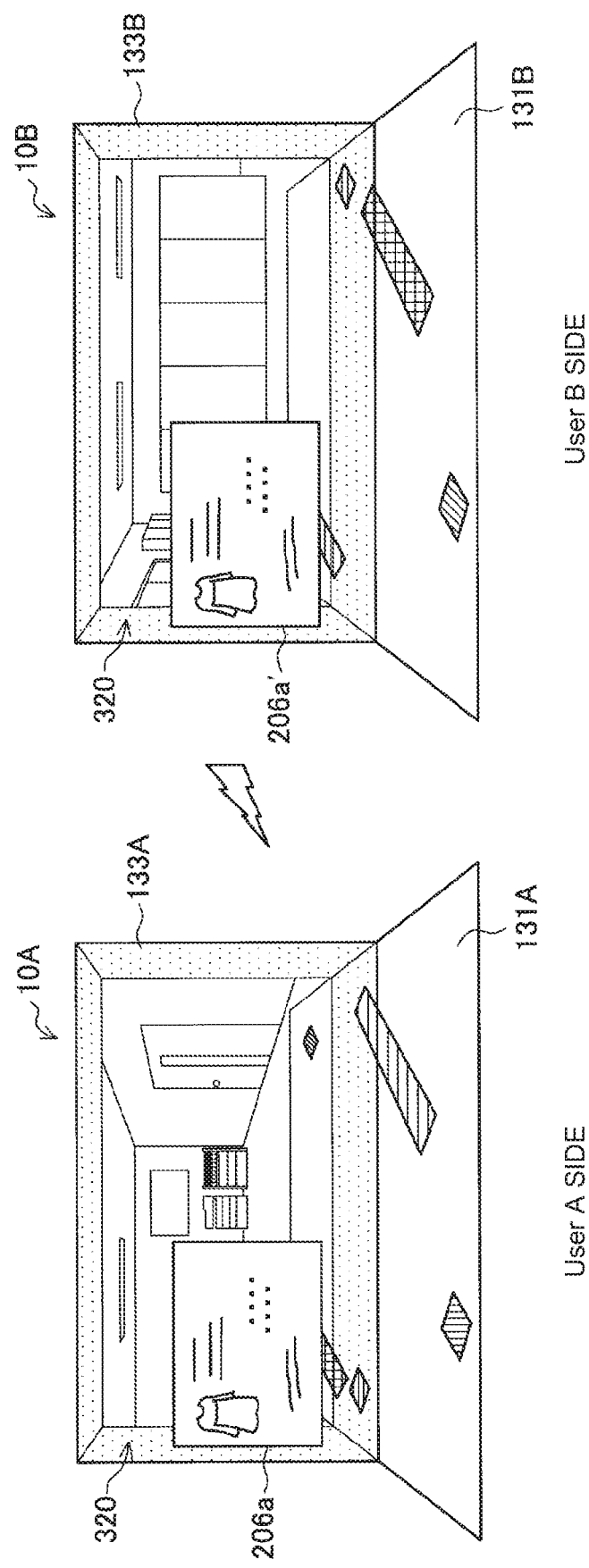
FIG. 18 is a diagram for describing the display pattern using the middle space in the fourth display example of the present embodiment.

Further, as illustrated in FIG. 18, the same object may be displayed on both the user A side and the user B side. Specifically, for example, when the two-dimensional object 206a is displayed to be attached to the front side of the middle space 320 in the window display 133A, the same object 206a' may be displayed at the same coordinates even in the window display 133B on the user B side.

Figure 19:
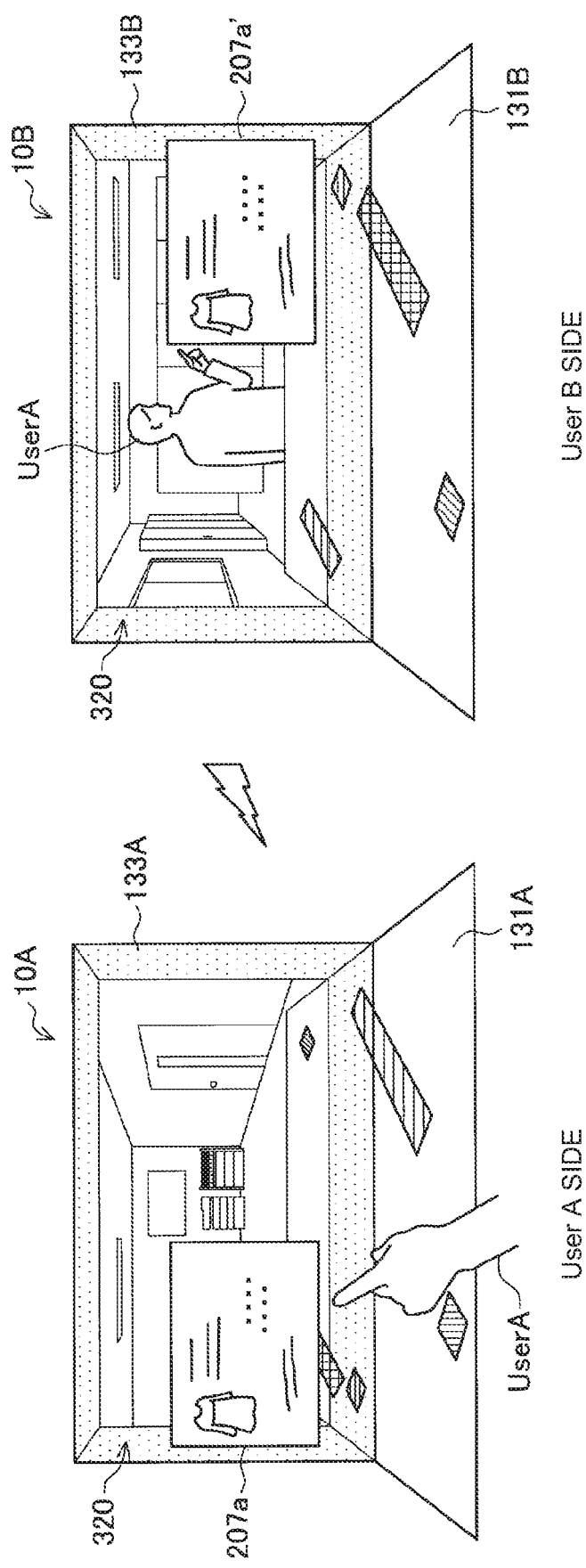
FIG. 19 is a diagram for describing the display pattern using the middle space in the fourth display example of the present embodiment.

In the example illustrated in FIG. 18, the display coordinates of the object 206a in the window display 133A and the window display 133B are the same, but the present invention is not limited thereto, the display position may be reversed as illustrated in FIG. 19. That is, for example, in the window display 133A, when the two-dimensional object 207a is displayed to be attached to the front side of the middle space 320, an object 207a' is displayed on the window display 133B on the user B side so that the object 207a' is at the same position while facing the user A side via the middle space 320 in the window display 133B. Thereby, for example, when the user A points to the object 207a, the user B side also displays the object 207a' corresponding to the position pointed to by the user A within the window display 133B, so that both parties can more smoothly perform work.

Figure 20:
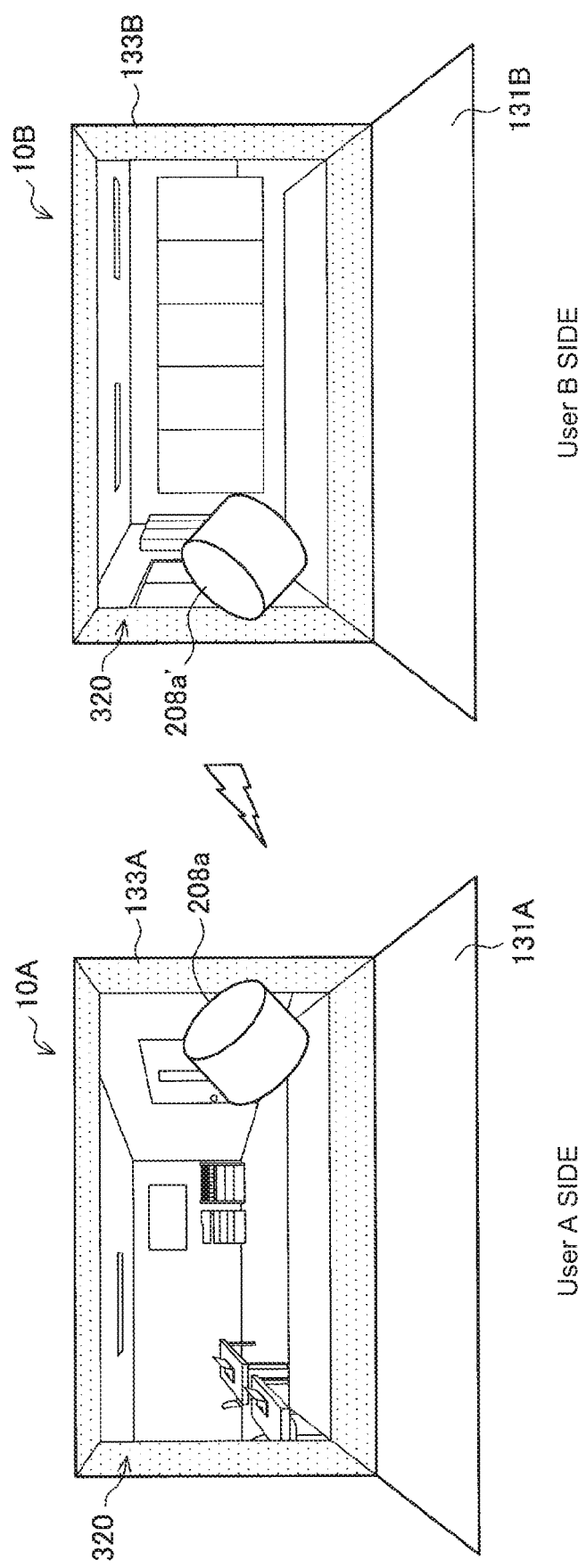
FIG. 20 is a diagram for describing the display pattern using the middle space in the fourth display example of the present embodiment.

Further, as illustrated in FIG. 20, when the three-dimensional object 208a is displayed in the middle space 320, the display position may be a face-to-face state via the middle space 320.

Although some display patterns using the middle space 320 have been described above, the display method may be different between the user A side and the user B side.

(Operation Method Using Middle Space 320)

Next, the operation method using the middle space 320 will be described with reference to FIGS. 21 to 26.

Figure 21:
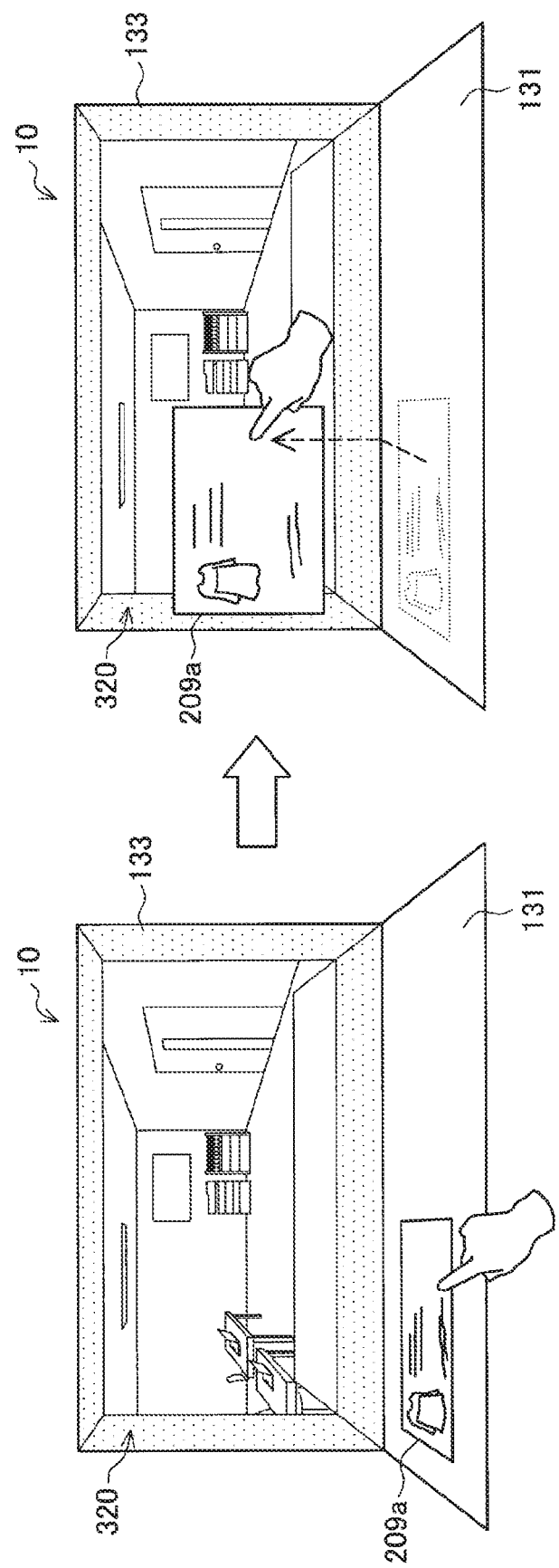
FIG. 21 is a diagram for describing an operation method using a middle space in a fourth display example of the present embodiment.

As illustrated in FIG. 21, for example, the display can be instructed to be attached to the front side of the middle space 320 by a drag and drop operation of moving the finger to the window display 133 and separating the finger while touching a two-dimensional object 209a displayed on, for example, the table display 131. Note that the operation is not limited to the touch operation, and the object can be selected using an external device such as a mouse, the object can be selected by some gesture without touching the display surface, and the display position can move. In addition, the object may be three-dimensional.

Figure 22:
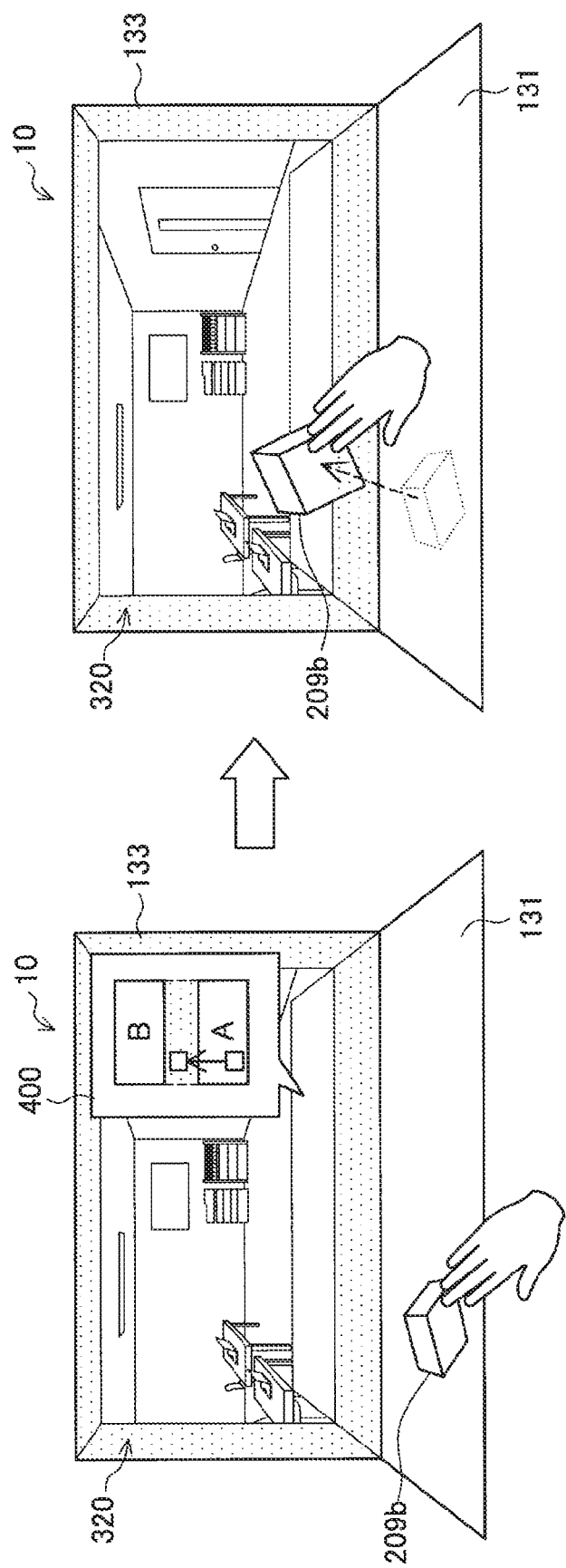
FIG. 22 is a diagram for describing the operation method using a middle space in the fourth display example of the present embodiment.

In addition, as illustrated in FIG. 22, for example, a three-dimensional object 209b displayed on, for example, the table display 131 may be displayed in the middle space 320 by the drag and drop operation of moving the finger to the window display 133 and separating the finger while being touched. The instruction to display to the inside of the middle space 320 and the instruction to display to the front side of the middle space 320 as illustrated in FIG. 21 may be distinguished by a difference in the number of fingers to touch (for example, drag and drop operation by one finger, drag and drop operation by two fingers, drag and drop operation in a state in which all fingers are aligned, and the like), a difference in gestures, a difference in mouse operations (right click, left click, one click, double click, and the like), and the like. Further, for example, when the instruction to display to the inside of the middle space 320 is recognized, as illustrated in FIG. 22, the information processing apparatus 10 displays, on the window display 133 or the like, a top view 400 indicating that the display is moved to the inside of the middle space 320 and notifies a user of the top view 400.

Figure 23:
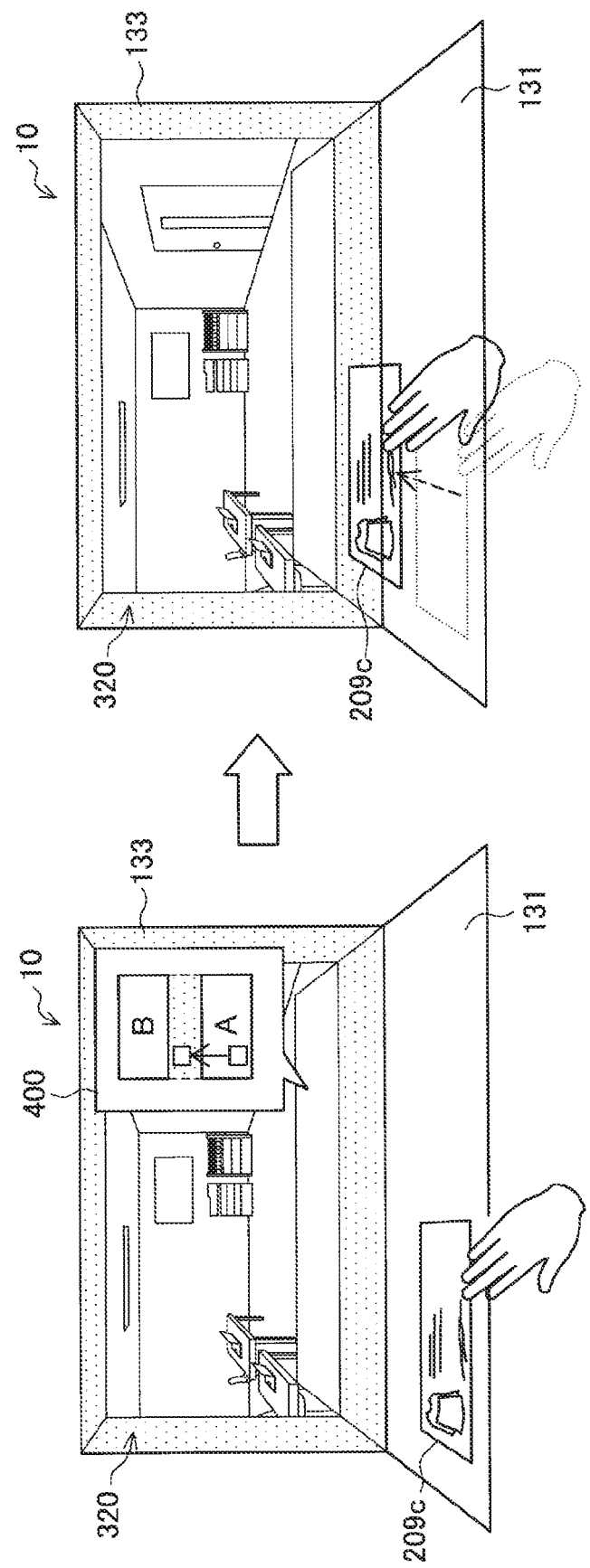
FIG. 23 is a diagram for describing the operation method using a middle space in the fourth display example of the present embodiment.

Further, the display to the inside of the middle space 320 is not limited to a three-dimensional object, and naturally, may be a two-dimensional object. For example, as illustrated in the left of FIG. 23, if the two-dimensional object 209c displayed on the table display 131 moves to the window display 133 side by a predetermined operation (for example, an operation of aligning and touching all fingers and dragging), as illustrated in FIG. 23, the object 209c can be displayed inside the middle space 320.

Next, the operation of the object displayed inside the middle space 320 will be described. The display screen of the window display 133 may be touched, but in the case of the arrangement configuration, and the like as illustrated in FIG. 1, a hand may be hard to reach the window display 133 and the touch operation may be difficult. Therefore, for example, as illustrated in FIG. 24, it is possible to select an object displayed inside the middle space 320 with a gesture such as pointing and give an instruction to change the display position.

Figure 24:
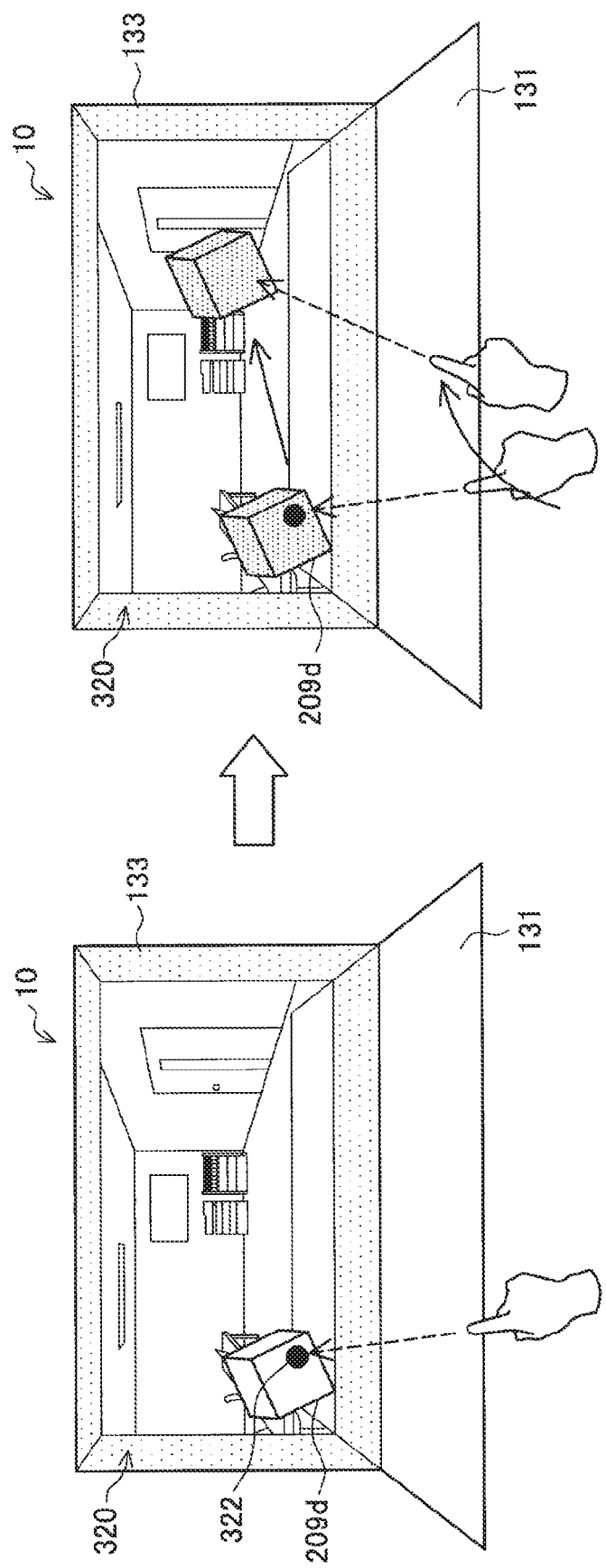
FIG. 24 is a diagram for describing the operation method using a middle space in the fourth display example of the present embodiment.

Specifically, for example, as illustrated in the left side of FIG. 24, when the user points to the object 209d displayed inside the middle space 320 in the window display 133, the pointer 322 is displayed. The user's gesture can be sensed by the information processing apparatus 10 or a sensor unit 121 such as a depth camera provided in the periphery as described above, and can be recognized by the input information recognition unit 101. The user can select the object 209d by continuing to point the arbitrary object 209d by the pointer 322 for a while (more than a predetermined time). The information processing apparatus 10 may feed back to the user that the object 209d has been selected by changing the display mode or the like as illustrated in the right side of FIG. 24. As illustrated in the right side of FIG. 24, the user can change the display position of the object 209d by changing the direction of the pointing hand while selecting the object 209d, for example. When the selection is released, the finger pointing stops.

In addition, it is also possible to change the display size of the object displayed inside the middle space 320 by the gesture. For example, as illustrated in FIG. 25, in the state in which the object 209e displayed inside the middle space 320 of the window display 133 is selected, the size of the object 209e can be arbitrarily changed by adjusting the distance between the finger pointing to the object 209e and the display screen of the window display 133. Specifically, for example, the information processing apparatus 10 performs display control so that the object 209e becomes large when the finger is close to the object and becomes small when the finger is moved away, as illustrated in the left side of FIG. 25. Here, as an example, the case has been described where the size is changed according to the distance of the finger pointing, but the present embodiment is not limited thereto, and the size may be increased by a pinch-out operation of separating a thumb and a forefinger to, for example, a target object, or the size may be reduced by a pinch-in operation of bringing the thumb and the forefinger close to each other. In addition, the virtual distance interval may be adjusted by a predetermined gesture. For example, the size (virtual distance interval) of the middle space 320 can be increased (longer) or decreased (shorter) by moving a finger in a clockwise or counterclockwise direction with respect to the window display 133.

Figure 26:
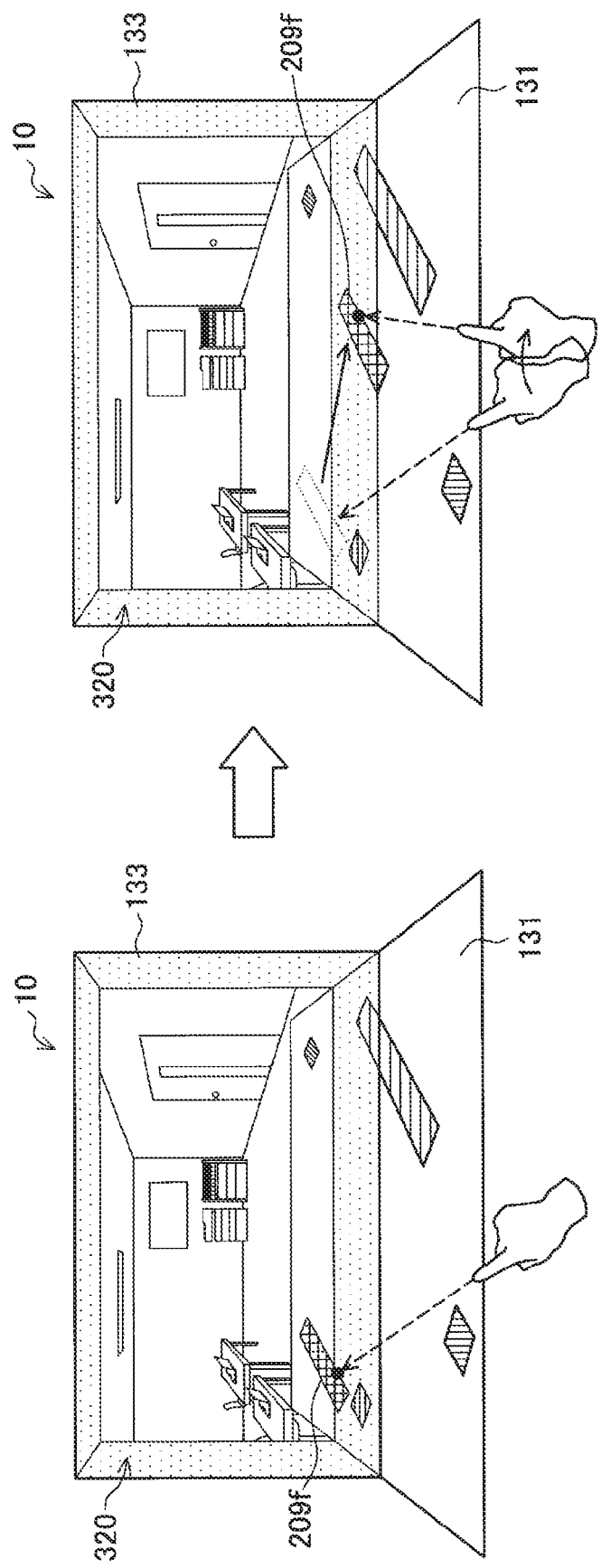
FIG. 26 is a diagram for describing the operation method using a middle space in the fourth display example of the present embodiment.

It is also possible to select the two-dimensional object that is displayed in the middle space 320 by the pointing gesture. Specifically, as illustrated in FIG. 26, for example, in the window display 133, when there is an object 209f in which a part of the display area is in the middle space 320 from the other side, the object 209f is regarded as a shared object, so the operation input by the user is accepted. For example, as illustrated in the left side of FIG. 26, the object 209f is selected by pointing the object 209f by the pointing gesture, and moves as illustrated in the right side of FIG. 26 by moving the pointing direction, so the object 209f can also be on the user side (the table display 131 side), for example.

(Overlapping Display of Objects)

Figure 27:
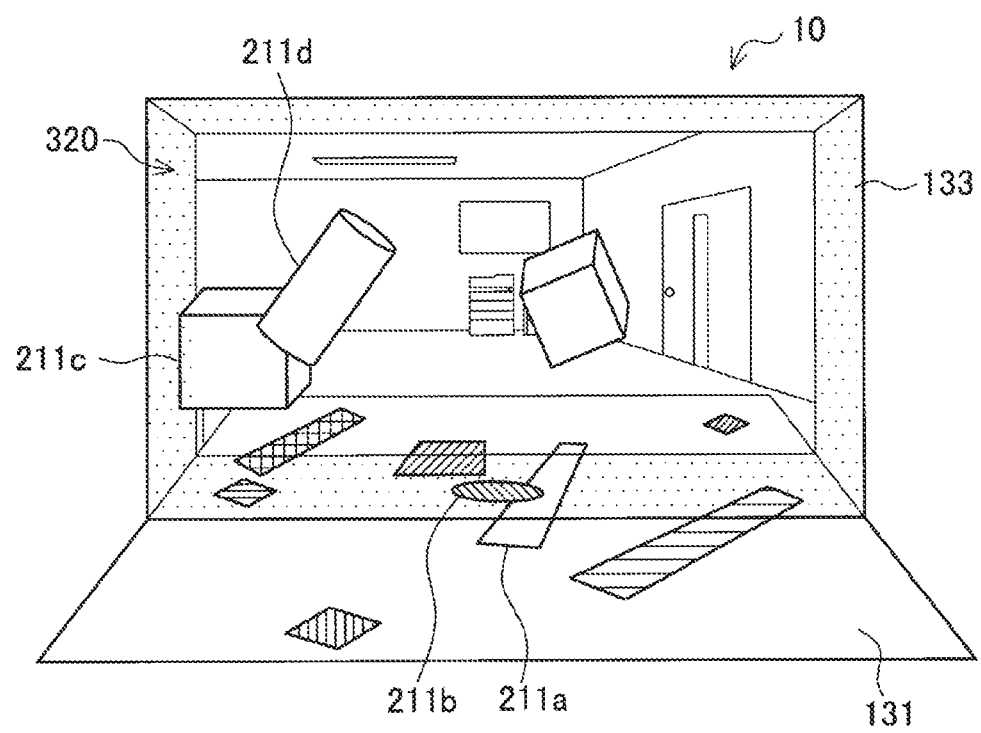
FIG. 27 is a diagram for describing overlapping display of objects in the fourth display example of the present embodiment.

FIG. 27 is a diagram for describing overlapping display of objects. As illustrated in FIG. 27, each object 211 may be displayed in an overlapping manner depending on the display position (for example, object 211a and object 211b, object 21c and object 211d). It is possible to appropriately set which object is displayed above when the displays overlap. For example, the object selected by the user may be preferentially displayed above, or priority may be determined based on which user has operated. In addition, the priority may be determined for each object (it is assumed that a case where important data is set such as when an important flag is set has a high priority, and data having high urgency such as push notification has a high priority).

Further, in the example illustrated in FIG. 27, the other three-dimensional object 211d overlaps the three-dimensional object 211c in the middle space 320, but the display control may be similarly made even in the communication partner so that the objects 211d is visible overlapping the three-dimensional object 211c in the middle space 320 of the window display 133.

Note that such overlapping display control of objects is not limited to the case of the display example (fourth display example) using the middle space 320 as illustrated in FIG. 27, and can be similarly applied to the first to third display examples described above or even a fifth display example described below.

(Aligned Display of Objects on Table)

FIG. 28 is a diagram for describing an alignment display control of objects displayed on the table. As illustrated in the upper part of FIG. 28, when a predetermined operation such as a double tap is performed on the object 210a displayed on the table display 131, the information processing apparatus 10 can perform the display control of aligning one side of the object 210a at the user side of the table display 131 as illustrated in the lower part of FIG. 28. At this time, the objects 210a may be aligned in a direction that is a positive direction when viewed from the user. Such display control can be applied to the first to fifth display examples.

4-5. Fifth Display Example (Gathering)

Next, as a fifth display example, the presentation of the joint work space in which users who are performing the joint work feel as if the users are virtually gathering and working on one side will be described with reference to FIGS. 29 to 33. By virtually gathering the users, both parties can look at objects or the like on the table from the same direction, and easily perform the joint work in some cases.

Figure 29:
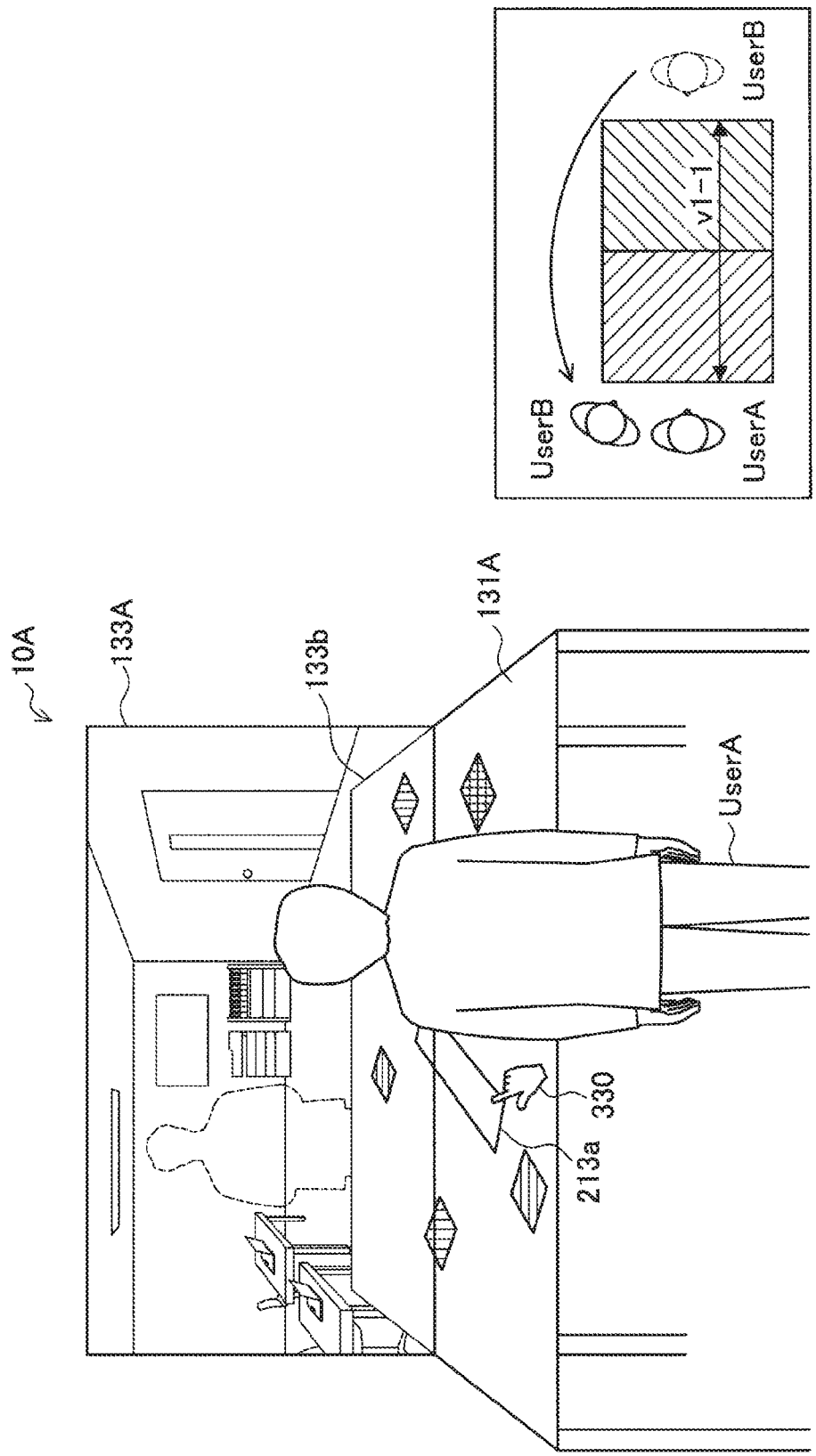
FIG. 29 is a diagram illustrating a display screen example on a user A side in a fifth display example of the present embodiment.

FIG. 29 is a diagram illustrating a display screen example of the user A side in the fifth display example. As illustrated in the image top view illustrated in the lower right of FIG. 29, when two tables (table display 131A and table display 131B) are arranged and the work area is expanded, the example illustrated in FIG. 29 is the display screen examples of the table display 131A and the window display 133A when the user B is virtually gathered on the user A side.

As illustrated in FIG. 29, when the user B is virtually gathered on the user A side, the information processing apparatus 10 cuts out only the video image of the user B in the window display 133A that displays the video image on the side of the user B and displays a background image (may be acquired form a past video image in the cut out portion, and as a result, can express the situation where the user B is not present on a facing surface. Further, the virtual table 133b that expands the table display 131A is displayed on the window display 133A, and the object displayed on the virtual table 133b is also visible from the user A side.

Note that in some cases, the users look at a face of the other party to perform communication when gathered, and therefore, only a person of the user B (the background is cut out) may be displayed on the window display 133A.

The image of the hand or the like may be displayed on the table display 131A by reflecting the operation on the object by the user B. For example, as illustrated in FIG. 29, when the user B is operating the object 213a, an image 330 (three-dimensional or two-dimensional image) of the hand operating the object 213a is displayed on the table display 131A. As a result, the user A can intuitively recognize which object the user B is operating without looking at a figure. Note that the exchange of voice with the user B is performed as usual.

Next, the actual display states on the user A side and the user B side will be described with reference to FIG. 30. FIG. 30 is a diagram illustrating the display screen examples of the information processing apparatus 10A and the information processing apparatus 10B in the fifth display example. The upper part of FIG. 30 illustrates an example of the display of the table display 131A and the display of the table display 131B before the gathering, and the lower part of FIG. 30 illustrates an example of the display of the table display 131A and the display of the table display 131B after the user B is gathered on the user A side, for example. As illustrated in FIG. 30, when the user B is gathered on the user A side, the display of the table display 131B on the user B side becomes the same display screen as the table display 131A. As a result, it is possible to present the situation where the user B is looking at the table display 131A from the user A side. In this case, the objects displayed only on the table (table display 131A) on the user A side are displayed on the table display 131B, and the user B can operate these objects. Note that the private object of the user A may not be displayed on the user B side.

In addition, the same video image as the window display 133A illustrated in FIG. 29, that is, the background (the video image of the user B is cut out) on the user B side is displayed on the window display 133B, and the display control is performed to be the same as the situation seen from the user A side.

Figure 31:
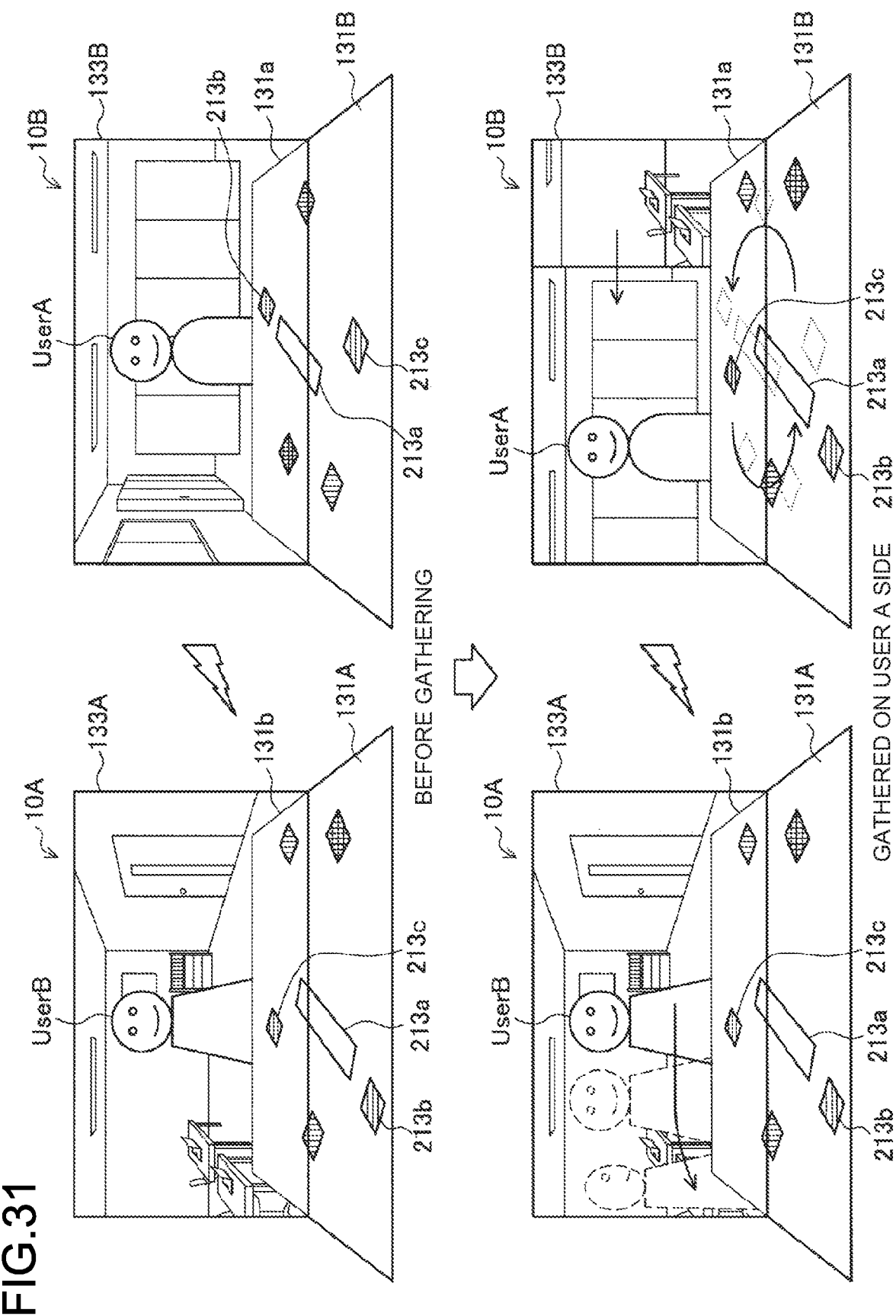
FIG. 31 is a diagram illustrating an example of a screen transition at the time of gathering in the fifth display example of the present embodiment.

Next, an example of the screen transition at the time of gathering will be described with reference to FIG. 31. FIG. 31 is a diagram illustrating an example of the screen transition at the time of gathering in the present embodiment. The upper part of FIG. 31 illustrates a display example before the gathering, and the lower part of FIG. 31 illustrates a screen transition example when the user B is gathered on the user A side. As illustrated in FIG. 31, before the gathering, the video image of the user B is displayed on the window display 133A of the information processing apparatus 10A, and the video image of the user A is displayed on the window display 133B of the information processing apparatus 10B. In addition, the objects 213 (213a to 213c, and the like) on the table are arranged so that one table formed by connecting the actual table display 131 and the virtual table displayed in the window display 133 is displayed and controlled to be visible by both parties facing each other.

Then, when the instruction to gather the user B on the user A side is input, as illustrated in the lower part of FIG. 31, in the window display 133A on the user A side, for example, it is possible to present an expression as if the user B moves to the user A side (this side) by cutting out and sliding out only the video image of the user B.

On the other hand, in the window display 133B on the user B side, as illustrated in the lower part of FIG. 31, the video image on the user A side slides out for each background, and the video image (without a person) on the user B side slides in, so it is possible to present the expression as if the user B himself/herself moves to the user A side (the other side). Further, on the side of the user B, the display control is performed in which the arrangement of the objects 213 on the table is reversed together with being gathered. That is, when the user B is gathered on the user A side, the appearance of the object 213 on the table on the user B side (table display 131B and window display 133B) is the same (point of view of user A) as that on the user A side (table display 131A, window display 133A).

The virtual gathering described above is not limited to the time of expanding the table as illustrated in FIG. 29 (that is, the second display example), and can be realized in any other display example. As an example, the virtual gathering in the display example (fourth display example) provided with, for example, the middle space 320 will be described with reference to FIGS. 32 and 33.

(Virtual Gathering in Display Example Provided with Middle Space 320)

Figure 32:
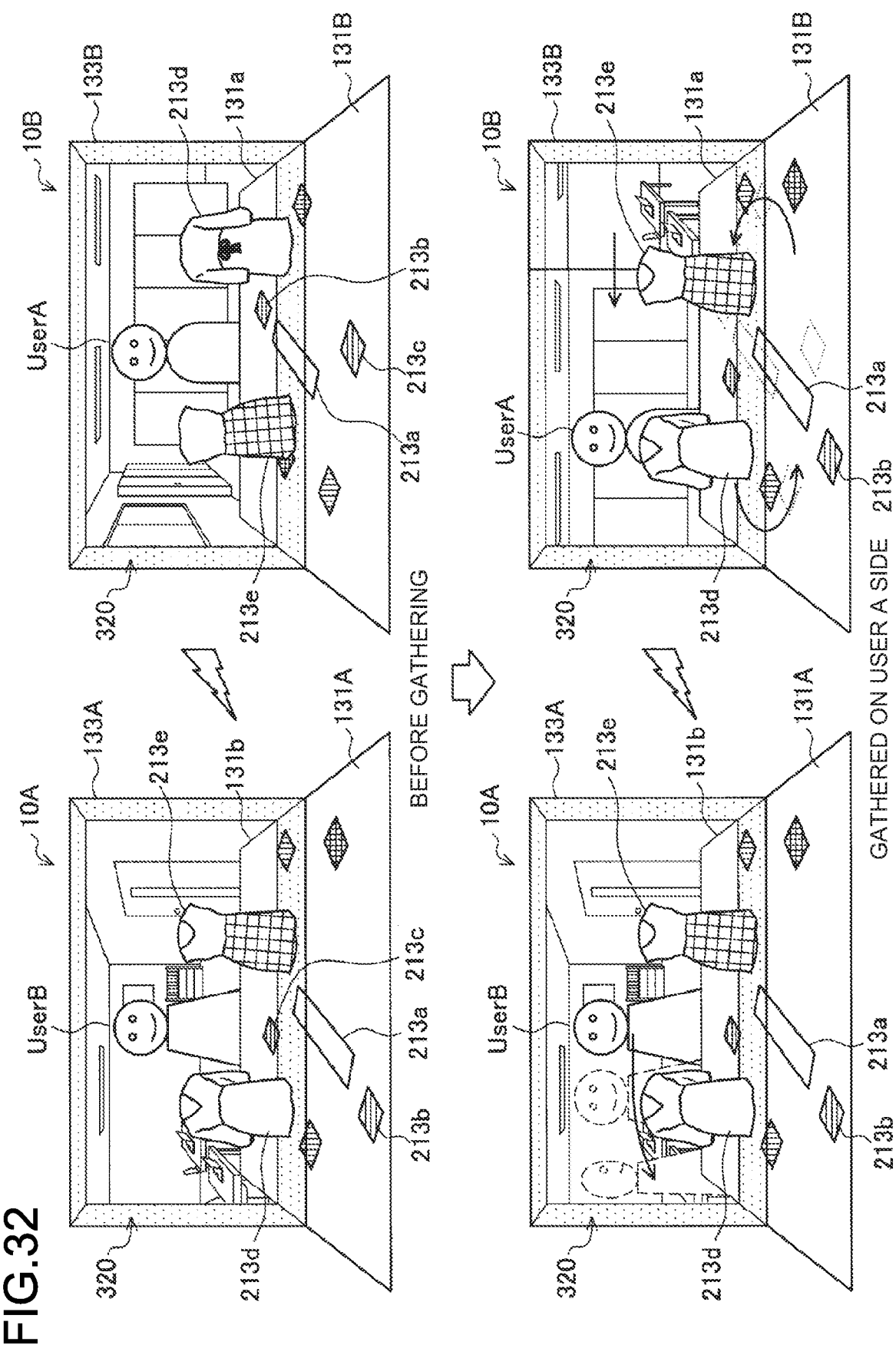
FIG. 32 is a diagram illustrating an example of a screen transition of a virtual gathering in a display example in which a middle space is provided in the fifth display example of the present embodiment.

FIG. 32 is a diagram illustrating an example of a screen transition of the virtual gathering in the display example provided with the middle space according to the present embodiment. The upper part of FIG. 32 illustrates the display example before the gathering, and the lower part of FIG. 32 illustrates a screen transition example when the user B is gathered on the user A side.

The display changes of the person or the background in the window display 133A and the window display 133B are the same as those in the example described with reference to FIG. 31.

Further, the arrangement inversion of the object 213 on the table is also similar to the example described with reference to FIG. 31.

The three-dimensional objects 213d and 213e displayed in the middle space 320 of the window display 133B are in a state in which the front side can be visible from the user A side and the back side can be visible from the user B side before the gathering in the upper part of FIG. 32. In this case, when the user B is gathered on the side of the user A, the same display as that on the user A side can be visible on the side of the user B, and therefore, as illustrated in the lower part of FIG. 32, the front sides of the objects 213d and 213e are displayed on the window display 133B in the same manner as the appearance from the user A side.

The screen transition of the virtual gathering in the display example provided with the middle space is described above. Next, the operation processing at the time of the virtual gathering in the display example provided with the middle space will be described with reference to FIG. 33.

Figure 33:
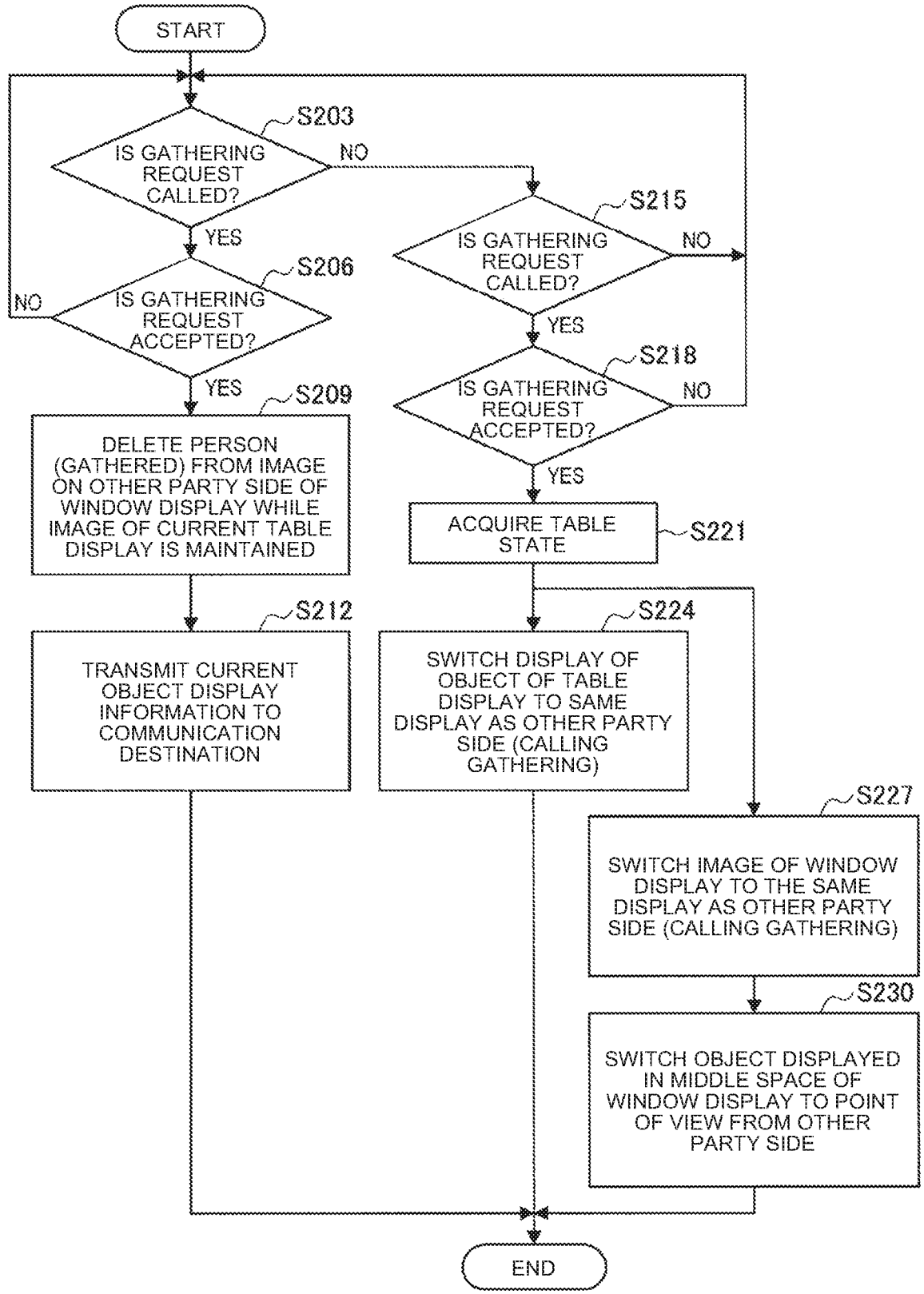
FIG. 33 is a flowchart illustrating an example of a flow of display control processing at the time of gathering the display examples in which the middle space is provided in the fifth display example of the present embodiment.

FIG. 33 is a flowchart illustrating an example of a flow of display control processing at the time of the gathering in the display example provided with the middle space. As illustrated in FIG. 33, first, when a user calls a gathering request to a co-worker (communication partner) (step S203/Yes), the information processing apparatus 10 determines whether or not the request is accepted by the communication partner (step S206). Information on whether or not the request is accepted by the communication partner may be received from the communication destination apparatus.

Next, the information processing apparatus 10 deletes persons (only the video image) gathered on the other party side of the window display 133 from the video image of the other party side while the video image of the current table display 131 is maintained (that is, the arrangement of the objects on the table does not move) (step S209).

Next, the information processing apparatus 10 transmits the current object display information to the communication destination apparatus (step S212).

On the other hand, when the user is called by the co-worker (communication partner) for the gathering request (step S215/Yes), it is determined whether or not the user accepts the request (step S218). The acceptance of the gathering request is recognized by the input information recognition unit 101 based on a user's input such as a user's uttered voice, a gesture, and an operation of a remote controller.

Next, when the user accepts the gathering request (step S218/Yes), the table state (whether the table is expanded, whether the middle space is provided, where is the shared area is, and the like) is acquired (step S221).

Next, the information processing apparatus 10 switches the display of the object displayed on the window display 133 to the same display as that of the object displayed on the window display 133 of the other party side (calling the gathering) (step S224).

In addition, the information processing apparatus 10 switches the video image on the table display 131 to the same display (that is, the video image on the gathering side (no person)) as that of the other party side (calling the gathering) (step S227).

Next, when the table display 131 is provided with a middle space, the information processing apparatus 10 switches the object displayed in the middle space to a point of view (for example, display of the three-dimensional object viewed from the front side as illustrated in FIG. 32) from the other party side (calling the gathering) (step S230).

4-6. Reproduce of Past Object

The information processing apparatus 10 according to the present embodiment records the object information displayed on the table in the storage unit 140 and accumulates the past history at any time, and can call the past object display according to the user designation (reproduced on the table).

In addition, it is also possible to call the past history of the object information at the time of the joint work performed between other users and reproduce the called past history on the table of the user.

The call of the past object information may be designated by the date and time, or may be called based on a tag when some tags are stored in advance.

5. Other Configuration Example

The information processing system 1 according to the present embodiment has been specifically described above, but the system configuration of the present embodiment is not limited to the examples illustrated in FIGS. 1 to 4. Some variations of the system configuration included in the present embodiment will be described with reference to FIGS. 34 to 39.

5-1. Other Configuration Example 1

Figure 34:
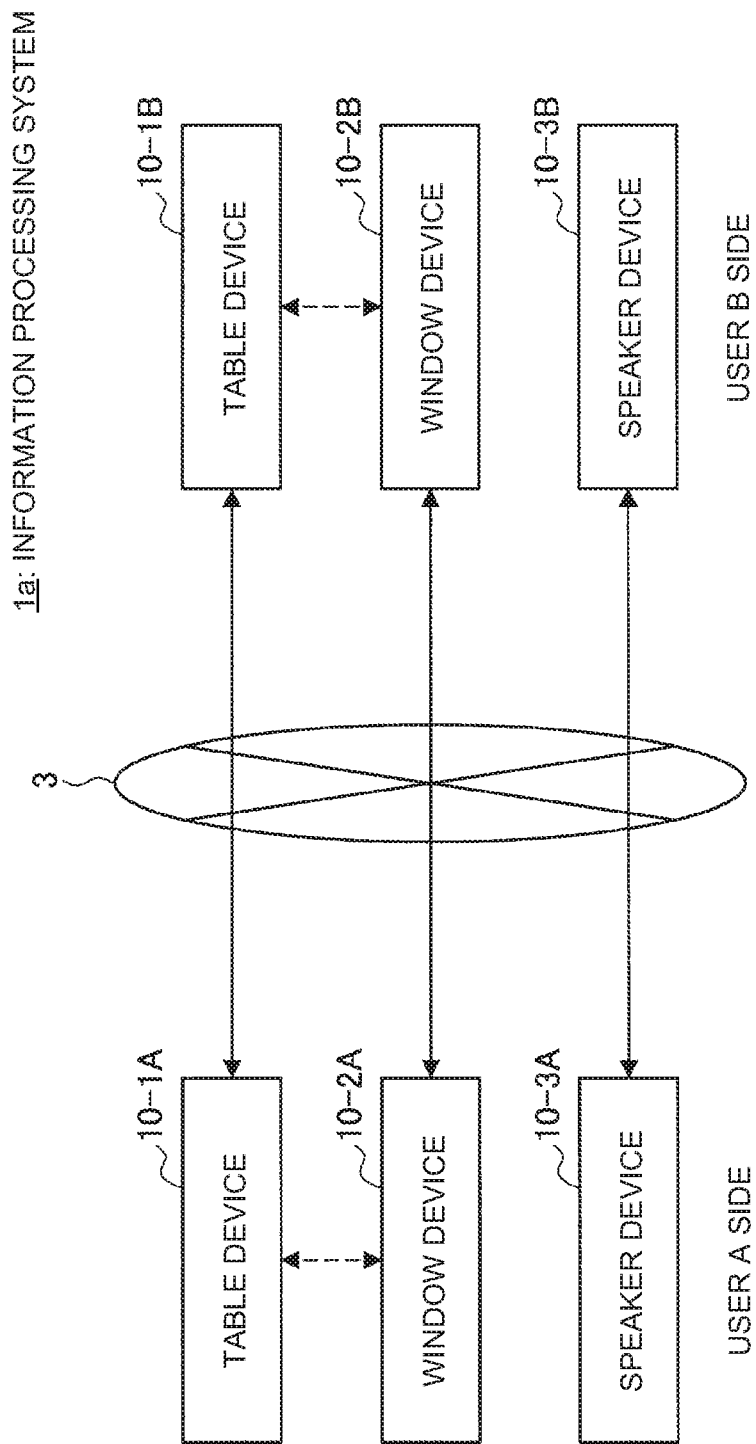
FIG. 34 is a diagram illustrating a system configuration example of the other configuration example 1 according to the present embodiment.

FIG. 34 is a diagram illustrating a system configuration example of the other configuration example 1 according to the present embodiment. In the embodiment described above, the information processing apparatus 10 has each display (table side and window side) and a speaker, but each display and the speaker may be separate devices. Specifically, FIG. 34 may illustrate, for example, a system configuration in which a table device 10-1A having a table display 131A, a window device 10-2A having a window display 133A, and a speaker device 10-3A are arranged on the user A side, and a table device 10-1B having a table display 131B, a window device 10-2B having a window display 133B, and a speaker device 10-3B are arranged on the user B side. The respective devices are communicatively connected to each other via the network 3.

Figure 35:
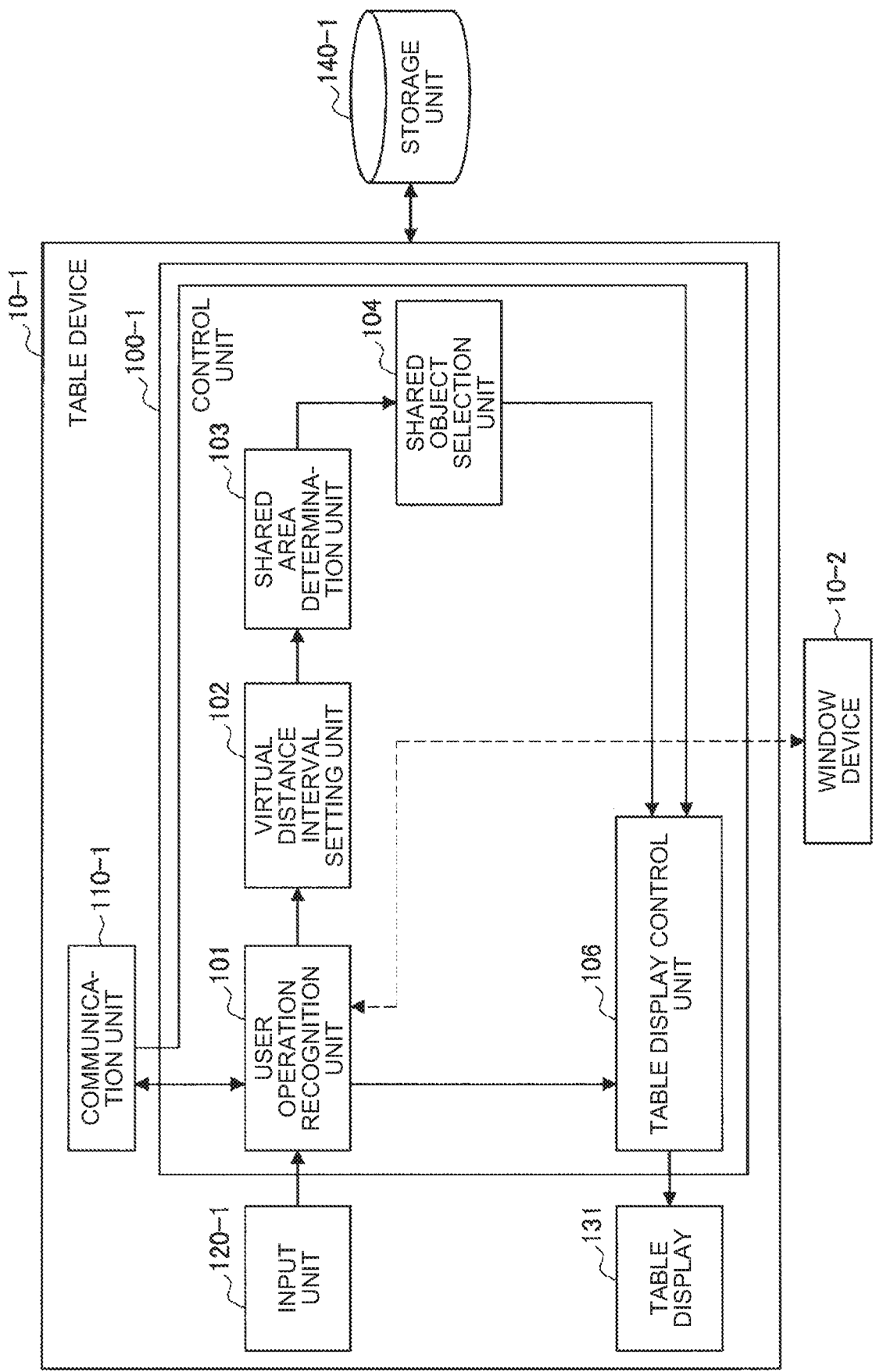
FIG. 35 is a block diagram illustrating a configuration example of a table device according to the other configuration example 1 of the present embodiment.

FIG. 35 is a block diagram illustrating a configuration example of a table device 10-1 according to other configuration example 1 of the present embodiment. As illustrated in FIG. 35, for example, the table device 10-1 includes a control unit 100-1, a communication unit 110-1, an input unit 120-1, a table display 131, and a storage unit 140-1.

The control unit 100-1 functions as the input information recognition unit 101, the virtual distance interval setting unit 102, the shared area determination unit 103, the shared object selection unit 104, and the table display control unit 106.

The input information recognition unit 101 appropriately transmits the acquired input information or receives the result recognized from the input information to the window device 10-2 or receives the input information and the recognition result from the window device 10-2. This is because it is assumed that the operation input to the table display 131 may affect the display control of the window display 133 (for example, changing the setting of the virtual distance interval, moving the display of the object, and the like). The table device 10-1 and the window device 10-2 can transmit and receive data by a wired or wireless manner.

Since the function of each configuration is the same as that of each configuration described with reference to FIG. 4, details thereof are omitted here.

Figure 36:
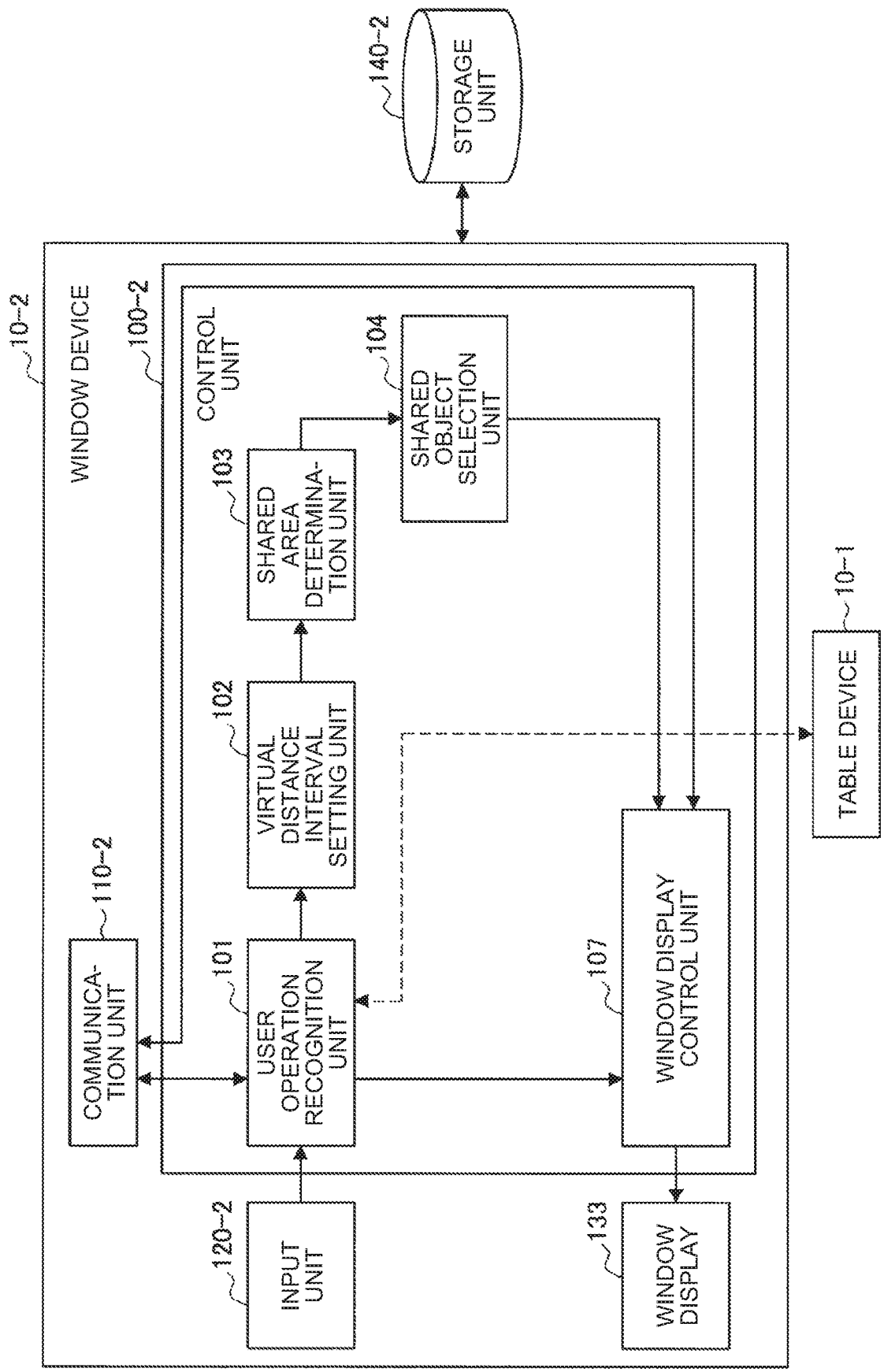
FIG. 36 is a block diagram illustrating a configuration example of a window device according to the other configuration example 1 of the present embodiment.

FIG. 36 is a block diagram illustrating a configuration example of a window device 10-2 according to other configuration example 1. As illustrated in FIG. 36, for example, the window device 10-2 includes a control unit 100-2, a communication unit 110-2, an input unit 120-2, a window display 133, and a storage unit 140-2.

The control unit 100-2 functions as the input information recognition unit 101, the virtual distance interval setting unit 102, the shared area determination unit 103, the shared object selection unit 104, and the window display control unit 107.

The input information recognition unit 101 appropriately transmits the acquired input information or receives the result recognized from the input information to the table device 10-1 or receives the input information or the recognition result from the table device 10-1. This is because it is assumed that the operation input to the window display 133 may affect the display control of the table display 131 (for example, changing the setting of the virtual distance interval, moving the display of the object, and the like).

Since the function of each configuration is the same as that of each configuration described with reference to FIG. 4, details thereof are omitted here.

(Operation Processing)

Figure 37:
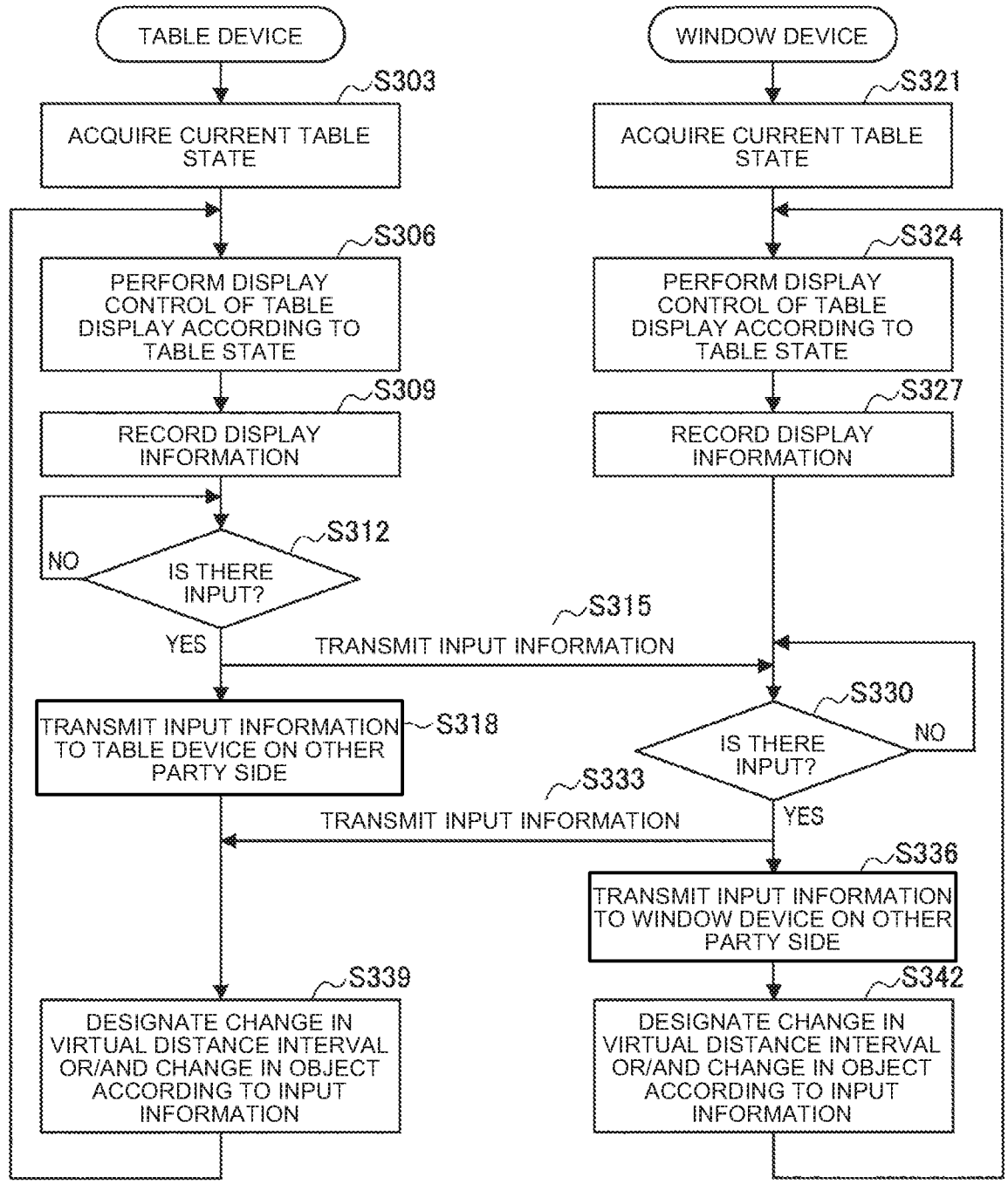
FIG. 37 is a flowchart illustrating an example of a flow of display control processing in the other configuration example 1 of the present embodiment.

Next, the operation processing of the table device 10-1 and the window device 10-2 according to the present configuration example will be described with reference to FIG. 37. FIG. 37 is a flowchart illustrating an example of a flow of display control processing in other configuration example 1.

As illustrated in FIG. 37, first, the table device 10-1 acquires the current table state (setting of the virtual distance interval and the like) (step S303) and performs display control of the table display 131 according to the table state (step S306).

Next, the table device 10-1 records the display information in the storage unit 140-1 (step S309).

Next, if there is an input (step S312/Yes), the input information is transmitted to the window device 10-2 (step S315), and the input information is also transmitted to the table device 10-1 on the communication partner side (step S318).

On the other hand, the window device 10-2 acquires the current table state (setting of the virtual distance interval, and the like) (step S321) and performs the display control of the window display 133 according to the table state (step S324).

Next, the window device 10-2 records the display information in the storage unit 140-2 (step S327).

Next, if there is an input (step S330/Yes), the input information is transmitted to the table device 10-1 (step S333), and the input information is also transmitted to the window device on the communication partner side (step S336).

Then, the table device 10-1 designates the change in the virtual distance interval and/or the change in the object according to the acquired input information (step S339). As a result, the input operation is reflected on the object displayed on the table display 131.

In addition, the window device 10-2 designates the change in the virtual distance interval and/or the change in the object according to the acquired input information (step S342). As a result, the input operation is reflected on the object displayed on the window display 133.

5-2. Other Configuration Example 2

Next, other configuration example 2 will be described. The above-described embodiment has described the system that provides the joint work space using the table display 131 and the window display 133, but is not limited the present embodiment, and may be a system that provides the joint work space using only the table display 131 or only the window display 133. Here, as an example, the system that provides the joint work space using only the table display 131 will be specifically described with reference to FIGS. 38 and 39.

Figure 38:
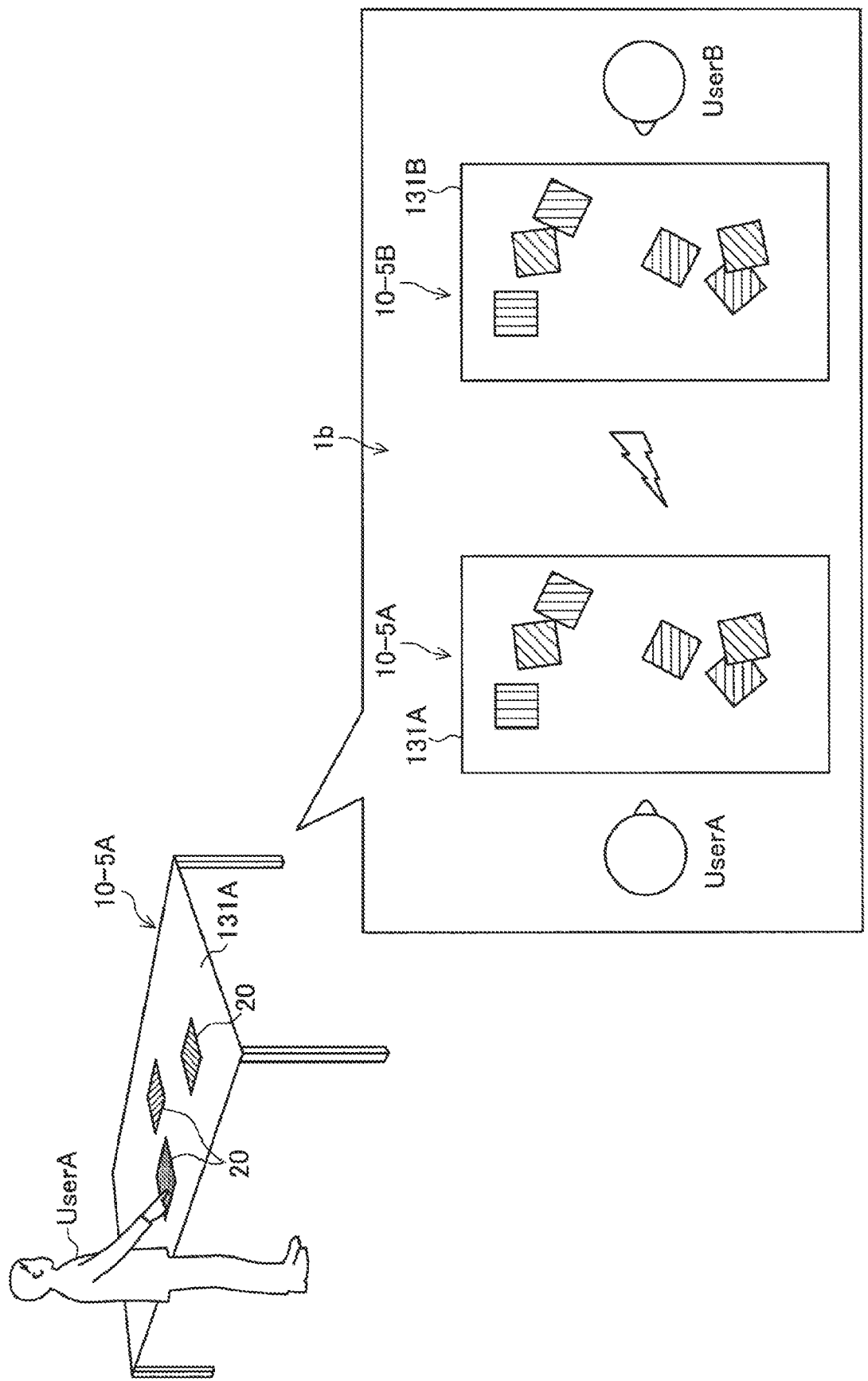
FIG. 38 is a diagram for describing other configuration example 2 of the present embodiment.

FIG. 38 is a diagram for describing other configuration example 2 of the present embodiment. As illustrated in FIG. 38, the present system (information processing system 1b) is realized by a configuration including an information processing apparatus 10-5A having the table display 131A and an information processing apparatus 10-5B having the table display 131B.

The display image 20 (object) displayed on the table display 131A may be a two-dimensional image or a three-dimensional image. The shared area is set on the table display 131A, and an object whose display is at least partially included in the shared area is regarded as the shared object. For example, the entire surface of the table display 131A may be set as a shared area.

In this case, the display screens of the table display 131A and the table display 131B have the same arrangement, for example, as illustrated in the top view at the lower right of FIG. 38. When the entire surface of the table display 131 is the shared area, all objects displayed on the table display 131 are regarded as a shared object, and any of the user A and the user B can be operated. Then, the operation on the object by one user is reflected on the other table, and it becomes possible to perform the joint work on the table even at the remote location.

In the present configuration example, the window display 133 is not provided and the figure of the communication partner cannot be visible, but since the operation input of the communication partner is reflected on the table (for example, moving the object, and the like), the joint work can be made. In addition, the information processing apparatus 10-5A includes the speaker 135 and the microphone (included in the input unit 120-5), and it is possible to perform the joint work while exchanging voice communication with the communication partner.

Figure 39:
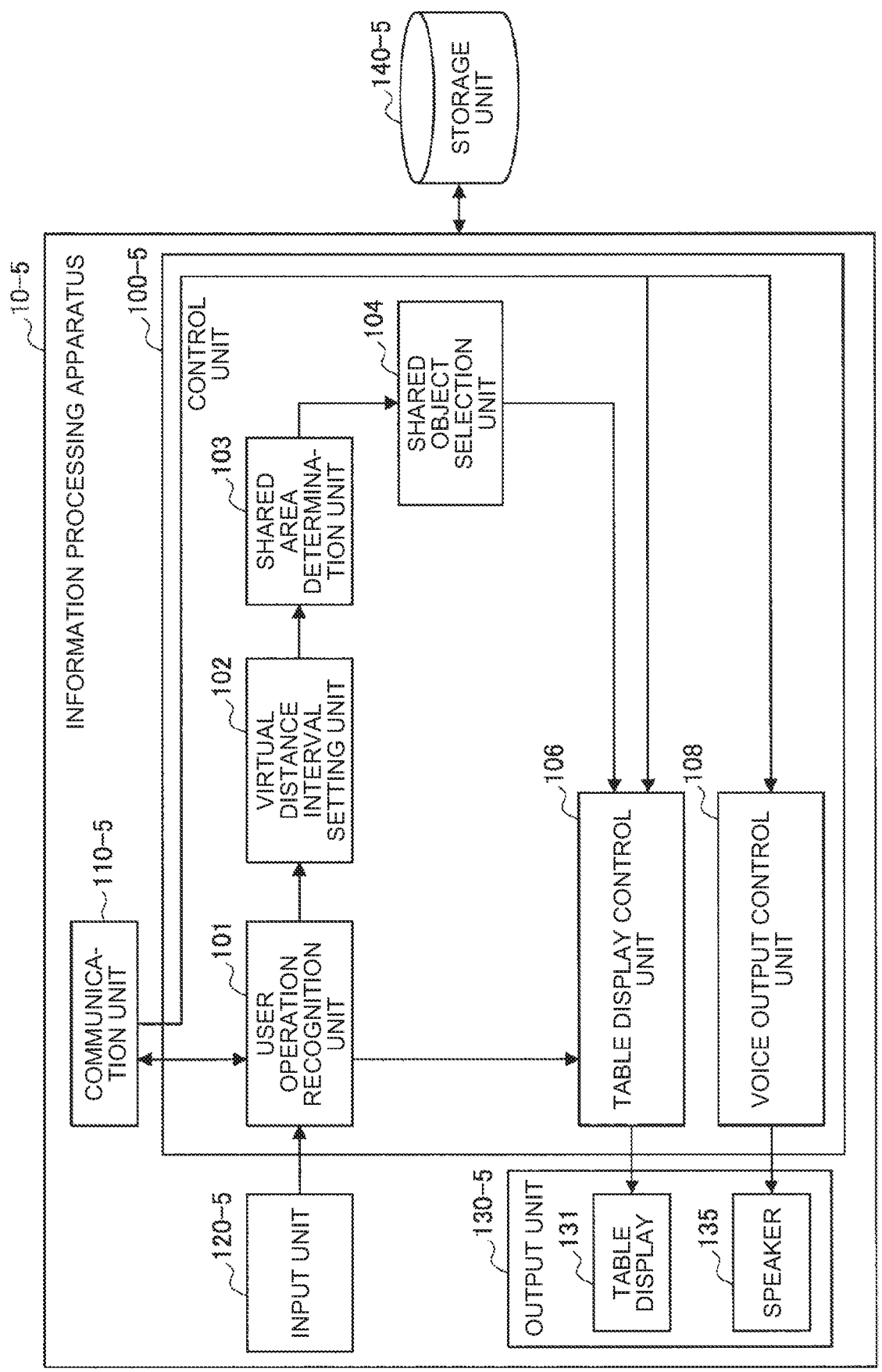
FIG. 39 is a block diagram illustrating a configuration example of an information processing apparatus according to the other configuration example 2 of the present embodiment.

FIG. 39 is a block diagram illustrating a configuration example of the information processing apparatus 10-5 according to other configuration example 2 of the present embodiment.

As illustrated in FIG. 39, the information processing apparatus 10-5 includes a control unit 100-5, a communication unit 110-5, an input unit 120-5, an output unit 130-5, and a storage unit 140-5.

The control unit 100-5 functions as the input information recognition unit 101, the virtual distance interval setting unit 102, the shared area determination unit 103, the shared object selection unit 104, the table display control unit 106, and the voice output control unit 108.

Since the function of each configuration is the same as that of each configuration described with reference to FIG. 4, details thereof are omitted here.

6. Presentation of Joint Work Space Connecting Three Points Or More

In the above-described embodiment, the presentation of the joint work space connecting the two points of the space A and the space B has been mainly described, but the present disclosure is not limited thereto, and a joint work space connecting three points or more may be presented. Hereinafter, an example of a display screen in a joint work space connecting three points or more will be described with reference to FIGS. 40 to 43.

Figure 40:
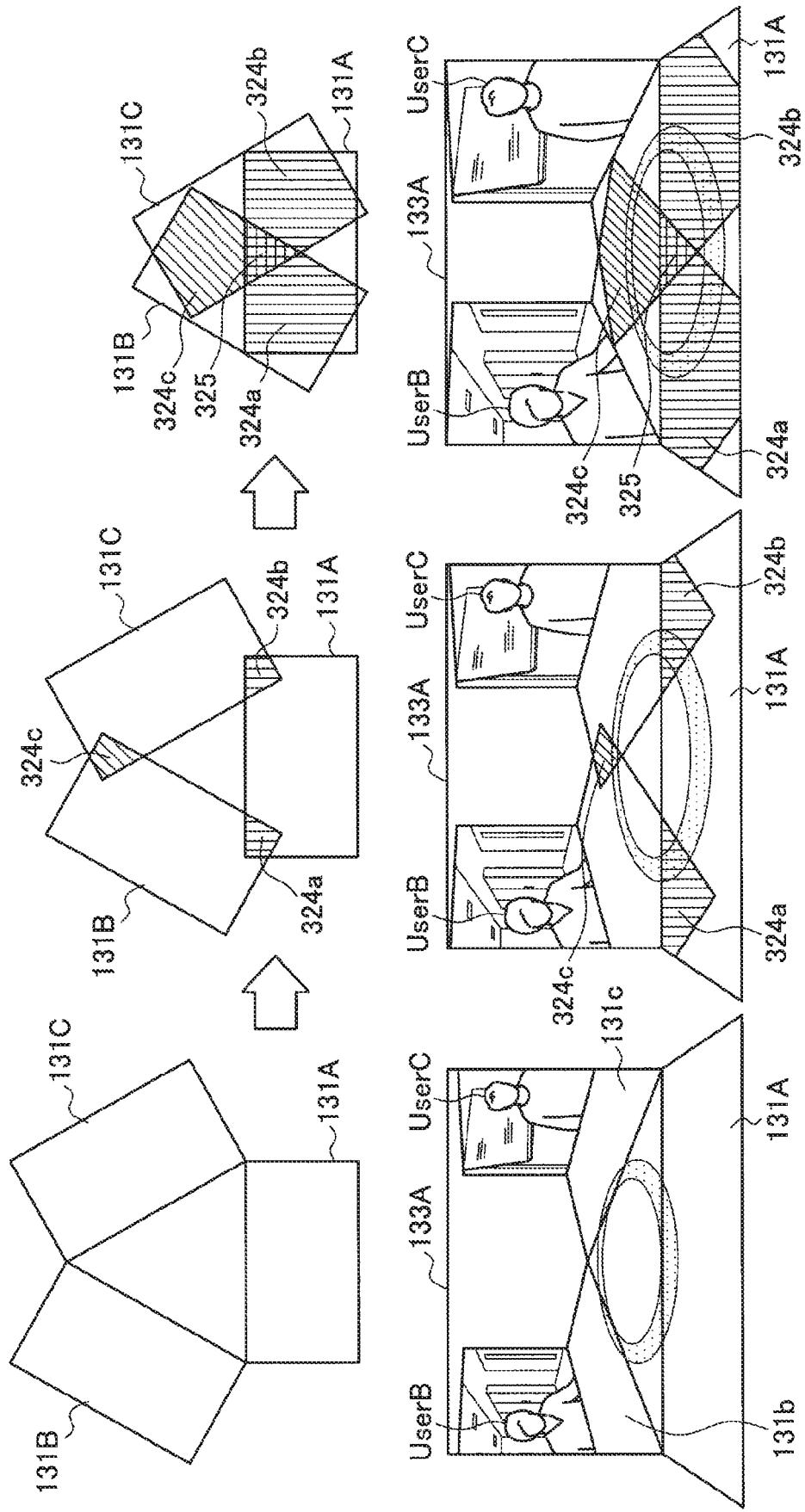
FIG. 40 is a diagram illustrating a display screen example on a user A side when presenting a joint work space connecting three points in the present embodiment.

FIG. 40 is a diagram illustrating a display screen example on a user A side when presenting a joint work space connecting three points. Here, for example, it is assumed that the space A where the user A exists, the space B where the user B exists, and the space C where the user C exists are connected. Each user can use the information processing apparatus 10 as illustrated in FIG. 1 to share the table. In addition, the virtual distance interval can be adjusted appropriately by each user.

The setting of the shared area may be an area where the tables of the respective users overlap as illustrated in FIG. 40, for example. The arrangement of each table display 131A, 131B, and 131C (distance between each other in the virtual space) is adjusted according to the virtual distance interval, and the size of the shared area may also be determined by the arrangement of each table that changes according to the virtual distance interval. FIG. 40 illustrates the aspect in which the virtual distance interval is gradually shortened, and each table approaches each other.

As illustrated in FIG. 40, a shared area 324a formed by overlapping the table display 131A and the table display 131B is a shared area between the user A and the user B, and an object at least partially included in the shared area 324a is regarded as a shared object in which the user A and the user B can perform the operation input.

In addition, a shared area 324b formed by overlapping the table display 131A and the table display 131C is a shared area between the user A and the user C, and an object at least partially included in the shared area 324b is regarded as a shared object in which the user A and the user C can perform the operation input.

In addition, a shared area 324c formed by overlapping the table display 131C and the table display 131B is a shared area between the user B and the user C, and an object at least partially included in the shared area 324c is regarded as a shared object in which the user B and the user C can perform the operation input.

In addition, as illustrated in the right side of FIG. 40, a shared area 325 formed by overlapping the table display 131A, the table display 131C, and the table display 131D is a shared area between the user A, the user B, and the user C, and an object at least partially included in the shared area 325 is regarded as a shared object in which the user A, the user B, and the user C can perform the operation input.

Figure 41:
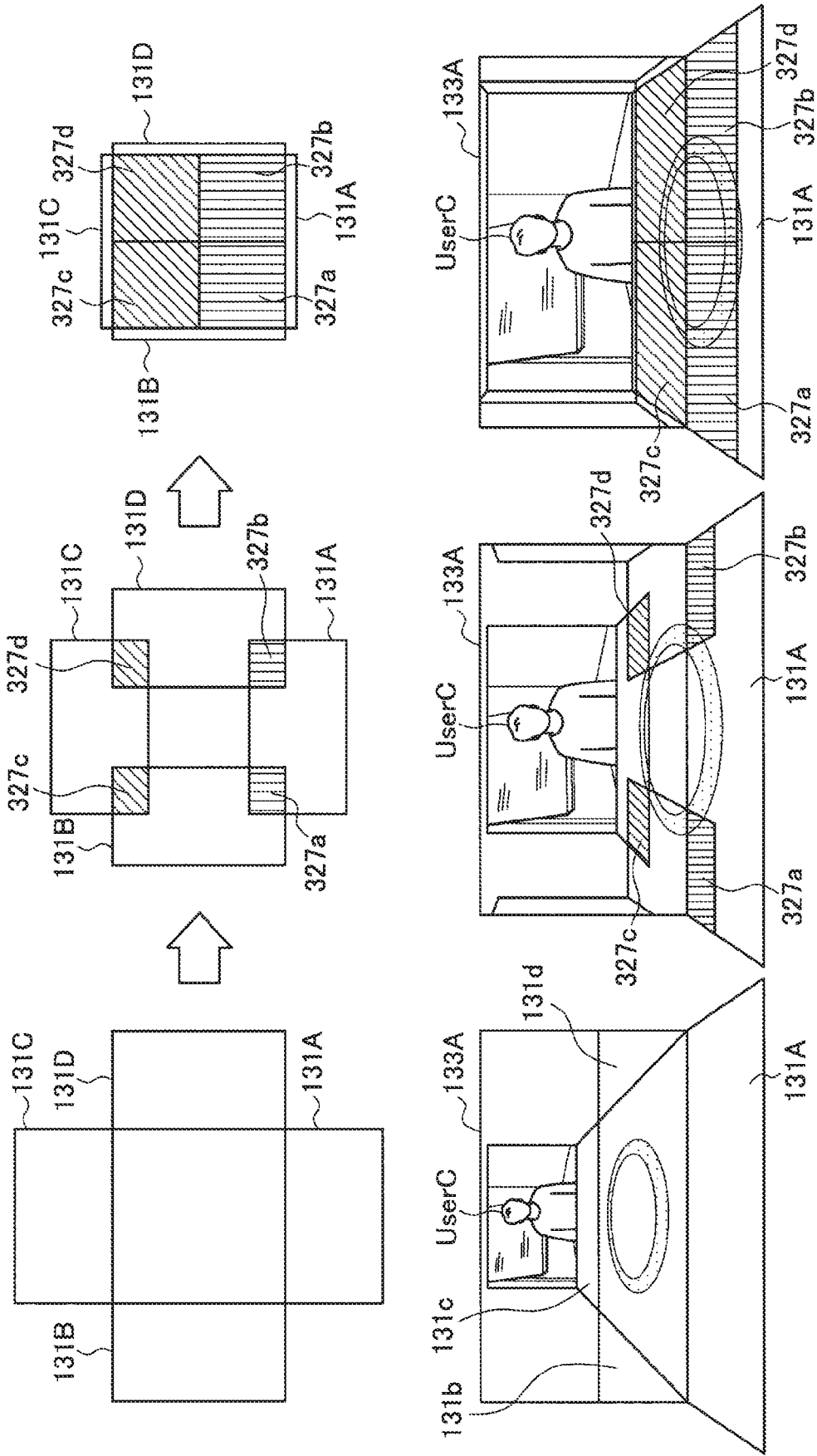
FIG. 41 is a diagram illustrating a display screen example on the user A side when presenting a joint work space connecting four points in the present embodiment.

FIG. 41 is a diagram illustrating a display screen example on a user A side when presenting a joint work space connecting four points. Here, for example, it is assumed that the space A where the user A exists, the space B where the user B exists, and the space C where the user C exists, and the space D where the user D exists are connected. Each user can use the information processing apparatus 10 as illustrated in FIG. 1 to share the table. In addition, the virtual distance interval can be adjusted appropriately by each user.

The setting of the shared area may be an area where the tables of the respective users overlap in as illustrated in FIG. 40, for example. The arrangement of each table display 131A, 131B, 131C, and 131D (distance between each other in the virtual space) is adjusted according to the virtual distance interval, and the size of the shared area may also be determined by the arrangement of each table changing according to the virtual distance interval. FIG. 41 illustrates the aspect in which the virtual distance interval is gradually shortened, and each table approaches each other.

As illustrated in FIG. 41, for example, a shared area 327a formed by overlapping the table display 131A and the table display 131B is a shared area between the user A and the user B, and an object at least partially included in the shared area 327a is regarded as a shared object in which the user A and the user B can perform the operation input.

In addition, for example, a shared area 327b formed by overlapping the table display 131A and the table display 131D is a shared area between the user A and the user D, and an object at least partially included in the shared area 327b is regarded as a shared object in which the user A and the user D can perform the operation input.

In addition, for example, a shared area 327c formed by overlapping the table display 131B and the table display 131C is a shared area between the user B and the user C, and an object at least partially included in the shared area 327c is regarded as a shared object in which the user B and the user C can perform the operation input.

In addition, for example, a shared area 327d formed by overlapping the table display 131C and the table display 131D is a shared area between the user C and the user D, and an object at least partially included in the shared area 327d is regarded as a shared object in which the user C and the user D can perform the operation input.

The display screen example on the user A side when presenting the joint work space connecting three points or more has been described above. Note that the shape of each table display 131 is not limited to a rectangle as illustrated in FIG. 40 or 41, and each table display 131 may have any shape such as a square, a polygon, a circle, and an ellipse.

Here, FIGS. 42 and 43 illustrates an example of the display screen example on the user A side when presenting a joint work space connecting three points or more in the case where the table display 131 is a square.

FIG. 42 is a diagram illustrating the display screen example on the user A side when presenting a joint work space connecting three points or more in the case where the table display 131 is a square. In addition, FIG. 43 is a diagram illustrating the display screen example on the user A side when presenting a joint work space connecting four points or more in the case where the table display 131 is a square.

In any case, as in FIGS. 40 and 41, the arrangement (distance from each other in the virtual space) in each table display 131 is adjusted according to the virtual distance interval. The shared area setting is an area where the tables of the respective users overlap. Further, the size of each shared area 328 (328a to 328c) and 329 (329a to 329d) may be determined by the arrangement of each table that changes according to the virtual distance interval.

Further, the method of overlapping the table displays 131 in the presentation of the joint work space connecting the four points is not limited to the examples illustrated in FIG. 41 and FIG. 43, and the table displays 131 may approach each other and overlap as illustrated in FIG. 44, for example.

7. Summary

As described above, in the information processing system according to the present disclosure, it is possible to propose the joint work space in which people feel as if people perform work in the same space as the communication partner in the two-way communication.

The preferred embodiments of the present disclosure have been described above in detail with reference to the accompanying drawings, but the present technology is not limited to such examples. It is obvious that a person having ordinary knowledge in the technical field of the present disclosure can conceive various changes or modifications within the scope of the technical idea described in the claims, and it is understood that the above changes or modifications also naturally belong to the technical scope of the present disclosure.

For example, it is possible to create a computer program for causing the hardware such as a CPU, a ROM, and a RAM built in the information processing apparatus 10 described above to perform the functions of the information processing apparatus 10. In addition, a computer-readable storage medium that stores the computer program is also provided.

Further, the effects described in the present specification are merely explanatory or exemplifying ones, and are not limited. That is, the technology according to the present disclosure may achieve other effects that are apparent to those skilled in the art from the description of the present specification, in addition to or instead of the above effects.

Note that the present technology may also be configured as below.

(1)

An information processing apparatus, comprising:
a first display unit;
a second display unit that displays an image acquired from a space on a communication partner side; and
a control unit that performs a display control of the first display unit and the second display unit,
wherein the control unit
performs control to display, on at least one of the first display unit or the second display unit, a shared object whose display at least extends to a work area on the communication partner side.

(2)

The information processing apparatus according to (1), further comprising:
a communication unit,
wherein the control unit
controls to reflect operation input information on the shared object on the display of the shared object by a user and transmit the operation input information from the communication unit to the communication partner side, and
controls to reflect, on the display of the shared object displayed on at least one of the first display unit or the second display unit, the operation input information on the communication partner side for the same shared object as the shared object displayed on the communication partner side received from the communication partner side by the communication unit.

(3)
The information processing apparatus according to (2), wherein the control unit
shares the information on the shared object displayed on at least one of the first display unit or the second display unit with the communication partner side and performs display control on the same shared object as the communication partner side, and
performs display control to make an arrangement of one or more shared objects displayed on the first display unit or the second display unit correspond to an arrangement of the shared objects on the communication partner side.

(4)
The information processing apparatus according to (3), wherein the control unit
sets, in a display area of the first display unit, a shared area in which another party side work area operable by the communication partner side and a user work area operable by the user overlap, and
recognizes an object whose display extends to the shared area as the shared object.

(5)
The information processing apparatus according to (4), wherein in a state in which a display surface of the first display unit is positioned in a substantially horizontal direction, and
a display surface of the second display unit is arranged in a substantially orthogonal direction to the display surface of the first display unit,
the control unit
displays the shared object on the first display unit, and
displays a video image of a communication partner on the second display unit.

(6)
The information processing apparatus according to (5), wherein the control unit
performs the display control so that an entire arrangement of the shared objects displayed on the first display unit has a vertically and horizontally reversed relationship with respect to an entire arrangement of the same shared object as the shared object displayed on a third display unit corresponding to the first display unit on the communication partner side.

(7)
The information processing apparatus according to (6), wherein the control unit
performs display control to make the entire arrangement of the shared object displayed on the first display unit the same as the entire arrangement of the same shared object as the shared object displayed on the third display unit according to a user instruction.

(8)
The information processing apparatus according to (4), wherein in a state in which a display surface of the first display unit is positioned in a substantially horizontal direction, and
a display surface of the second display unit is arranged in a substantially orthogonal direction to the display surface of the first display unit,
the control unit
displays the shared object on the first display unit, and
displays a communication partner and a video image of a work area on the communication partner side on the second display unit.

(9)
The information processing apparatus according to (8), wherein the control unit
displays the work area on the communication partner side on a side where the display surface of the first display unit is positioned in a display area of the second display unit so that the work area on the communication partner side is adjacent to the display surface of the first display unit.

(10)
The information processing apparatus according to (9), wherein the control unit
sets the shared area on a side adjacent to the display surface of the second display unit in the display surface of the first display unit, and
performs display control so that a display screen of the shared area is similarly displayed to a display screen of the shared area similarly set in the third display unit corresponding to the first display unit on the communication partner side.

(11)
The information processing apparatus according to (9) or (10), wherein the control unit
controls the display of the work area on the communication partner side included in the second display unit based on display information of the third display unit on the communication partner side and performs display control of reproducing the display screen of the third display unit on the communication partner side in the work area on the communication partner side included in the second display unit.

(12)
The information processing apparatus according to (3), wherein the control unit
sets a user work area operable by the user in the display area of the first display unit,
sets, in a display area of the second display unit, a shared area in which another party side work area operable by the communication partner side and a user work area operable by the user overlap, and
recognizes an object whose display extends to the shared area as the shared object.

(13)
The information processing apparatus according to (12), wherein the control unit
arranges and displays the video image of the communication partner side in a virtual three-dimensional space corresponding to the shared area and on a back side of the three-dimensional space.

(14)
The information processing apparatus according to (13), wherein the control unit
displays the three-dimensional or two-dimensional shared object in the virtual three-dimensional space.

(15)
The information processing apparatus according to (13) or (14), wherein the control unit
displays the virtual three-dimensional space, including a side where a display surface of the first display unit is positioned in a display area of the second display unit so that the virtual three-dimensional space is adjacent to the display surface of the first display unit,
further arranges a work area reproducing a display of a third display unit corresponding to the first display unit on the communication partner side so that the work area is adjacent to the three-dimensional space, and seamlessly moves the shared object between the first display unit, the three-dimensional space displayed on the second display unit, and the other party side work area displayed on the second display unit according to the operation input of the user or the communication partner side.

(16)

The information processing apparatus according to (3), wherein the control unit sets a user work area operable by the user in the display area of the first display unit, displays, in a display area of the second display unit, another party side work area reproducing a display of a third display unit corresponding to the first display unit on the communication partner side, and displays the other party side work area on a side where a display surface of the first display unit is positioned in a display area of the second display unit so that the other party side work area is adjacent to the display surface of the first display unit, and the control unit further recognizes an object displayed over the other party side work area of the first display unit and the second display unit as the shared object.

(17)

The information processing apparatus according to any one of (3) to 16, wherein the control unit sets a shared area in which a user work area and another party side work area are overlapped in the first display unit or sets the shared area in the second display unit according to a set virtual distance interval.

(18)

The information processing apparatus according to any one of (1) to (17), wherein the control unit performs display control not to display a figure of a communication partner from a video image of the communication partner side displayed on the second display unit when gathered on a user side according to a gathering request, and performs display control to switch an arrangement of the shared object displayed on the first display unit or the second display unit to a point of view from the communication partner side when gathered on the communication partner side according to the gathering request.

(19)

An information processing method, comprising:
causing a processor to
perform display control of a first display unit and a second display unit that displays an image acquired from a space on a communication partner side, and display, in at least one of the first display unit or the second display unit, a shared object whose display at least extends to a work area on the communication partner side.

(20)

A program for causing a computer to function as a control unit that performs display control of a first display unit and a second display unit that displays an image acquired from a space on a communication partner side, wherein the control unit performs control to display, on at least one of the first display unit or the second display unit, a shared object whose display at least extends to a work area on the communication partner side.

REFERENCE SIGNS LIST 10, 10-5 INFORMATION PROCESSING APPARATUS
10-1 TABLE DEVICE
10-2 WINDOW DEVICE
10-3 SPEAKER DEVICE
100 CONTROL UNIT
101 INPUT INFORMATION RECOGNITION UNIT
102 VIRTUAL DISTANCE INTERVAL SETTING UNIT
103 SHARED AREA DETERMINATION UNIT
104 SHARED OBJECT SELECTION UNIT
105 DISPLAY CONTROL UNIT
106 TABLE DISPLAY CONTROL UNIT
107 WINDOW DISPLAY CONTROL UNIT
108 VOICE OUTPUT CONTROL UNIT
110 COMMUNICATION UNIT
120 INPUT UNIT
121 SENSOR UNIT
123 CAMERA
125 MICROPHONE
130 OUTPUT UNIT
131 (131A TO 131D) TABLE DISPLAY
133 WINDOW DISPLAY
133$b$ Virtual table
135 SPEAKER
140 STORAGE UNIT
201, 202, 204, 205, 206, 207, 208, 209, 210, 211, 213 OBJECT
300, 324, 325, 327, 328 SHARED AREA
320 MIDDLE SPACE
322 POINTER

The invention claimed is:

1. An information processing apparatus, comprising:
a first display unit;
a second display unit configured to display a first image of a space of a communication partner side; and
a control unit configured to:
set a first user work area in a display area of the first display unit, wherein the first user work area is user operable;
set a shared area in a display area of the second display unit, wherein
the shared area is an area in which the first user work area overlaps with a second user work area, and
the second user work area is operable at the communication partner side;
the first display unit and the second display unit to display a specific object wherein the display of the specific object extends from the display area of the first display unit to the shared area in the display area of the second display unit;
recognize the specific object as a first shared object; and
control the display of the first shared object based on a user operation.

2. The information processing apparatus according to claim 1, further comprising a communication unit, wherein the control unit is further configured to:
control the display of the first shared object to reflect first operation input information, wherein the first operation input information corresponds to the user operation on the first shared object;
control the communication unit to:
transmit the first operation input information to the communication partner side; and
receive second operation input information from the communication partner side, wherein the second operation input information corresponds to a communication partner side operation on a display of a second shared object at the communication partner side; and control the display of the first shared object on the first display unit and the second display unit, to reflect the second operation input information, wherein
the first shared object is same as the second shared object.

3. The information processing apparatus according to claim 2, wherein the control unit is further configured to control display of an arrangement of a first plurality of shared objects on at least one of the first display unit or the second display unit, wherein
the display of the arrangement of the first plurality of shared objects is controlled to correspond to an arrangement of a second plurality of shared objects on the communication partner side.

4. The information processing apparatus according to claim 3, wherein
a display surface of the first display unit is in a substantially horizontal direction,
a display surface of the second display unit is in a substantially orthogonal direction with respect to the display surface of the first display unit, and
the control unit is further configured to control the second display unit to display a video image of a communication partner.

5. The information processing apparatus according to claim 4, wherein
the control unit is further configured to control display of an entirety of the arrangement of the first plurality of shared objects on the first display unit,
the display of the entirety of the arrangement of the first plurality of shared objects is controlled to have a vertically and horizontally reversed relationship with respect to an entirety of the arrangement of the second plurality of shared objects, and
the second plurality of shared objects is displayed on a third display unit, corresponding to the first display unit, on the communication partner side.

6. The information processing apparatus according to claim 5, wherein the control unit is further configured to control display of the entirety of the arrangement of the first plurality of shared objects same as the entirety of the arrangement of the second plurality of shared objects based on a user instruction.

7. The information processing apparatus according to claim 3, wherein
a display surface of the first display unit in a substantially horizontal direction,
a display surface of the second display unit is in a substantially orthogonal direction with respect to the display surface of the first display unit, and
the control unit is further configured to:
control the first display unit to display the first plurality of shared objects;
control the second display unit to display a video image of a communication partner and a video image of the second user work area.

8. The information processing apparatus according to claim 3, wherein the control unit is further configured to set the shared area in the second display unit based on a virtual distance interval.

9. The information processing apparatus according to claim 3, wherein
the control unit is further configured to:
control the second display unit to display a video image of the communication partner side;
cut out a second image of a communication partner from the video image of the communication partner side, wherein
the second image is cut out based on virtual presence of the communication partner gathered on a user side of a user of the first display unit, and
the virtual presence of the communication partner on the user side is based on a first gathering request; and
control at least one of the first display unit or the second display unit to switch a first arrangement of the first shared object to a second arrangement of the first shared object, wherein
the second arrangement of the first shared object is from a point of view of the communication partner side,
the first arrangement of the first shared object is switched to the second arrangement based on virtual presence of the user on the communication partner side, and
the virtual presence of the user on the communication partner side is based on a second gathering request.

10. The information processing apparatus according to claim 1, wherein
the control unit is further configured to control display of a video image of the communication partner side on a back side of a virtual three-dimensional space, and
the virtual three-dimensional space corresponds to the shared area.

11. The information processing apparatus according to claim 10, wherein the control unit is further configured to control display of one of a three-dimensional shared object or a two-dimensional shared object in the virtual three-dimensional space.

12. The information processing apparatus according to claim 10, wherein
the control unit is further configured to:
control the second display unit to display the virtual three-dimensional space in the display area of the second display unit, wherein
the virtual three-dimensional space is adjacent to a display surface of the first display unit;
control the second display unit to display the second user work area that reproduces a display of a third display unit, wherein
the third display unit is on the communication partner side,
the third display unit corresponds to the first display unit, and
the second user work area is displayed adjacent to the virtual three-dimensional space; and
control movement of the first shared object between the first display unit, the virtual three-dimensional space displayed on the second display unit, and the second user work area displayed on the second display unit, wherein the movement of the first shared object is controlled based on at least one of the user operation input by a user of the first display unit or a communication partner operation input by a communication partner at the communication partner side.

13. An information processing method, comprising:
  setting a first user work area in a display area of a first display unit, wherein the first user work area is user operable;
  controlling a second display unit to display an image of a space of a communication partner side;
  setting a shared area in a display area of the second display unit, wherein
    the shared area is an area in which the first user work area overlaps with a second user work area, and
    the second user work area is operable at the communication partner side;
  controlling the first display unit and the second display unit to display a specific object, wherein the display of the specific object extends from the display area of the first display unit to the shared area in the display area of the second display unit;
  recognizing the specific object as a shared object; and
  controlling the display of the shared object based on a user operation.

14. A non-transitory computer-readable medium having stored thereon computer-executable instructions which, when executed by a processor, cause the processor to execute operations, the operations comprising:
  setting a first user work area in a display area of a first display unit, wherein the first user work area is user operable;
  controlling a second display unit to display an image of a space of a communication partner side;
  setting a shared area in a display area of the second display unit, wherein
    the shared area is an area in which the first user work area overlaps with a second user work area, and
    the second user work area is operable at the communication partner side;
  controlling the first display unit and the second display unit to display a specific object, wherein the display of the specific object extends from the display area of the first display unit to the shared area in the display area of the second display unit;
  recognizing the specific object as a shared object; and
  controlling the display of the shared object based on a user operation.

15. An information processing apparatus, comprising:
  a communication unit;
  a first display unit;
  a second display unit configured to display a video image of a communication partner side; and
  a control unit configured to:
    control at least one of the first display unit or the second display unit to display a first shared object, wherein the display of the first shared object extends to a display of a work area of the communication partner side;
    control the display of the first shared object to reflect first operation input information, wherein the first operation input information corresponds to a user operation on the first shared object;
    control the communication unit to:
      transmit the first operation input information to the communication partner side; and
      receive second operation input information from the communication partner side, wherein the second operation input information corresponds to a communication partner side operation on a display of a second shared object at the communication partner side;
    control the display of the first shared object, on at least one of the first display unit or the second display unit, to reflect the second operation input information, wherein
      the first shared object is same as the second shared object operable by the communication partner side;
    cut out a specific image of a communication partner from the video image of the communication partner side, wherein
      the specific image is cut out based on virtual presence of the communication partner on a user side of a user of the first display unit, and
      the virtual presence of the communication partner on the user side is based on a first gathering request; and
    control at least one of the first display unit or the second display unit to switch a first arrangement of the first shared object to a second arrangement of the first shared object, wherein
      the second arrangement of the first shared object is from a point of view of the communication partner side,
      the first arrangement of the first shared object is switched to the second arrangement based on virtual presence of the user on the communication partner side, and
      the virtual presence of the user on the communication partner side is based on a second gathering request.

* * * * *